US008608539B2

(12) United States Patent
Itagaki et al.

(10) Patent No.: US 8,608,539 B2
(45) Date of Patent: Dec. 17, 2013

(54) GAMING MACHINE CAPABLE OF TRANSFER FROM BASE GAME

(75) Inventors: Takehisa Itagaki, Tokyo (JP); Hiroki Munakata, Tokyo (JP); Masumi Fujisawa, Tokyo (JP)

(73) Assignees: Universal Entertainment Corp., Tokyo (JP); Aruze Gaming America, Inc., Las Vegas, NV (US)

( * ) Notice: Subject to any disclaimer, the term of this patent is extended or adjusted under 35 U.S.C. 154(b) by 0 days.

(21) Appl. No.: 13/351,740

(22) Filed: Jan. 17, 2012

(65) Prior Publication Data

US 2012/0184369 A1 Jul. 19, 2012

(30) Foreign Application Priority Data

Jan. 18, 2011 (JP) ................................ 2011-008074

(51) Int. Cl.
*A63F 13/10* (2006.01)

(52) U.S. Cl.
USPC ................................ 463/16; 463/20; 463/29

(58) Field of Classification Search
USPC ................................ 463/16, 20, 25, 29, 30
See application file for complete search history.

(56) References Cited

U.S. PATENT DOCUMENTS

2003/0211879 A1* 11/2003 Englman ........................ 463/20
2008/0113762 A1* 5/2008 Roukis ........................ 463/20
2008/0242386 A1 10/2008 Okada
2008/0242396 A1 10/2008 Okada

* cited by examiner

*Primary Examiner* — Damon Pierce
(74) *Attorney, Agent, or Firm* — KMF Patent Services, PLLC; S. Peter Konzel; Kenneth M. Fagin

(57) ABSTRACT

A gaming machine is provided which is capable of providing a rendering in such a manner that a story gradually extends together with a bonus game in a case where rendering processing is executed in parallel with the bonus game. The routine transfers to a free game, as triggered by establishment of a condition for rearranging a specific symbol in a base game. Next, the routine transfers to a bonus game, as triggered by establishment of a first transfer condition in the free game. Then, the routine transfers to another free game, as triggered by establishment of a second transfer condition in the bonus game. In this manner, an extended game loop in which the free game and the bonus game enter extended games is formed.

5 Claims, 43 Drawing Sheets

FIG. 2A

EXTENDED GAME LOOP TYPE PROPOSAL <1> (1-1ST FUNCTIONAL FLOWCHART)

THIS GAME HAS GAME ENTERTAINMENT PROPERTY THAT THERE IS BRANCH BETWEEN LOOP (CONTINUE) AND END IN ONLY FREE GAME.

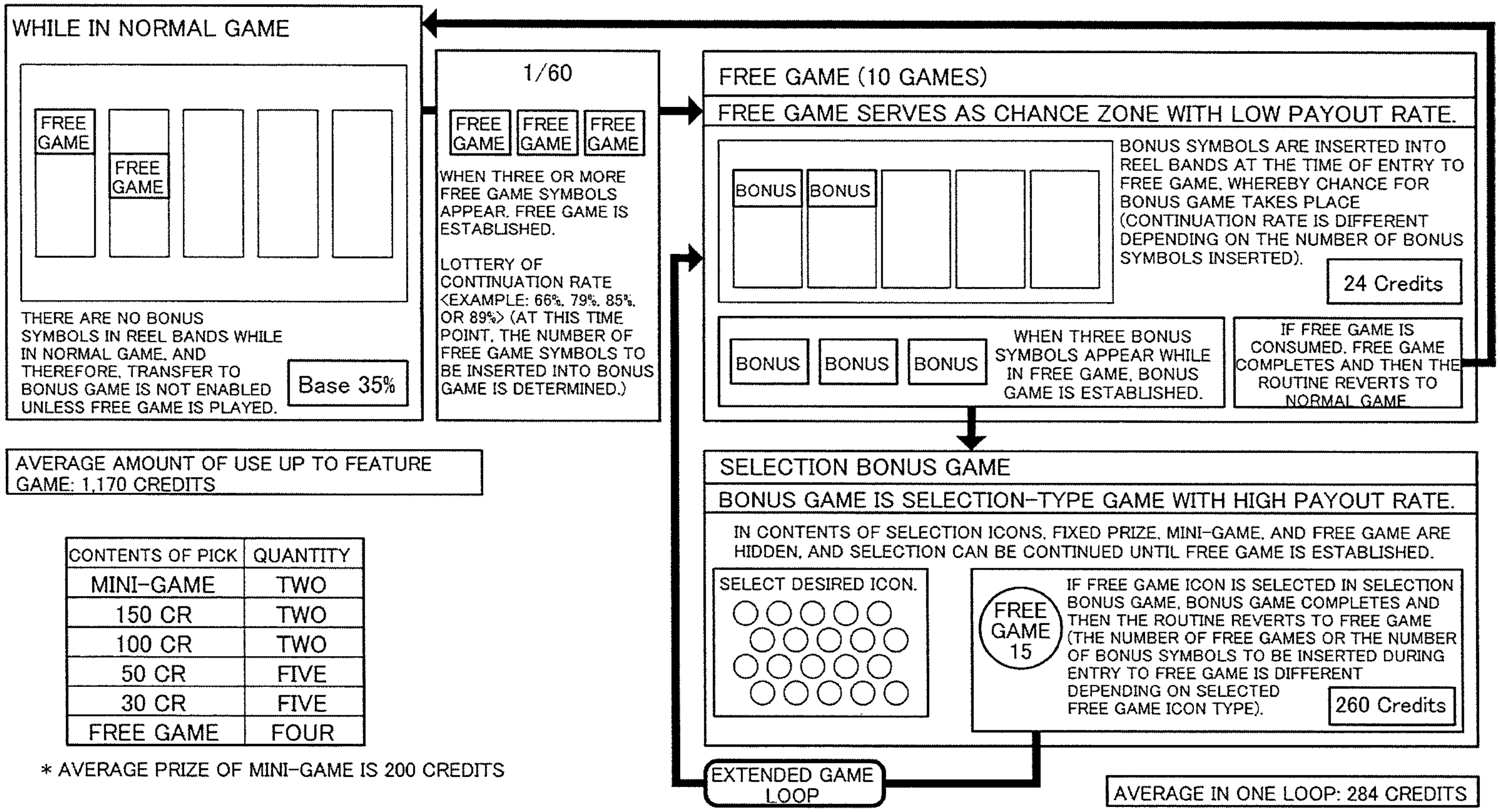

AVERAGE AMOUNT OF USE UP TO FEATURE GAME: 1,170 CREDITS

| CONTENTS OF PICK | QUANTITY |
|---|---|
| MINI-GAME | TWO |
| 150 CR | TWO |
| 100 CR | TWO |
| 50 CR | FIVE |
| 30 CR | FIVE |
| FREE GAME | FOUR |

* AVERAGE PRIZE OF MINI-GAME IS 200 CREDITS

| LOOP RATE | 66% | 79% | 84% | 88% |
|---|---|---|---|---|
| AVERAGE NUMBER OF ENTRIES INTO EXTENDED GAME | 2.9 TIMES | 4.8 TIMES | 6.3 TIMES | 8.3 TIMES |
| AVERAGE PRIZE | 835 | 1,352 | 1,775 | 2,367 |

AVERAGE LOOP RATE: 72%
AVERAGE NUMBER OF CONTINUATIONS: 3.6 TIMES
AVERAGE PRIZE: 1,028 CREDITS

FIG. 2B

EXTENDED GAME LOOP TYPE PROPOSAL <1'> (1-2ND FUNCTIONAL FLOWCHART)

THIS GAME HAS GAME ENTERTAINMENT PROPERTY THAT THERE IS BRANCH BETWEEN LOOP (CONTINUE) AND END IN ONLY FREE GAME.

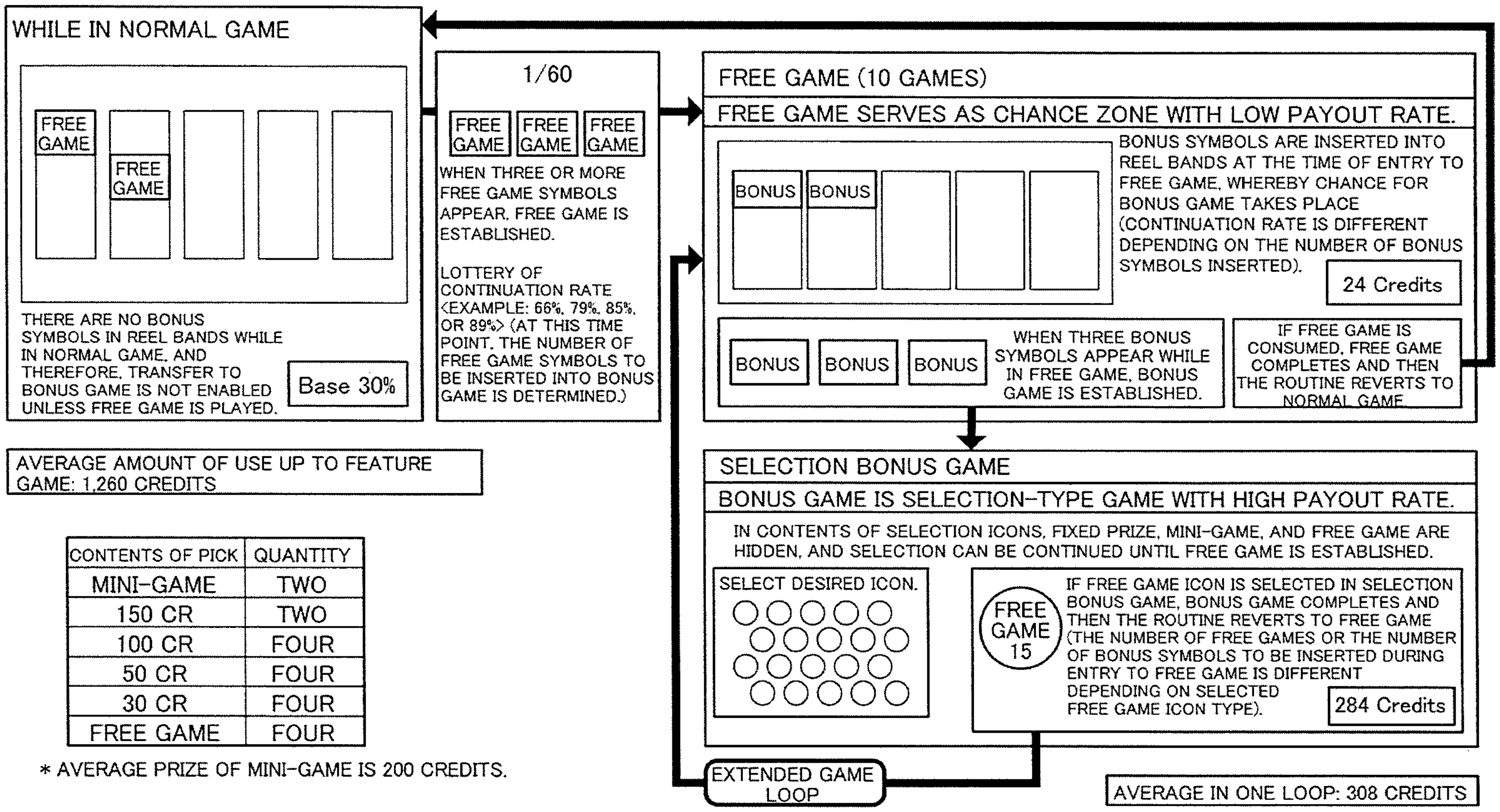

AVERAGE AMOUNT OF USE UP TO FEATURE GAME: 1,260 CREDITS

| CONTENTS OF PICK | QUANTITY |
|---|---|
| MINI-GAME | TWO |
| 150 CR | TWO |
| 100 CR | FOUR |
| 50 CR | FOUR |
| 30 CR | FOUR |
| FREE GAME | FOUR |

* AVERAGE PRIZE OF MINI-GAME IS 200 CREDITS.

| LOOP RATE | 66% | 79% | 84% | 88% |
|---|---|---|---|---|
| AVERAGE NUMBER OF ENTRIES INTO EXTENDED GAME | 2.9 TIMES | 4.8 TIMES | 6.3 TIMES | 8.3 TIMES |
| AVERAGE PRIZE | 906 | 1,467 | 1,925 | 2,567 |

FIG 2C

EXTENDED GAME LOOP TYPE PROPOSAL <2> (SECOND FUNCTIONAL FLOWCHART)

THIS GAME HAS GAME ENTERTAINMENT PROPERTY THAT THERE IS BRANCH BETWEEN LOOP (CONTINUE) AND END IN EACH OF FREE GAME AND BONUS GAME.

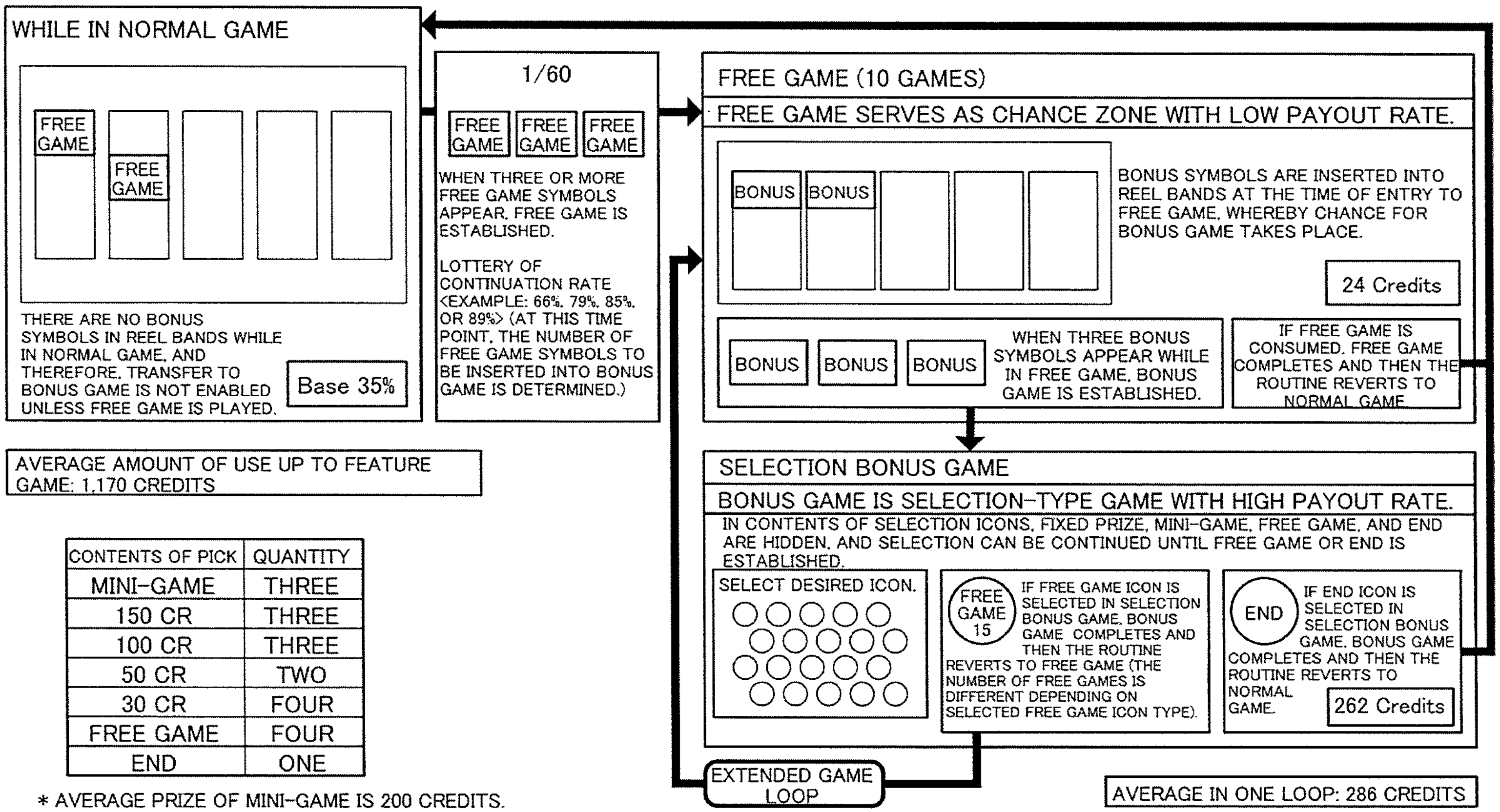

AVERAGE AMOUNT OF USE UP TO FEATURE GAME: 1,170 CREDITS

| CONTENTS OF PICK | QUANTITY |
|---|---|
| MINI-GAME | THREE |
| 150 CR | THREE |
| 100 CR | THREE |
| 50 CR | TWO |
| 30 CR | FOUR |
| FREE GAME | FOUR |
| END | ONE |

* AVERAGE PRIZE OF MINI-GAME IS 200 CREDITS.

AVERAGE IN ONE LOOP: 286 CREDITS

| LOOP RATE | 66% | 79% | 84% | 88% |
|---|---|---|---|---|
| AVERAGE NUMBER OF ENTRIES INTO EXTENDED GAME | 2.9 TIMES | 4.8 TIMES | 6.3 TIMES | 8.3 TIMES |
| AVERAGE PRIZE | 841 | 1,362 | 1,788 | 2,383 |

AVERAGE LOOP RATE: 72%
AVERAGE NUMBER OF CONTINUATIONS: 3.6 TIMES
AVERAGE PRIZE: 1,034 CREDITS

EXTENDED GAME LOOP TYPE PROPOSAL <3> (3-1ST FUNCTIONAL FLOWCHART)
THIS GAME HAS GAME ENTERTAINMENT PROPERTY THAT
THERE IS BRANCH BETWEEN LOOP (CONTINUE) AND END IN ONLY BONUS GAME.

EXTENDED GAME LOOP TYPE PROPOSAL <3'> (3-2ND FUNCTIONAL FLOWCHART)

THIS GAME HAS GAME ENTERTAINMENT PROPERTY THAT
THERE IS BRANCH BETWEEN LOOP (CONTINUE) AND END IN ONLY BONUS GAME.

EXTENDED GAME LOOP TYPE PROPOSAL <3''' > (3-4TH FUNCTIONAL FLOWCHART)
THIS GAME HAS GAME ENTERTAINMENT PROPERTY THAT
THERE IS BRANCH BETWEEN LOOP (CONTINUE) AND END IN ONLY BONUS GAME.

EXTENDED LOOP TYPE PROPOSAL <4> (4-1ST FUNCTIONAL FLOWCHART)

THIS GAME HAS GAME ENTERTAINMENT PROPERTY THAT THERE IS BRANCH BETWEEN LOOP (CONTINUE) AND END IN ONLY FREE GAME, AND IS PLAYED IN SUCH A MANNER THAT BONUS GAME IS SELECTED FROM AMONG PLURALITY OF BONUS GAMES.

EXTENDED LOOP TYPE PROPOSAL <4"> (4-3RD FUNCTIONAL FLOWCHART)

THIS GAME HAS GAME ENTERTAINMENT PROPERTY THAT THERE IS BRANCH BETWEEN LOOP (CONTINUE) AND END IN ONLY FREE GAME, AND IS PLAYED IN SUCH A MANNER THAT BONUS GAME IS SELECTED FROM AMONG PLURALITY OF BONUS GAMES.

EXTENDED LOOP TYPE PROPOSAL <5> (FIFTH FUNCTIONAL FLOWCHART)

THIS GAME HAS GAME ENTERTAINMENT PROPERTY THAT THERE IS BRANCH BETWEEN LOOP (CONTINUE) AND END IN ONLY FREE GAME, AND IS PLAYED IN SUCH A MANNER THAT BONUS GAME IS SELECTED FROM AMONG PLURALITY OF BONUS GAMES.

FIG. 2N

EXTENDED GAME LOOP TYPE PROPOSAL <7> (SEVENTH FUNCTIONAL FLOWCHART)

THIS GAME HAS GAME ENTERTAINMENT PROPERTY THAT THERE IS BRANCH BETWEEN LOOP (CONTINUE) AND END IN ONLY BONUS GAME, AND IS PLAYED IN SUCH A MANNER THAT CONTINUING LOTTERY IS CONDUCTED WITH TIMING OF SUCCESSFUL ARRANGEMENT OF FREE GAME SYMBOLS.

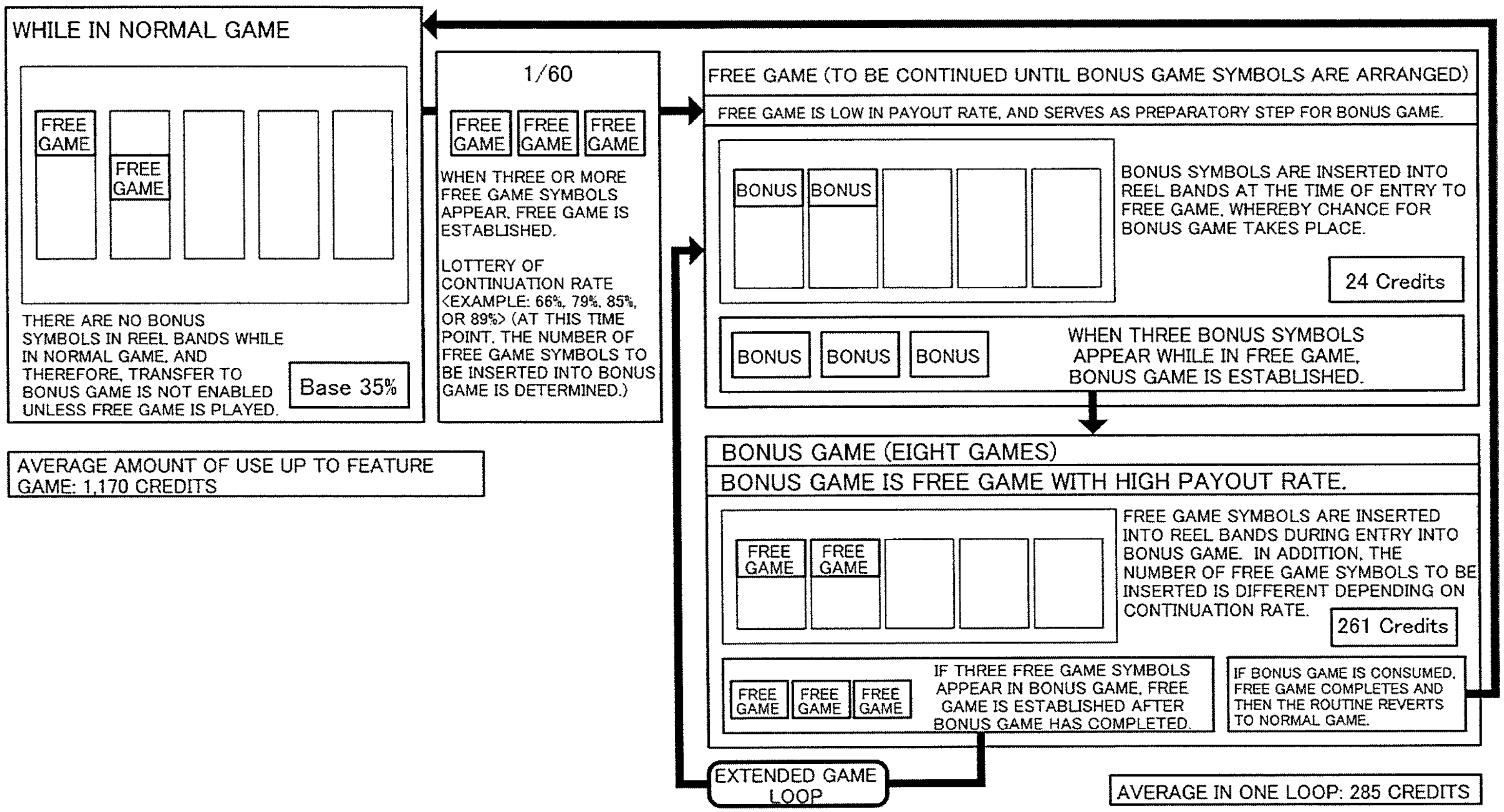

| LOOP RATE | 66% | 79% | 84% | 88% |
|---|---|---|---|---|
| AVERAGE NUMBER OF ENTRIES INTO EXTENDED GAME | 2.9 TIMES | 4.8 TIMES | 6.3 TIMES | 8.3 TIMES |
| AVERAGE PRIZE | 838 | 1,357 | 1,781 | 2,375 |

AVERAGE LOOP RATE: 72%
AVERAGE NUMBER OF CONTINUATIONS: 3.6 TIMES
AVERAGE PRIZE: 1,030 CREDITS

FIG. 20

EXTENDED GAME LOOP TYPE PROPOSAL <8> (EIGHTH FUNCTIONAL FLOWCHART)

THIS GAME HAS GAME ENTERTAINMENT PROPERTY THAT THERE IS BRANCH BETWEEN LOOP (CONTINUE) AND END IN ONLY BONUS FREE GAME, AND IS PLAYED IN SUCH A MANNER THAT WHETHER OR NOT TO ENABLE CONTINUING IS DISPLAYED BY MEANS OF IMAGE RENDERING.

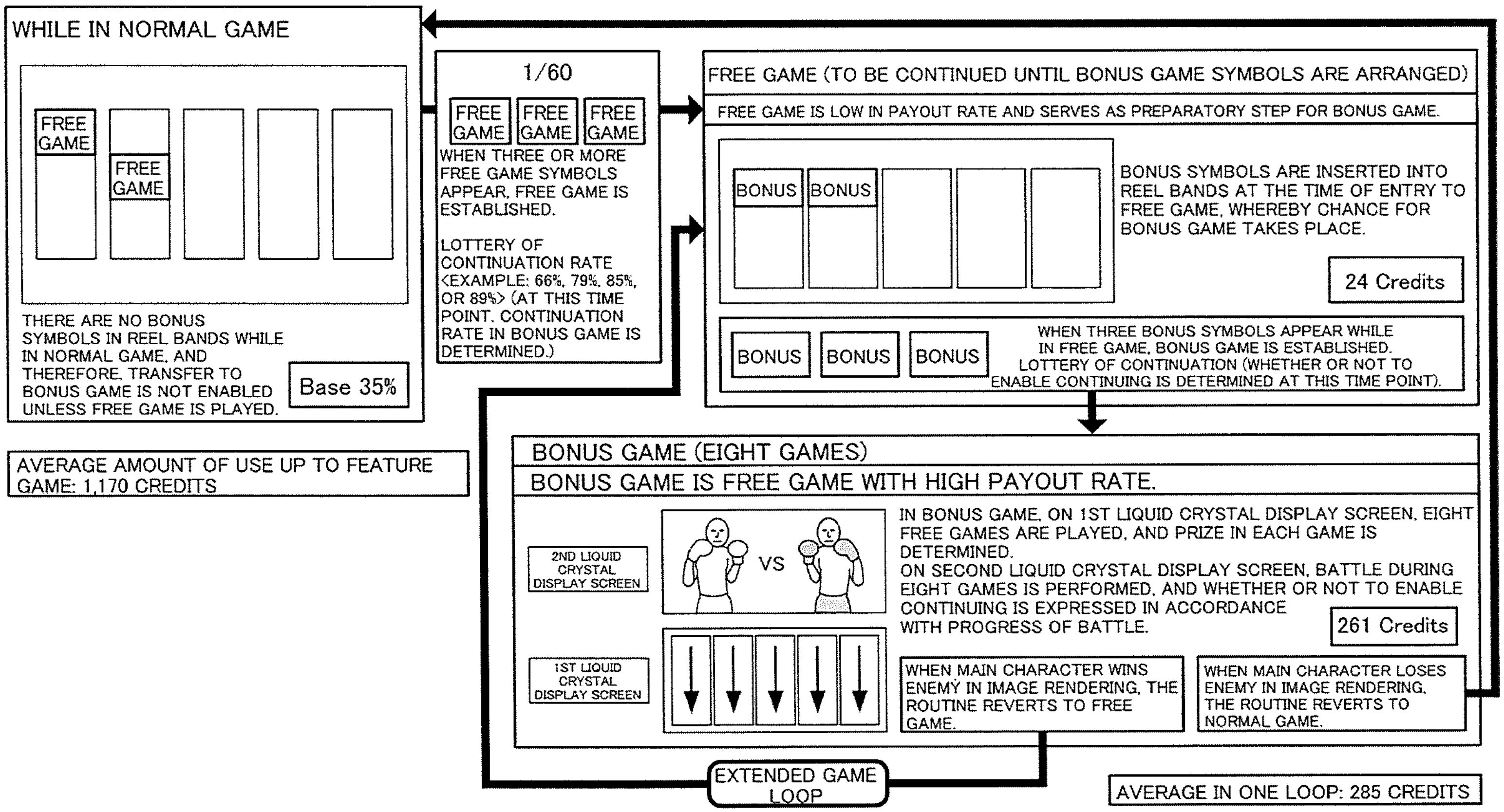

| LOOP RATE | 66% | 79% | 84% | 88% |
|---|---|---|---|---|
| AVERAGE NUMBER OF ENTRIES INTO EXTENDED GAME | 2.9 TIMES | 4.8 TIMES | 6.3 TIMES | 8.3 TIMES |
| AVERAGE PRIZE | 838 | 1,357 | 1,781 | 2,375 |

FIG. 5

| | FIRST VIDEO REEL | SECOND VIDEO REEL | THIRD VIDEO REEL | FOURTH VIDEO REEL | FIFTH VIDEO REEL |
|---|---|---|---|---|---|
| CODE NUMBER | SYMBOL | SYMBOL | SYMBOL | SYMBOL | SYMBOL |
| 00 | JACKPOT 7 | JACKPOT 7 | JACKPOT 7 | JACKPOT 7 | JACKPOT 7 |
| 01 | PLUM | BELL | CHERRY | ORANGE | FREE GAME |
| 02 | ORANGE | FREE GAME | ORANGE | PLUM | ORANGE |
| 03 | PLUM | BELL | FREE GAME | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | FREE GAME | ORANGE |
| 07 | PLUM | CHERRY | PLUM | BLUE 7 | FREE GAME |
| 08 | BLUE 7 | BELL | ORANGE | PLUM | PLUM |
| 09 | CHERRY | FREE GAME | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | FREE GAME | FREE GAME |
| 15 | ORANGE | FREE GAME | BELL | STRAWBERRY | PLUM |
| 16 | FREE GAME | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | FREE GAME | PLUM | PLUM | STRAWBERRY |

FIG. 7

Symbol combination table

| Symbol Combination | | | | | Number of payouts | Winning combination |
|---|---|---|---|---|---|---|
| Fitrst video reel | Second video reel | Third video reel | Fourth video reel | Fifth video reel | | |
| JACKPOT 7 | JACKPOT 7 | JACKPOT 7 | JACKPOT 7 | JACKPOT 7 | Amount of jackpot | Jackpot |
| FREE GAME | FREE GAME | FREE GAME | FREE GAME | FREE GAME | Free game * | Free game trigger |
| BLUE 7 | BLUE 7 | BLUE 7 | BLUE 7 | BLUE 7 | 10 | BLUE |
| BELL | BELL | BELL | BELL | BELL | 8 | BELL |
| CHERRY | CHERRY | CHERRY | CHERRY | CHERRY | 5 | CHERRY3 |
| STRAWBERRY | STRAWBERRY | STRAWBERRY | STRAWBERRY | STRAWBERRY | 5 | STRAWBERRY |
| PLUM | PLUM | PLUM | PLUM | PLUM | 4 | PLUM |
| ORANGE | ORANGE | ORANGE | ORANGE | ORANGE | 3 | ORANGE3 |
| CHERRY | CHERRY | CHERRY | (ANY) | (ANY) | 2 | CHERRY2 |
| ORANGE | ORANGE | ORANGE | (ANY) | (ANY) | 2 | ORANGE2 |
| CHERRY | (ANY) | (ANY) | (ANY) | (ANY) | 1 | CHERRY1 |
| ORANGE | (ANY) | (ANY) | (ANY) | (ANY) | 1 | ORANGE1 |

* Free games of the number of times determined by lottery are conducted.

FIG. 29

| BENEFIT GAME NUMBER | FUNCTIONAL FLOWCHART NUMBER | FREE GAME NUMBER | EXTENDED BONUS GAME NUMBER |
|---|---|---|---|
| 1 | 1-1ST FUNCTIONAL FLOWCHART | FREE GAME 1 | EXTENDED BONUS GAME 1 |
| 2 | 1-2ND FUNCTIONAL FLOWCHART | FREE GAME 1 | EXTENDED BONUS GAME 1 |
| 3 | SECOND FUNCTIONAL FLOWCHART | FREE GAME 1 | EXTENDED BONUS GAME 2 |
| 4 | 3-1ST FUNCTIONAL FLOWCHART | FREE GAME 2 | EXTENDED BONUS GAME 3 |
| 5 | 3-2ND FUNCTIONAL FLOWCHART | FREE GAME 2 | EXTENDED BONUS GAME 3 |
| 6 | 3-3RD FUNCTIONAL FLOWCHART | FREE GAME 2 | EXTENDED BONUS GAME 3 |
| 7 | 3-4TH FUNCTIONAL FLOWCHART | FREE GAME 2 | EXTENDED BONUS GAME 3 |
| 8 | 4-1ST FUNCTIONAL FLOWCHART | FREE GAME 1 | EXTENDED BONUS GAME 4 |
| 9 | 4-2ND FUNCTIONAL FLOWCHART | FREE GAME 1 | EXTENDED BONUS GAME 4 |
| 10 | 4-3RD FUNCTIONAL FLOWCHART | FREE GAME 1 | EXTENDED BONUS GAME 4 |
| 11 | 4-4TH FUNCTIONAL FLOWCHART | FREE GAME 1 | EXTENDED BONUS GAME 4 |
| 12 | FIFTH FUNCTIONAL FLOWCHART | FREE GAME 3 | EXTENDED BONUS GAME 4 |
| 13 | SIXTH FUNCTIONAL FLOWCHART | FREE GAME 4 | EXTENDED BONUS GAME 5 |
| 14 | SEVENTH FUNCTIONAL FLOWCHART | FREE GAME 4 | EXTENDED BONUS GAME 6 |
| 15 | EIGHTH FUNCTIONAL FLOWCHART | FREE GAME 4 | EXTENDED BONUS GAME 7 |

GAMING MACHINE CAPABLE OF TRANSFER FROM BASE GAME

CROSS REFERENCE TO RELATED APPLICATIONS

This application claims priority of Japanese Patent Application No. 2011-008074 filed on Jan. 18, 2011. The contents of this application are incorporated herein by reference in their entirety.

BACKGROUND OF THE INVENTION

1. Field of the Invention

The present invention relates to a gaming machine that is capable of transfer from a base game to a favorable game such as a free game.

2. Description of the Related Art

In a conventional gaming machine, a bonus game that is more favorable to a player has been provided (for example, refer to US2008-242396A1). In addition, in a conventional gaming machine, a free game that can be played while the amount of coin consumption is restrained has been provided (for example, refer to US2008-242386A1). These conventional gaming machines have been capable of transfer from a base game that is a normal game state to a bonus game or a free game. By transferring to such bonus game or free game, a player could play a game in a state that is more favorable than that of a base game.

While, in the conventional gaming machines described above, a game could be played by transfer from a base game to a bonus game or a free game, such a bonus game or free game has been in a state in which the routine reverts to a base game immediately in a case where a predetermined completion condition has been met. Thus, there has been a case in which a state that is favorable to a player does not continue for a long period of time, and there has been a possibility of making a player bored.

The present invention has been made in view of the circumstance described above, and it is an object of the present invention to provide a gaming machine that is capable of maintaining a favorable state and hardly making a player bored.

SUMMARY OF THE INVENTION

A gaming machine according to one aspect of the present invention includes:

a display device having a plurality of regions in which a plurality of symbols are arranged; and a controller for controlling a base game in which a predetermined prize can be determined according to rearrangement of the plurality of symbols, a free game in which a predetermined prize can be determined according to rearrangement of the plurality of symbols by playing at least one unit game without betting a gaming medium, and a bonus game in which a prize higher than the predetermined prize can be determined, the controller being programmed to execute processing operations of:

(1-1) transferring from the base game to the free game, as triggered by establishment of a condition for rearranging a specific symbol from among the plurality of symbols in the base game;

(1-2) transferring to the bonus game, as triggered by establishment of a first transfer condition in a predetermined unit game in the free game;

(1-3) transferring to the free game, as triggered by establishment of a second transfer condition in the bonus game;

(1-4) forming and executing an extended game loop in which the free game and the bonus game enter an extended game, in accordance with the processing operation of (1-2) and the processing operation of (1-3); and (1-5) generating the extended game loop at a predetermined continuation rate.

An extended game loop in which a free game and a bonus game enter an extended game is formed to be thereby able to enhance a possibility that a player obtains a profit and impart a motivation of attempting to continue a game to a player. In addition, in a case where rendering processing is also executed in parallel with the processing operation of (1-3), it becomes possible to provide a rendering that a story gradually extends together with execution of the processing operation of (1-3) and then attract a player by means of the rendering.

Further, in the gaming machine according to another aspect of the present invention, the controller further executes a processing operation of (2-1) transferring from the free game or the bonus game to the base game, as triggered by establishment of a completion condition in at least one game of the free game and the bonus game.

When a completion condition is established, the routine transfers to a base game, thus making it possible to impart a profit to a player, a profit of gaming facility such as casino can be ensured, and a balance in profit between the gaming facility and each player can be maintained.

Further, in the gaming machine according to another aspect of the present invention, the controller executes a processing operation of (3-1) determining the predetermined continuation rate as triggered by establishment of a condition for rearranging a specific symbol from among the plurality of symbols in the base game, as triggered by establishment of the first transfer condition, or when the bonus game is executed.

A continuation rate is determined in accordance with the processing operation of (3-1), the easiness of continuing an extended game loop can be made different every time the extended game loop is formed, making it possible to increase variations in the progress of a game.

Further, in the gaming machine according to another aspect of the present invention, the controller further executes a processing operation of (4-1) alleviating the first transfer condition in the free game to be first executed when transfer from the base game to the free game is realized.

Immediately after transfer to a free game, a first transfer condition is alleviated, thus easily enabling transfer to a bonus game, making it possible to increase an opportunity of imparting a profit to a player by means of bonus game.

In the gaming machine according to another aspect of the present invention, the controller further executes a processing operation of (5-1) executing the free game to be first executed when transfer from the base game to the free game is realized, until the first transfer condition is established.

If transfer to a free game is established, transfer to a bonus game is always enabled, thus making it possible to increase an opportunity of imparting a profit to a player by means of bonus game.

A possibility that a player obtains a profit can be increased by forming an extended game loop, thus making it possible to impart a motivation of attempting to continue a game to a player. In addition, in a case where rendering processing is also executed in parallel with a bonus game, it becomes possible to provide a rendering that a story gradually extends together with the bonus game.

BRIEF DESCRIPTION OF THE DRAWINGS

FIG. 2A is a view showing a 1-1st functional flowchart of the gaming machine according to the embodiment of the present invention;

FIG. 2B is a view showing a 1-2nd functional flowchart of the gaming machine according to the embodiment of the present invention;

FIG. 2C is a view showing a second functional flowchart of the gaming machine according to the embodiment of the present invention;

FIG. 2N is a view showing a seventh functional flowchart of the gaming machine according to the embodiment of the present invention;

FIG. 2O is a view showing an eighth functional flowchart of the gaming machine according to the embodiment of the present invention;

FIG. 5 is a view showing a symbol table for base game;

FIG. 7 is a table showing symbol combinations of the gaming machine according to the embodiment of the present invention;

FIG. 29 is a table showing a relationship among a benefit game, a functional flowchart, a free game, and a bonus game.

DESCRIPTION OF THE PREFERRED EMBODIMENTS

Hereinafter, exemplary embodiments of the present invention will be described with reference to the drawings.

Figure 1:
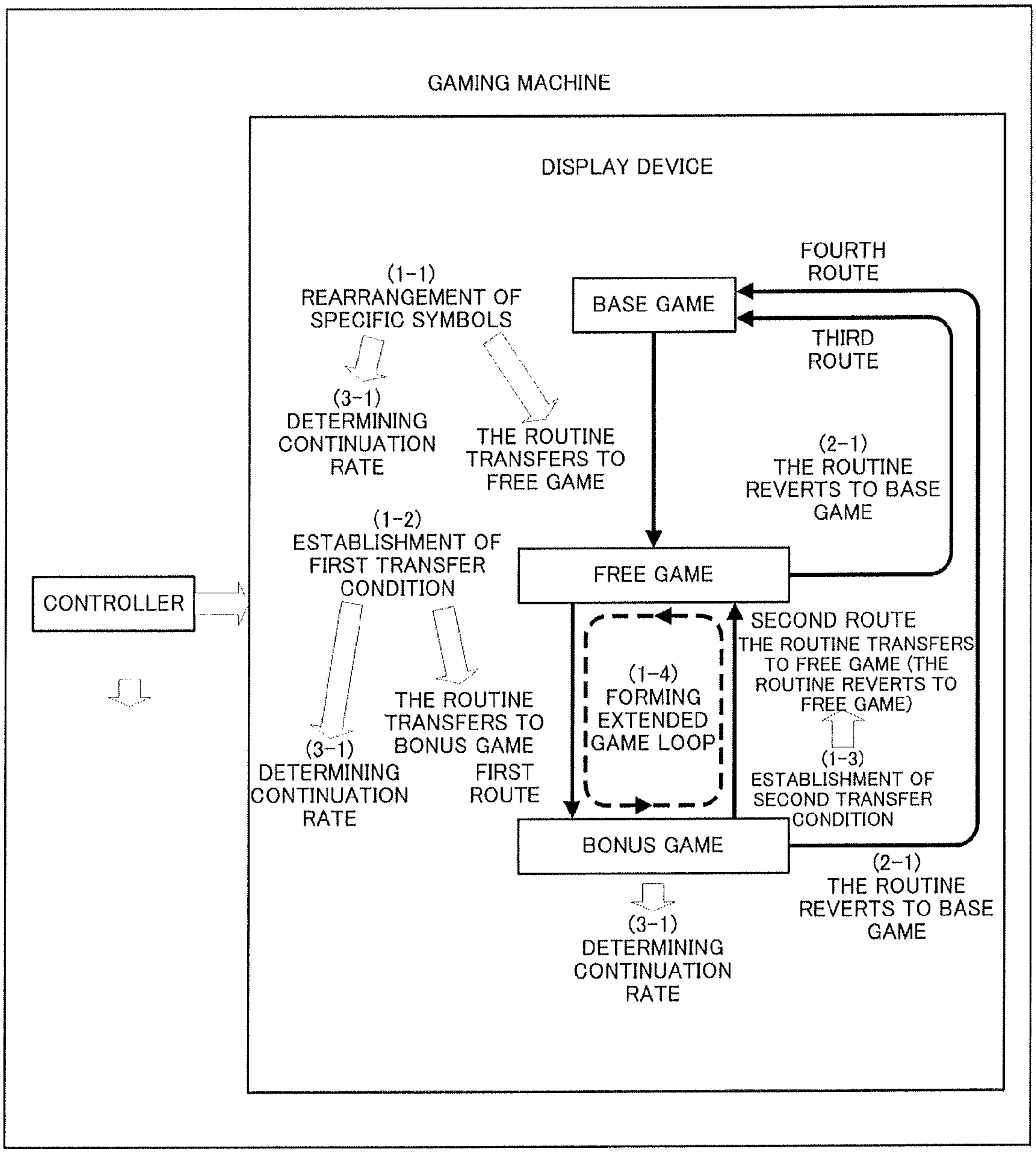
FIG. 1 is a view showing a schematic diagram of a configuration of a gaming machine according to an embodiment of the present invention.

A general description of a gaming machine according to an embodiment of the present invention will be given below. FIG. 1 is a view showing a schematic view of a configuration of the gaming machine according to the embodiment of the present invention.

The gaming machine according to the embodiment of the present invention includes: a display device having a plurality of regions in which a plurality of symbols are arranged (such as a lower image display panel 141 to be described later, for example); and a controller for controlling: a base game in which a predetermined prize can be determined according to rearrangement of the plurality of symbols, a free game in which a predetermined prize can be determined according to rearrangement of the plurality of symbols by playing at least one unit game without betting a gaming medium, and a bonus game in which a prize higher than the predetermined prize can be determined, the controller (such as a motherboard 70 to be described later, for example) being programmed to execute processing operations of: (1-1) transferring from the base game to the free game, as triggered by establishment of a condition for rearranging specific symbols from among the plurality of symbols in the base game (such as steps S19 and S20 in FIG. 8 to be described later, for example); (1-2) transferring to the bonus game, as triggered by establishment of a first transfer condition in a predetermined unit game in the free game (such as step S1833 in FIG. 18, step S2127 in FIG. 21, step S2435 in FIG. 24, or step S2529 in FIG. 25 to be described later, for example); (1-3) transferring to the free game, as triggered by establishment of a second transfer condition in the bonus game (such as step S1925 in FIG. 19, step S2027 in FIG. 20, step S2219 in FIG. 22, step S2319, S2323, or S2325 in FIG. 23, step S2627 in FIG. 26, step S2729 in FIG. 27, or step S2841 in FIG. 28 to be described later, for example); (1-4) forming and executing an extended game loop in which the free game and the bonus game enter an extended game, in accordance with the processing operation of (1-2) and the processing operation of (1-3) (such as "Return" processing in FIG. 19, "Return" processing in FIG. 20, "B" processing in FIG. 22, "Return" processing in FIG. 23, "B" processing in FIG. 26, "B" processing in FIG. 27, or "B" processing in FIG. 28 to be described later, for example); and (1-5) generating the extended game loop at a predetermined continuation rate (such as step S1811 in FIG. 18, step S2411 in FIG. 24, or step S2511 in FIG. 25, for example).

The gaming machine according to the embodiment of the present invention includes a display device and a controller. The display device has a plurality of regions in which a plurality of symbols are arranged. The plurality of symbols are displayed on the display device in a moving manner and then are displayed on the display device in a stopped manner, and are rearranged in the plurality of regions of the display device. A unit game is configured in accordance with start of movement to rearrangement of the plurality of symbols. The display device may be the one (so called video reels) on which a plurality of symbols are displays as an image or may be the one (so called mechanical reels) having a plurality of spinning reels on which a plurality of symbols are arranged. In any case, a plurality of symbols may be rearranged after being moved along a predetermined scroll line.

The controller controls a base game, a free game, and a bonus game. In the base game, it is preferable that at least one unit game be playable. The base game is a game in which a predetermined prize to be awarded to a player is determined according to a combination or arrangement of symbols that have been rearranged in the unit game. In the free game as well, it is preferable that at least one unit game be playable. The free game is a game in which a predetermined prize can be determined according to rearrangement of a plurality of symbols by playing at least one unit game without betting a gaming medium. The bonus game is a game in which a prize that is higher than a predetermined prize in the base game can be determined.

In the embodiment, free games 1 to 4 to be described later each correspond to a "free game". In addition, in the embodiment, extended bonus games 1 to 7 to be described later correspond to a "bonus game".

The controller is programmed to execute the processing operations of (1-1) to (1-5) described below.

The processing operation of (1-1) is a processing operation of transferring from a base game to a free game, as triggered by establishment of a predetermined transfer condition. The predetermined transfer condition is that a condition for rearranging specific symbols from among the plurality of symbols in the base game.

The processing operation of (1-2) is a processing operation of transferring from a free game to a bonus game, as triggered by establishment of a first transfer condition. In the free game, at least one unit game can be played, thus providing at least one opportunity that the first transfer condition may be established.

It is preferable that the processing operation of (1-2) include processing operations of: (1-2-1) outputting a control signal for providing a display associated with the establishment of the first transfer condition on the display device as triggered by the first transfer condition in the free game; and (1-2-2) concurrently with the processing operation of (1-2-1), outputting the control signal for providing a display associated with the bonus game to the display device and then transferring from the free game to the bonus game.

The processing operation of (1-3) is a processing operation of transferring from a bonus game to a free game, as triggered by establishment of a second transfer condition. The bonus game may be a game in which there is a possibility that a prize higher than a predetermined prize in a base game can be determined. Further, it is preferable that the bonus game be a game in which there is a possibility that a prize higher than a predetermined prize in the free game can be determined. In accordance with the processing operation of (1-3), it is possible to return from the bonus game to the free game.

It is preferable that the processing operation of (1-3) include processing operations of: (1-3-1) subsequent to the processing operation of (1-2), as triggered by establishment of a second transfer condition that is different from the first transfer condition in the bonus game, outputting a control signal for providing a display associated with the establishment of the second transfer condition to the display device; and (1-3-2) concurrently with the processing operation of (1-3-1), outputting a control signal for providing a display associated with the free game to the display device and then transferring from the bonus game to the free game.

The processing operation of (1-4) is a processing operation of forming an extended game loop in which a free game and a bonus game enter extended games, in accordance with the processing operation of (1-2) and the processing operation of (1-3). The extended game loop is formed by transferring from the free game to the bonus game and then transferring from the bonus game to the free game again. That is, the extended game loop is a loop that is capable of at least one reciprocal transfer between the bonus game and the free game. Preferably, the extended game loop is a loop that is capable of continuously performing reciprocal transfers between the bonus game and the free game a plurality of times.

The processing operation of (1-5) is a processing operation of generating the extended game loop at a predetermined continuation rate. The extended game loop disappears with a predetermined timing after the loop has taken place. For example, the extended game loop disappears as triggered by the fact that a predetermined completion condition has been met. A continuation period from generation to disappearance of the extended game loop is determined by the continuation rate. The continuation rate corresponds to the number of repetitions of transfer between a buns game and a free game, that is, the number of formations of extended game loop (the number of extended game loops) or the like, for example. A high continuation rate indicates a tendency that the extended game loop continues for a long period of time, or alternatively, a low continuation rate indicates a tendency that the extended game loop continues for only a short period of time. The processing operation of (1-5) is a processing operation of determining the continuation rate.

By forming the extended game loop, a possibility that a player obtains a profit can be increased, thus making it possible to impart a motivation of attempting to continue a game to a player. In addition, in a case where rendering processing is also executed in parallel with the processing operation of (1-3), it is possible to provide a rendering that a story gradually extends together with execution of the processing operation of (1-3). For example, in the lower image display panel 141 to be described later, an extended game loop is formed by repeatedly executing a bonus game and a free game, and as the number of extended game loops increases, a rendering can be performed in such a manner that a battle between characters gradually extends in an upper image display panel 131 to be described later. By performing such a rendering, for example, when a rendering has been made in such a manner that a main character tends to win, a sense of expectation that the extended game loop may further continue can be imparted to a player. For example, by showing such a rendering to other players (so called gallery) around a gaming machine, it is possible to easily visually recognize an almost extended state or an extended state, and it is possible to show entertainment of the gaming machine.

Further, by forming an extended game loop, a bonus game and a free game can be executed a plurality of times, a possibility of winning a bonus or the like can be made close to a designed value, a so called ball generation rate can be adjusted, and a degree of freedom in playing a game can be increased.

Figure 18:
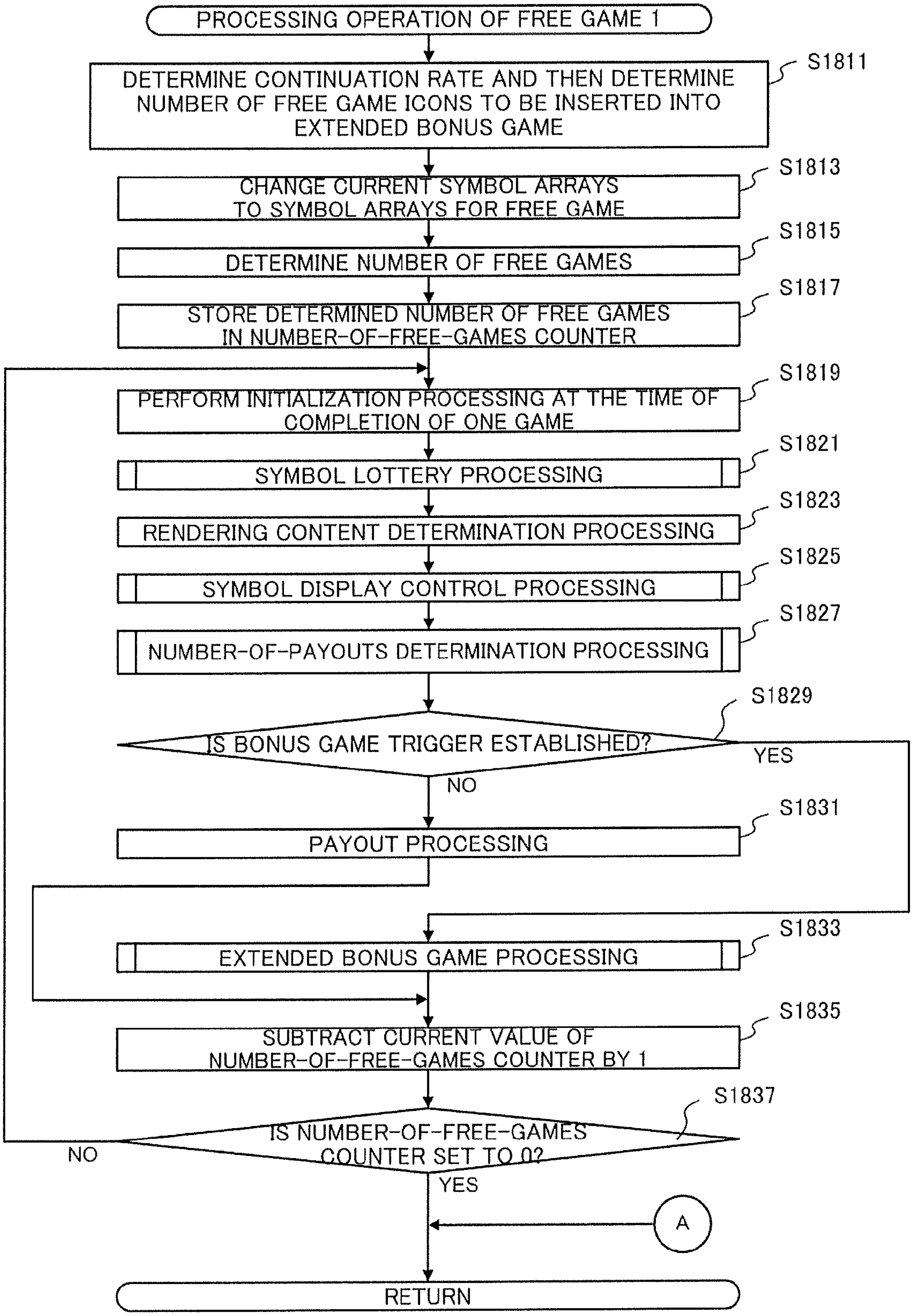
FIG. 18 is a flowchart showing a subroutine of a processing operation of a free game 1 to be invoked and executed in the processing operation of step S1613 in FIG. 16.
Figure 20:
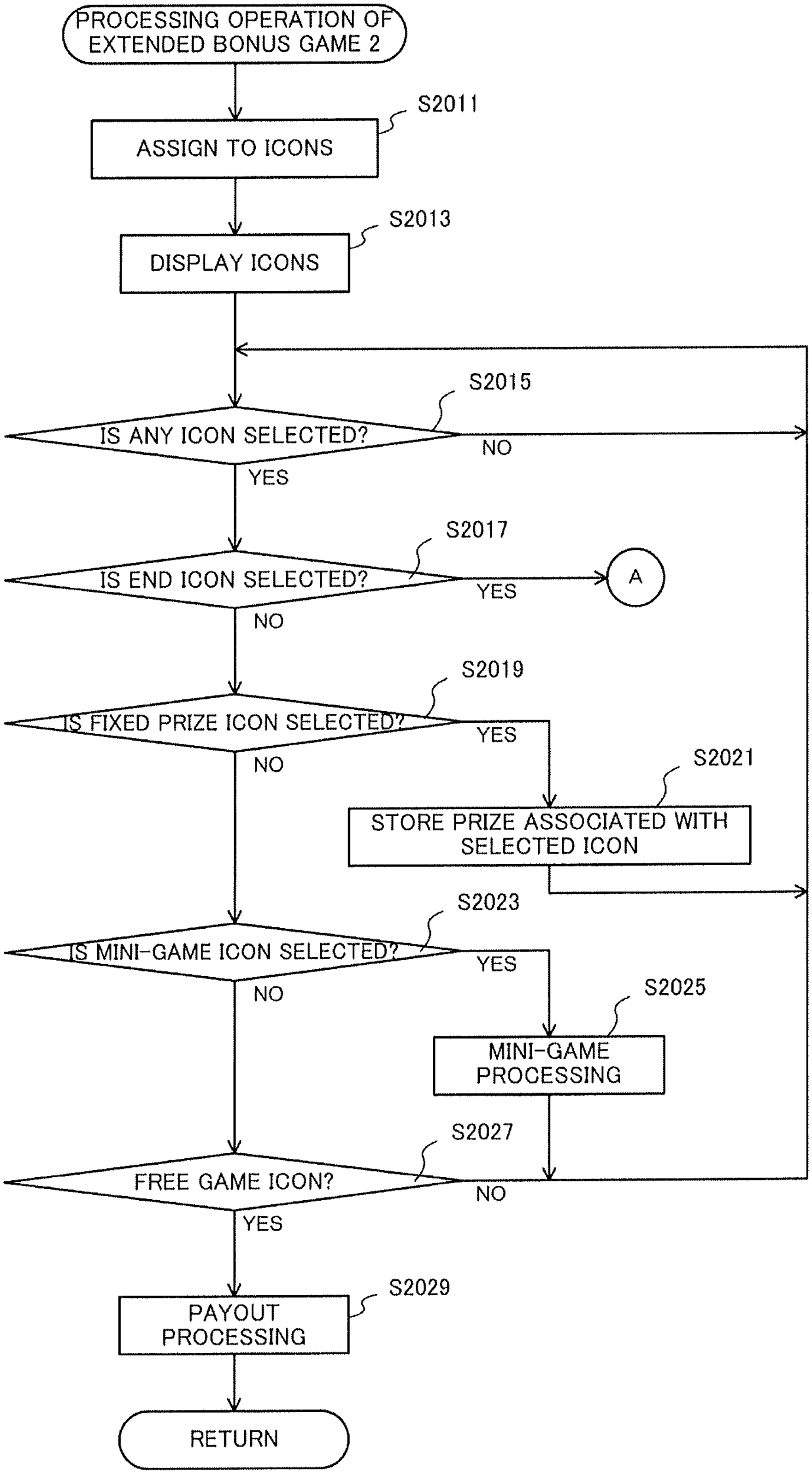
FIG. 20 is a flowchart showing a subroutine of a processing operation of an extended bonus game 2 to be invoked and executed in the processing operation of step S1833 in FIG. 18.
Figure 21:
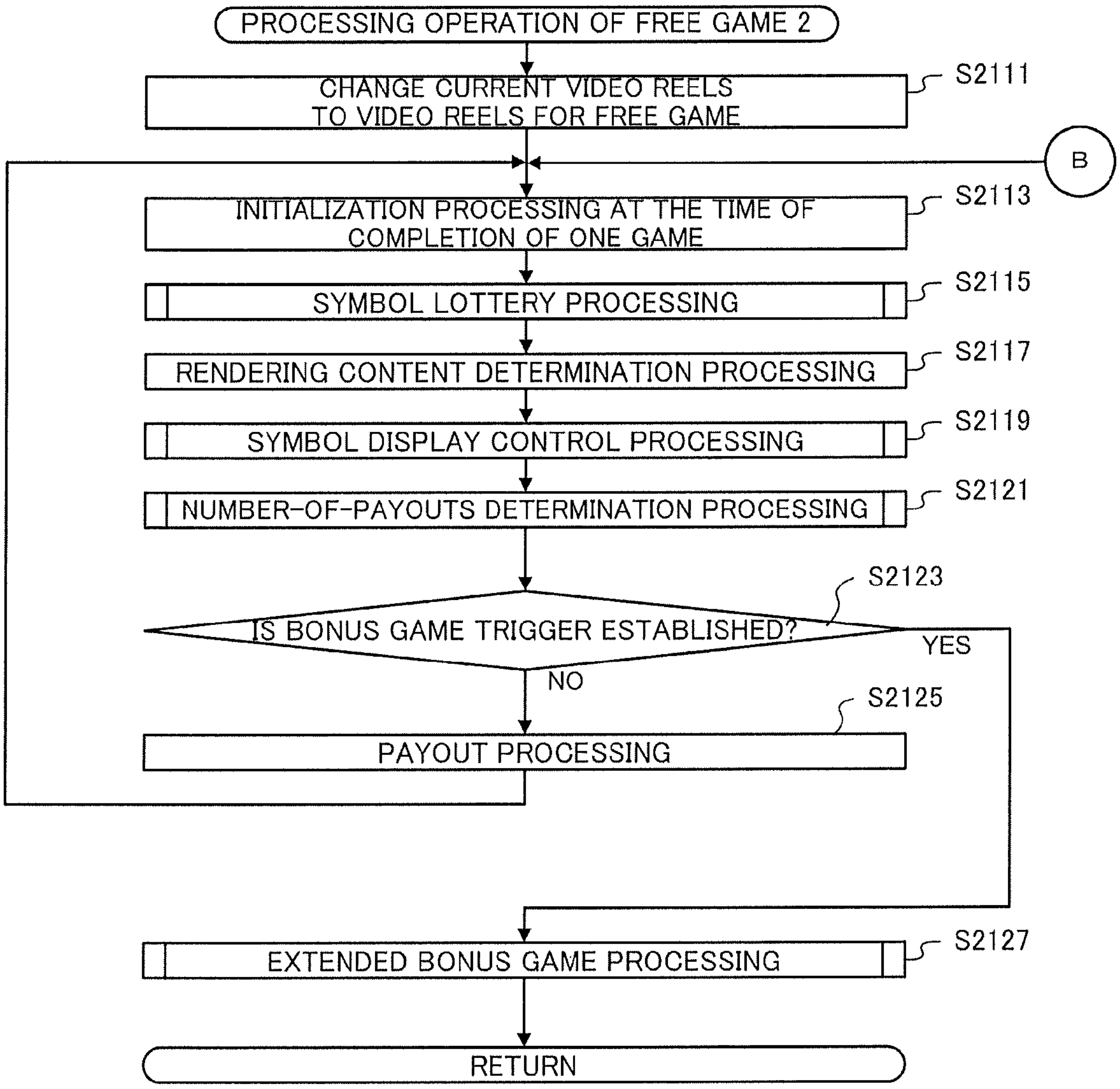
FIG. 21 is a flowchart showing a subroutine of a processing operation of a free game 2 to be invoked and executed in the processing operation of S1613 in FIG. 16.
Figure 22:
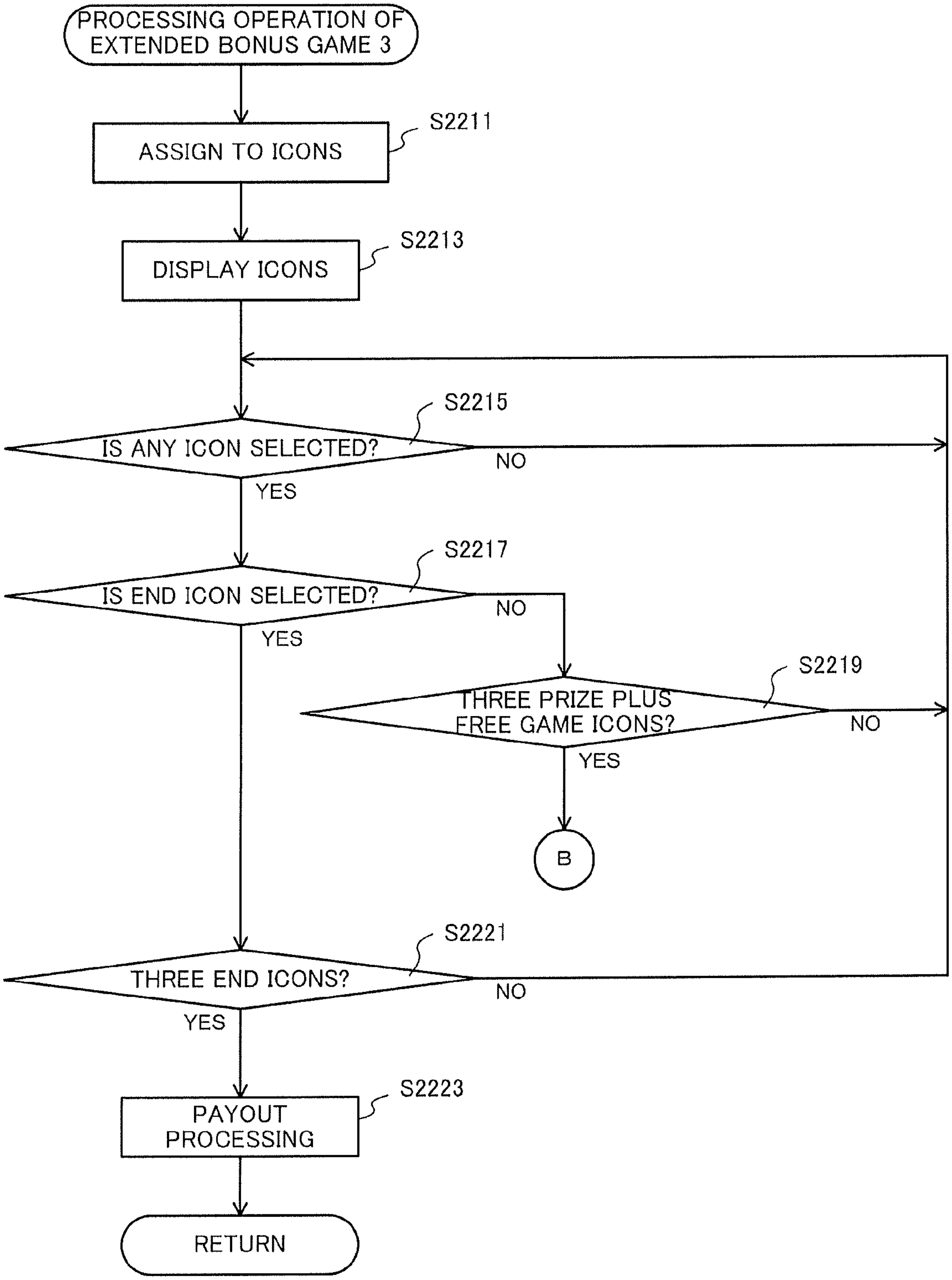
FIG. 22 is a flowchart showing a subroutine of a processing operation of an extended bonus game 3 to be invoked and executed in the processing operation of step S2127 in FIG. 21.
Figure 24:
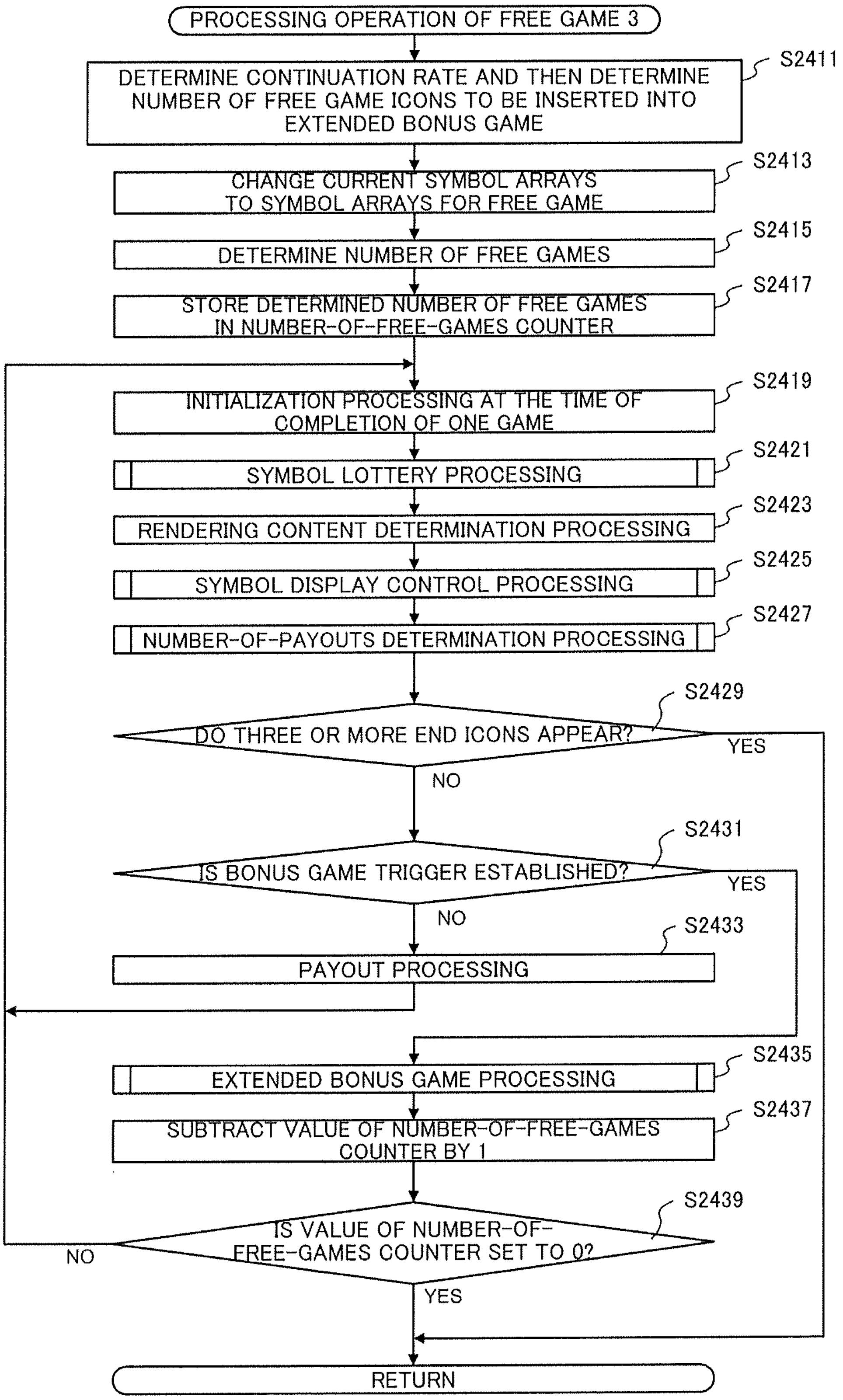
FIG. 24 is a flowchart showing a subroutine of a processing operation of a free game 3 to be invoked and executed in the processing operation of step S1613 in FIG. 16.
Figure 25:
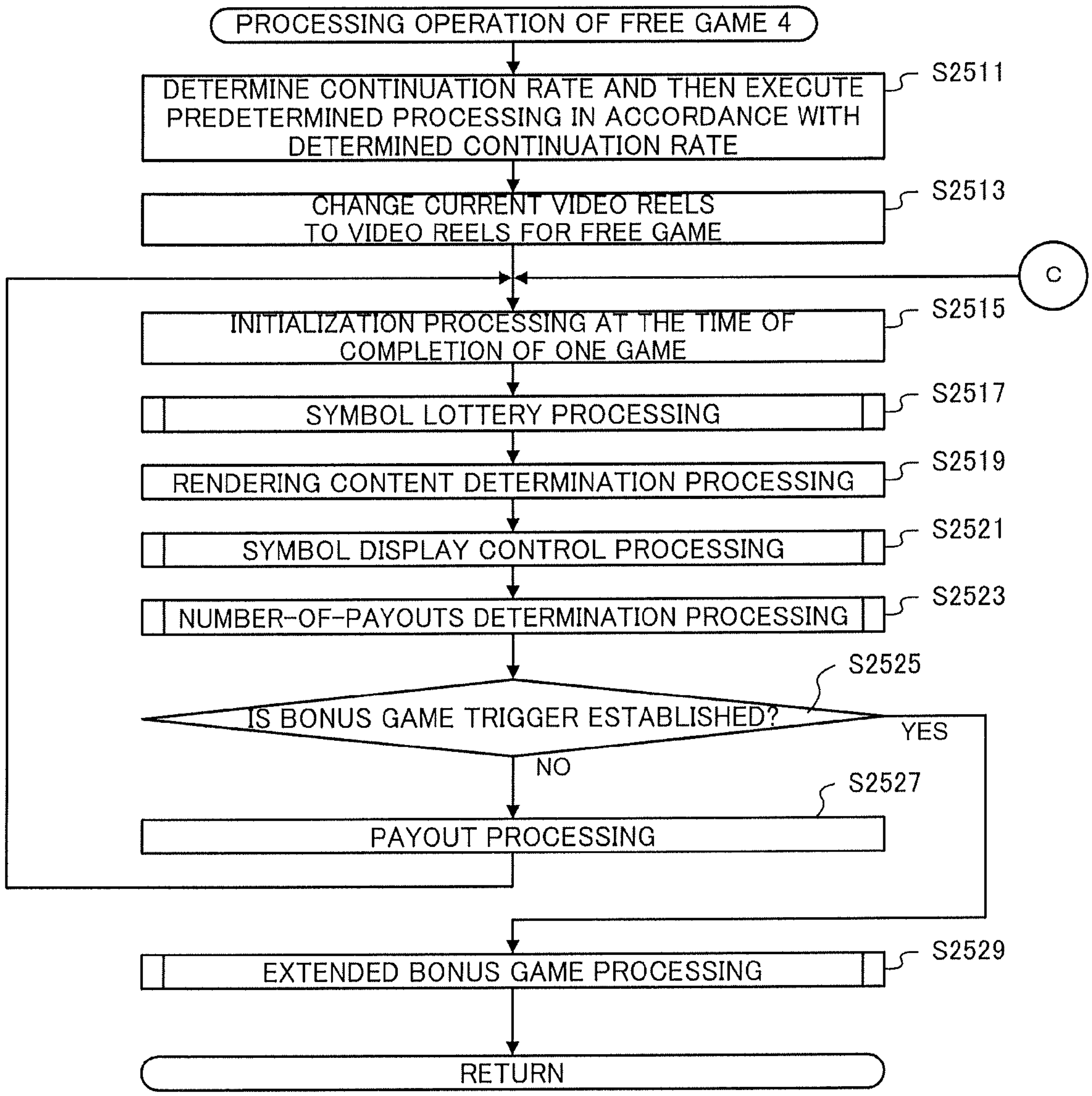
FIG. 25 is a flowchart showing a subroutine of a processing operation of a free game 4 to be invoked and executed in the processing operation of step S1613 in FIG. 16.
Figure 26:
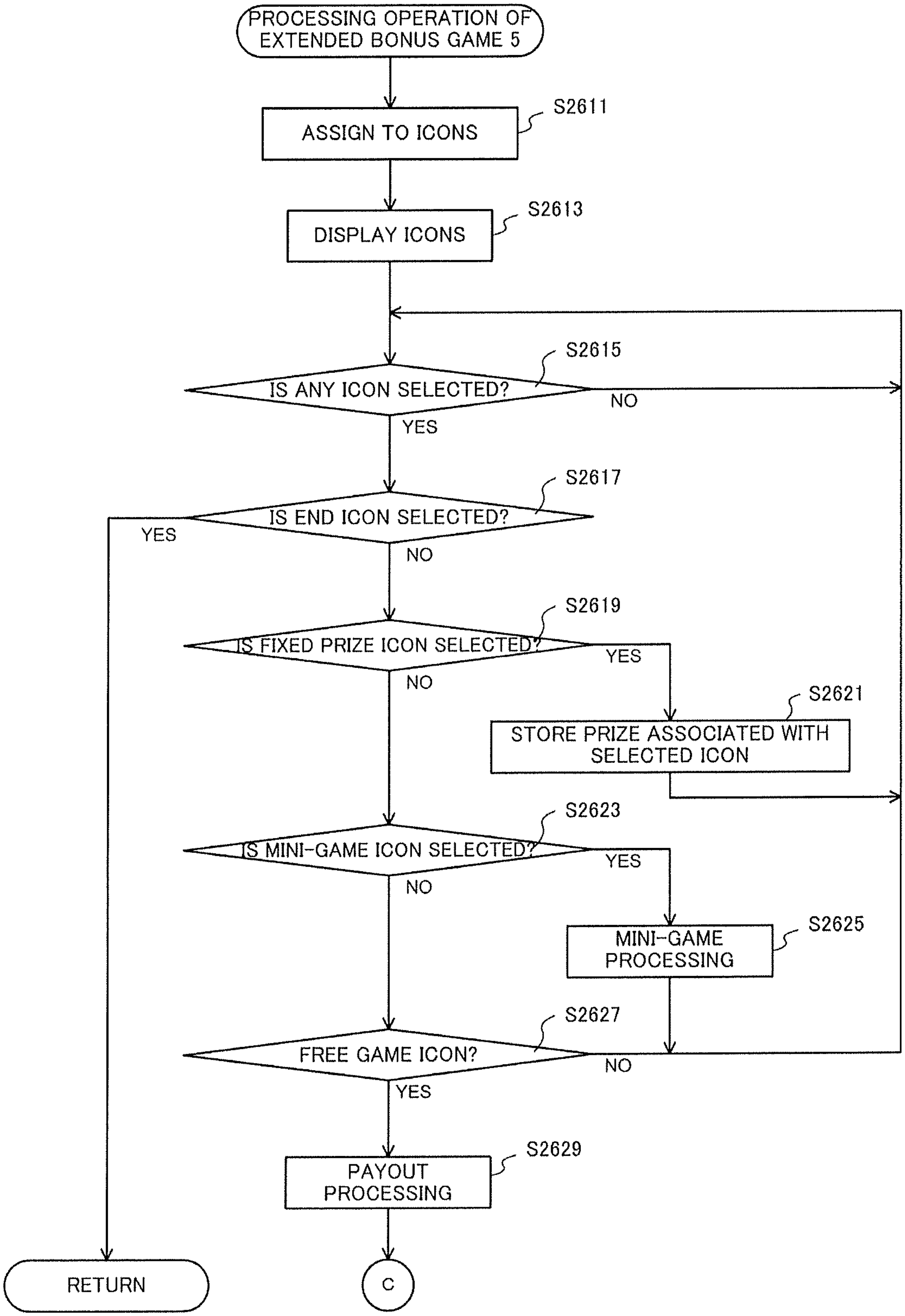
FIG. 26 is a flowchart showing a subroutine of a processing operation of an extended bonus game 5 to be invoked and executed in the processing operation of step S2529 in FIG. 25.
Figure 27:
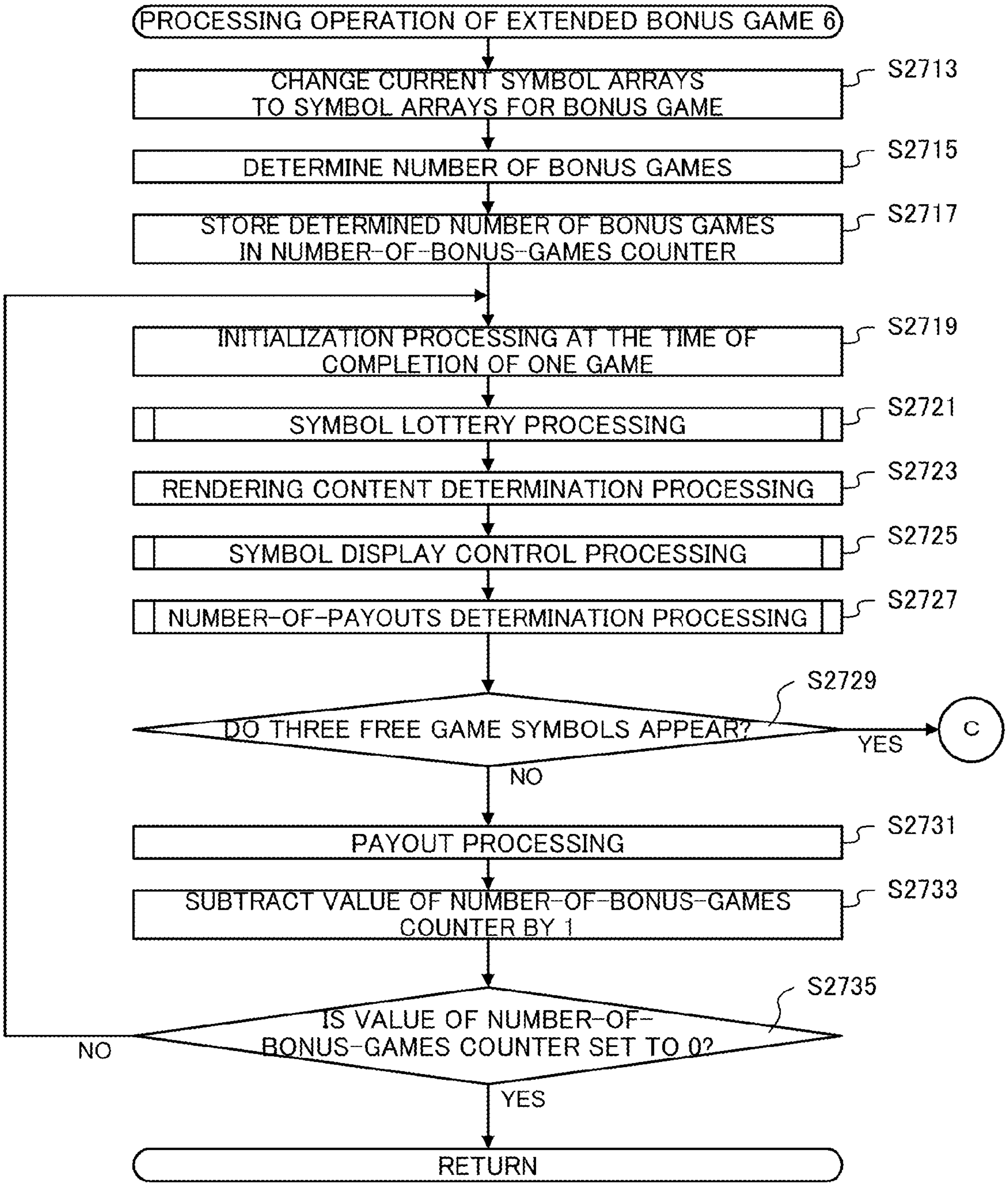
FIG. 27 is a flowchart showing a subroutine of a processing operation of an extended bonus game 6 to be invoked and executed in the processing operation of step S2529 in FIG. 25.
Figure 28:
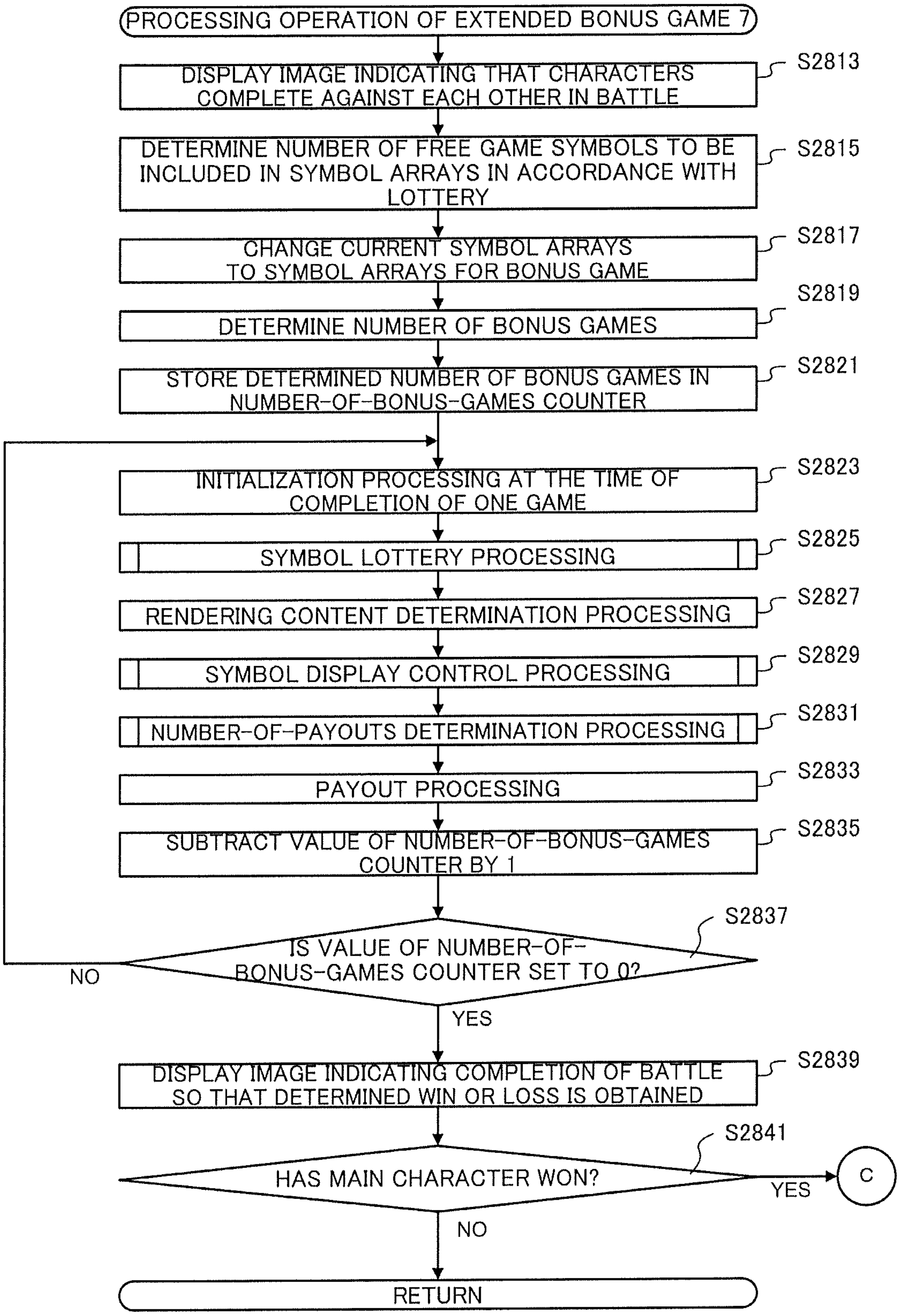
FIG. 28 is a flowchart showing a subroutine of a processing operation of an extended bonus game 7 to be invoked and executed in the processing operation of step S2529 in FIG. 25.

In addition, with the gaming machine according to the embodiment of the present invention, it is preferable that the controller further execute a processing operation of (2-1) transferring from the free game or the bonus game, as triggered by establishment of a completion condition in at least one game of the free game and the bonus game (such as "Return" processing in FIG. 18, "A" processing in FIG. 20, "Return" processing in FIG. 21, "Return" processing in FIG. 22, "Return" processing in FIG. 24, "Return" processing in FIG. 25, "Return" processing in FIG. 26, "Return" processing in FIG. 27, or "Return" processing in FIG. 28 to be described later, for example).

When a free game or bonus game completion condition is established, the routine transfers to a base game, so that a profit of gaming facility such as casino can also be ensured as well as imparting a profit to a player, and a balance in profit between the gaming facility and the player can be maintained.

Further, with the gaming machine according to the embodiment of the present invention, it is preferable that the controller execute a processing operation of (3-1) determining the predetermined continuation rate as triggered by establishment of a condition for rearranging a specific symbol from among the plurality of symbols in the base game, as triggered by establishment of the first transfer condition, or when the bonus game is executed (such as step S1811 in FIG. 18, step S2411 in FIG. 24, or step S2511 in FIG. 25 to be described later, for example).

The continuation rate is determined in accordance with the processing operation of (3-1), so that the easiness of continuing an extended game loop can be made different every time the extended game loop is realized, making it possible to increase variations in the progress of a game.

Furthermore, with the gaming machine according to the embodiment of the present invention, it is preferable that the controller further execute a processing operation of (4-1) alleviating a first transfer condition in the free game to be first executed when the routine transfers from the base game to the free game (such as step S1811 in FIG. 18, S2411 in FIG. 24, or step S2511 in FIG. 25 to be described later, for example).

Immediately after transfer to a free game, a first transfer condition is alleviated, so that transfer to a bonus game can be easily realized, and an opportunity of imparting a profit to a player by means of bonus game can be increased.

In addition, with the gaming machine according to the embodiment of the present invention, it is preferable that the controller further execute a processing operation of (5-1) executing the free game to be first executed when the routine transfers from the base game to the free game until a first transfer condition is established (such as a processing operation of a free game 2 shown in FIG. 21 to be described later, for example).

If transfer to a free game is established, transfer to a bonus game can always be realized, so that an opportunity of imparting a profit to a player by means of bonus game can be increased.

<<Continuation Rate>>

<Entry into an Extended Game Between Free Game and Extended Bonus Game>

If a free game trigger is established in a base game, entry (transfer) from the base game to a free game is established. If a bonus game trigger is established in the free game, transfer from the free game to an extended bonus game is established. If a return condition is established in the extended bonus game, return from the extended bonus game to the free game is established. By repeating reciprocation between the free game and the extended bonus game, entry into an extended game between the free game and the extended bonus game can be achieved. In this manner, transfer to the extended bonus game can be always realized via a free game without direct transfer from the base game to the extended bonus game.

When the routine transfers from a base game to a free game, lottery processing of continuation rate is executed. The easiness of entry into an extended game between the free game and the extended bonus game is determined according to the continuation rate. A high continuation rate indicates that the free game and the extended bonus game easily enter an extended game, or alternatively, a low continuation rate indicates that the free game and the extended bonus game hardly enter an extended game.

Thus, the games in the gaming machine of the embodiment include a base game, a free game, and an extended bonus game. In the embodiment, a combination of the free game and the extended bonus game may also be referred to as a "benefit game" or may be simply referred to as a "bonus game".

In a free game, when a predetermined completion condition is established, the routine reverts to a base game. Alternatively, in an extended bonus game, when a predetermined completion condition is established, the routine reverts to a base game. Return from a free game and return from an extended bonus game may be realized separately or in all.

As shown in FIG. 1, in a game played in the gaming machine according to the embodiment, the easiness of entry into an extended game is determined depending on the following four transfer routes. The four transfer routes are: (1) a route for transfer from a free game to an extended bonus game (a first route); (2) a route for transfer (return) from an extended bonus game to a free game (a second route); (3) a route for transfer (return) from a free game to a base game (a third route); and (4) a route for transfer (return) from an extended bonus game to a base game (a fourth route).

In a case where transfer in the first route can be easily realized, a possibility of entry into an extended game increases, or alternatively, in a case where transfer in the first route can be hardly realized, a possibility of entry into an extended game decreases. Similarly, in a case where transfer in the second route can be easily realized, a possibility of entry into an extended game increases, or alternatively, in a case where transfer in the second route can be hardly realized, a possibility of entry into an extended game decreases. In contrast, in a case where transfer in the third route can be easily realized, a possibility of entry into an extended game decreases, or alternatively, in a case where transfer in the third route can be hardly realized, a possibility of entry into an extended game increases. Similarly, in a case where transfer in the fourth route can be easily realized, a possibility of entry into an extended game decreases, or alternatively, in a case where transfer in the fourth route can be hardly realized, a possibility of entry into an extended game increases. Therefore, the possibility of entry into an extended game is defined in accordance with the easiness of transfer by way of the first route, the easiness of transfer by way of the second route, the easiness of transfer by way of the third route, and the easiness of transfer by way of the fourth route.

In a free game, there may be a case in which the routine transfers to an extended bonus game by way of the first route, or alternatively, a case in which the routine reverts to a base game by way of the third route. Therefore, if a possibility of transfer to an extended bonus game by way of the first route increases, a possibility of return to a base game by way of the third route decreases relatively. Conversely, if a possibility of transfer to an extended bonus game by way of the first route decreases, a possibility of return to a base game by way of the third route increases relatively.

In the free game, a condition for establishing a bonus game trigger (the first route) and a predetermined completion condition (the third route) are determined. Therefore, adjustment related to these two conditions makes it possible to define each of a possibility of transfer to an extended bonus game by way of the first route and a possibility of return to a base game by way of the third route.

In addition, in an extended bonus game, there may be a case in which the routine reverts to a free game by way of the second route, or alternatively, a case in which the routine reverts to a base game by way of the fourth route. Therefore, if a possibility of return to a free game by way of the second route increases, a possibility of return to a base game by way of the fourth route decreases relatively. Conversely, if a possibility of return to a free game by way of the second route decreases, a possibility of return to a base game by way of the fourth route increases relatively.

In the extended bonus game, a return condition (the second route) and a predetermined completion condition (the fourth route) are determined. Therefore, adjustment related to these two conditions makes it possible to define each of a possibility of return to a free game by way of the second route and a possibility of return to a base game by way of the fourth route.

A condition for establishing a bonus game trigger in a free game corresponds to a "first transfer condition", A return condition in an extended bonus game corresponds to a "second transfer condition".

<Continuation Rate and Game Transfer Condition>

A possibility of entry into an extended game can be defined by making adjustments related to each of a condition for establishing a bonus game trigger, a return condition in an extended bonus game, a predetermined completion condition in a free game, and a predetermined completion condition in an extended bonus game. In the embodiment, adjustments related to these establishment conditions or return conditions or free game and extended bonus game completion conditions can be achieved by changing an opportunity of determining the conditions without changing the conditions themselves or by changing and adjusting the conditions themselves. That is, increasing an opportunity of determining the conditions (such as number of determinations or frequency, for example) makes it possible to increase a possibility of transfer, or alternatively, decreasing an opportunity of determining the conditions makes it possible to decrease a possibility of transfer. In addition, it becomes possible to change a difficulty in transfer by changing the conditions for determination themselves as well.

As described later, in the gaming machine according to the embodiment, a plurality of continuation rates are predetermined. For example, four different continuation rates of 66%, 79%, 85% and 89% are predetermined. One of these continuation rates is determined in accordance with lottery processing to be executed when the routine transfers from a base game to a free game.

As described above, the easiness of entry into an extended game between a free game and an extended bonus game is determined according to the continuation rate. A variety of game conditions (hereinafter, referred to as game transfer conditions) related to a respective one of the condition for establishing a bonus game trigger, the return condition in an extended bonus game, a predetermined completion condition in a free game, and a predetermined completion condition in an extended bonus game may be adjusted in advance so that a predetermined continuation rate is established.

Further, with respect to each of the plurality of continuation rates, the game transfer conditions are adjusted and defined in advance so that the respective one of these continuation rate is established and then a correlation therebetween is stored in a storage device (such as a ROM, for example) of a gaming machine. When one continuation rate is determined in accordance with lottery processing, the game transfer condition corresponding to the determined continuation rate is read out and then a free game and an extended bonus game are executed. Doing this can achieve a free game and an extended bonus game that correspond to the continuation rate that is determined in accordance with the lottery processing.

<Return to Base Game>

As described above, return from a free game to a base game (the third route) and return from an extended bonus game to a base game (the fourth route) may be enabled separately or in all. In a case where the routine cannot return from a free game to a base game is disabled, the routine reverts from only an extended bonus game to a base game. That is, when the routine cannot return by way of the third route, the routine reverts to a base game by only the fourth route. Similarly, in a case where the routine reverts from an extended bonus game to a base game, the routine reverts from only a free game to a base game. That is, in a case where the routine cannot return by way of the fourth route, the routine reverts to a base game by way of only the third route. In this manner, modes of entry into an extended game can be diversified by defining the game transfer conditions according to the continuation rate, including a mode for return to a base game.

<Example of Return Condition in Extended Bonus Game>

A return condition in an extended bonus game will be described by way of example of case in which a selection bonus game is executed as an extended bonus game. The selection bonus game according to the embodiment is a game in which an image that is indicative of a plurality of icons is displayed on a display device, causing a player to select one of the plurality of icons, and which is to be played according to the contents assigned to the selected icon.

The plurality of contents are assigned to the plurality of icons that are employed in the selection bonus game. The same contents may be assigned in duplicate to the plurality of icons. The contents are a fixed prize, a mini-game, and a free game or the like. These contents are assigned to the plurality of icons by a predetermined number. When a player selects an icon to which a fixed prize is assigned (hereinafter, referred to as a fixed prize icon), the fixed prize is awarded to the player. In addition, when a player selects an icon to which a mini-game is assigned (hereinafter, referred to as a mini-game icon), a prize can be increased by playing that mini-game. Further, when a player selects an icon to which a free game is assigned (hereinafter, referred to as a free game icon), the routine transfers (returns) from a selection bonus game to a free game.

Determination of a return condition in an extended bonus game in this example is to determine whether or not a player selects a free game icon. Therefore, when a player selects a free game icon in a selection bonus game, a return condition in the extended bonus game is met. In addition, difficulty of the return condition in the extended bonus game is determined in accordance with the number of free game icons.

As described above, when a free game icon is selected, the routine transfers from a selection bonus game to a free game. Therefore, in a case where the number of free game icons is large, a possibility of transfer (return) to a free game increases, and a possibility that a free game and an extended bonus game (a selection bonus game) enter an extended game also increases. On the other hand, in a case where the number of free game icons is small, a possibility of transfer (return) to a fee game decreases, and a possibility that a free game and an extended bonus game (a selection bonus game) enter an extended game also decreases.

As described above, when the routine transfers from a base game to a free game, lottery processing of continuation rate is executed. The number of free game icons is predetermined in correspondence with each of a plurality of continuation rates. In a case where a high continuation rate is determined in accordance with a lottery result, a large number of free game icons is determined. In a case where a low continuation rate is determined in accordance with a lottery result, a small number of free game icons is determined.

By doing this, in a case where the continuation rate is high, the number of free game icons increases and then a possibility that a free game and an extended bonus game (a selection bonus game) enter an extended game increases. Alternatively, in a case where the continuation rate is low, the number of free game icons decreases and then a possibility that a free game and an extended bonus game (a selection bonus game) enter an extended game decreases. In this manner, a return condition in an extended bonus game can be adjusted while the number of free game icons is defined as a game transfer condition and then the easiness of transfer by way of the second route can be changed.

First to third benefit games to be and eighth to thirteenth benefit games to be described later include a case in which a selection bonus game is executed as an extended bonus game. In these benefit games, when the routine transfers from a base game to a free game, lottery processing of continuation rate is executed and then the number of free game icons is determined in accordance with the continuation rate. In this manner, in the first to third benefit games and the eighth to thirteenth benefit games, a possibility of entry into an extended game can be defined in accordance with the number of free game icons.

Figure 2D:
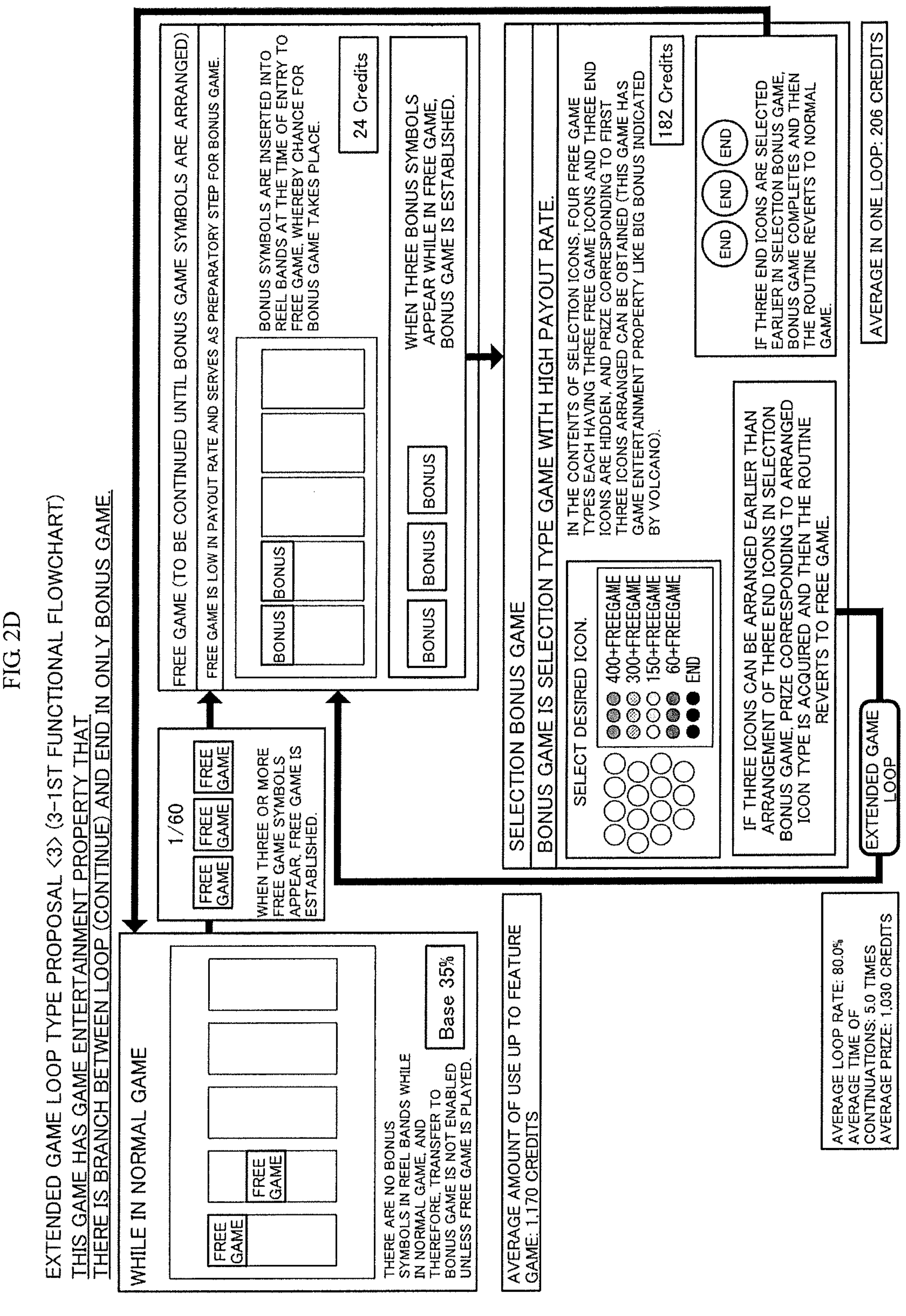
FIG. 2D is a view showing a 3-1st functional flowchart of the gaming machine according to the embodiment of the present invention.
Figure 2E:
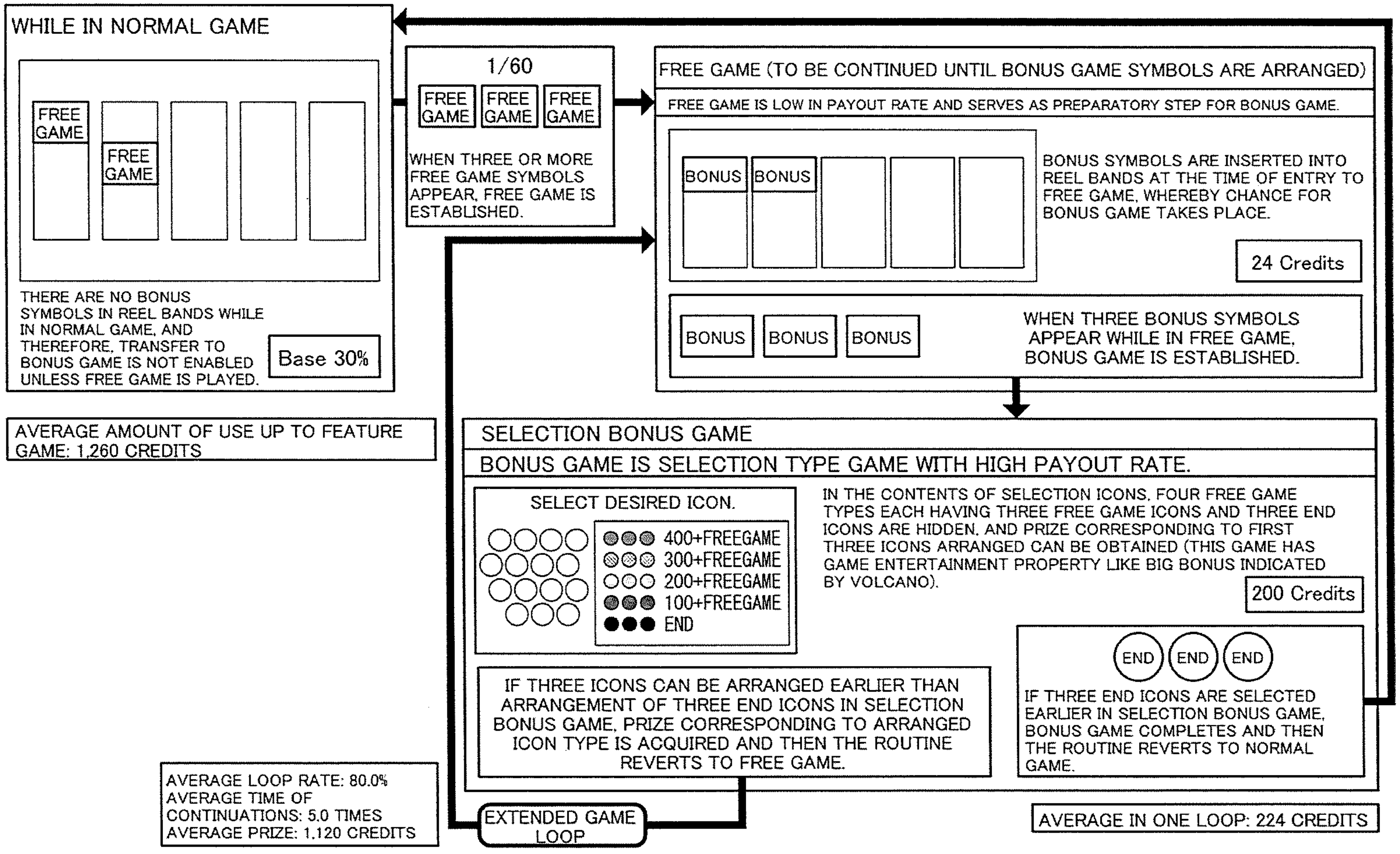
FIG. 2E is a view showing a 3-2nd functional flowchart of the gaming machine according to the embodiment of the present invention.
Figure 2F:
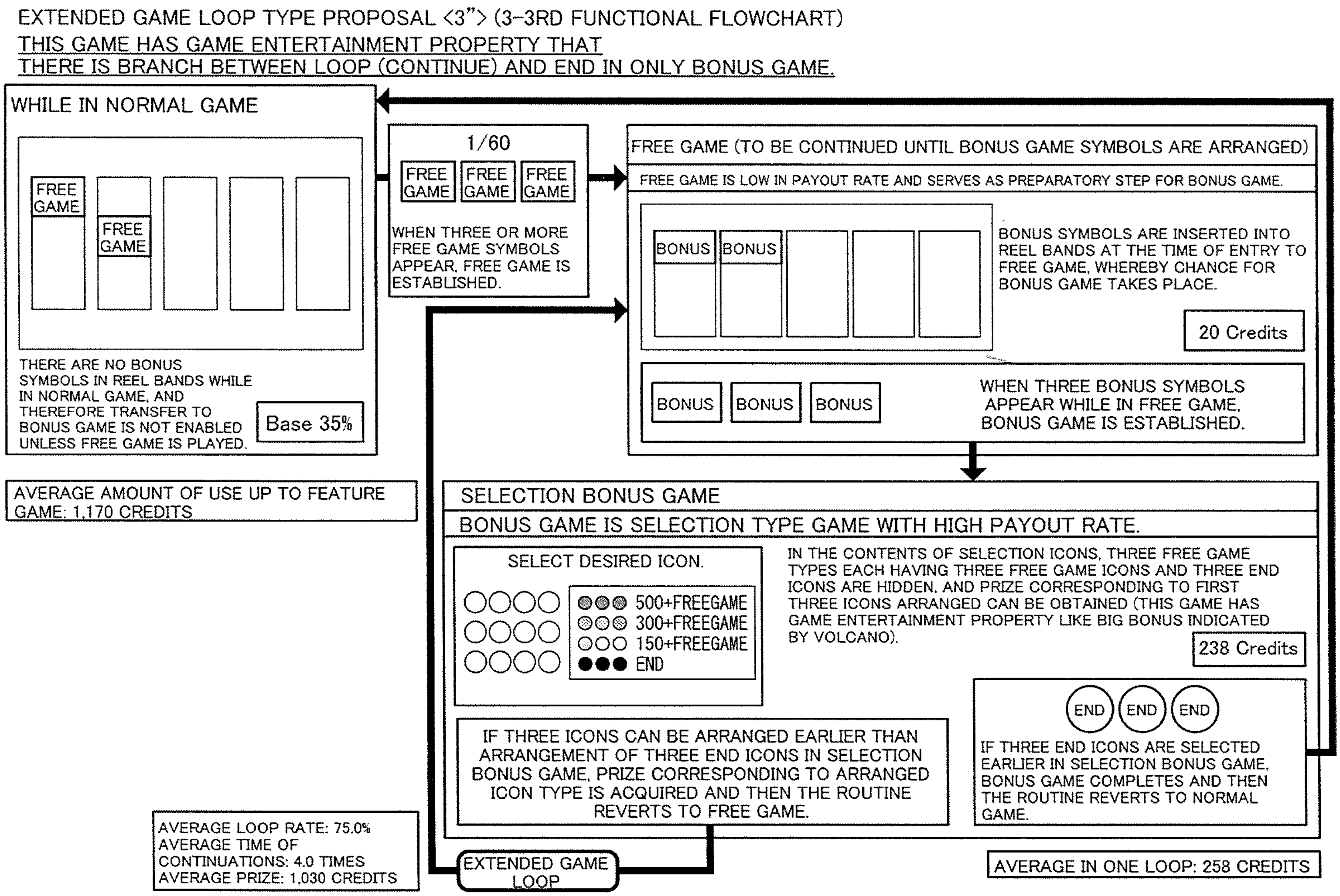
FIG. 2F is a view showing a 3-3rd functional flowchart of the gaming machine according to the embodiment of the present invention.
Figure 2G:
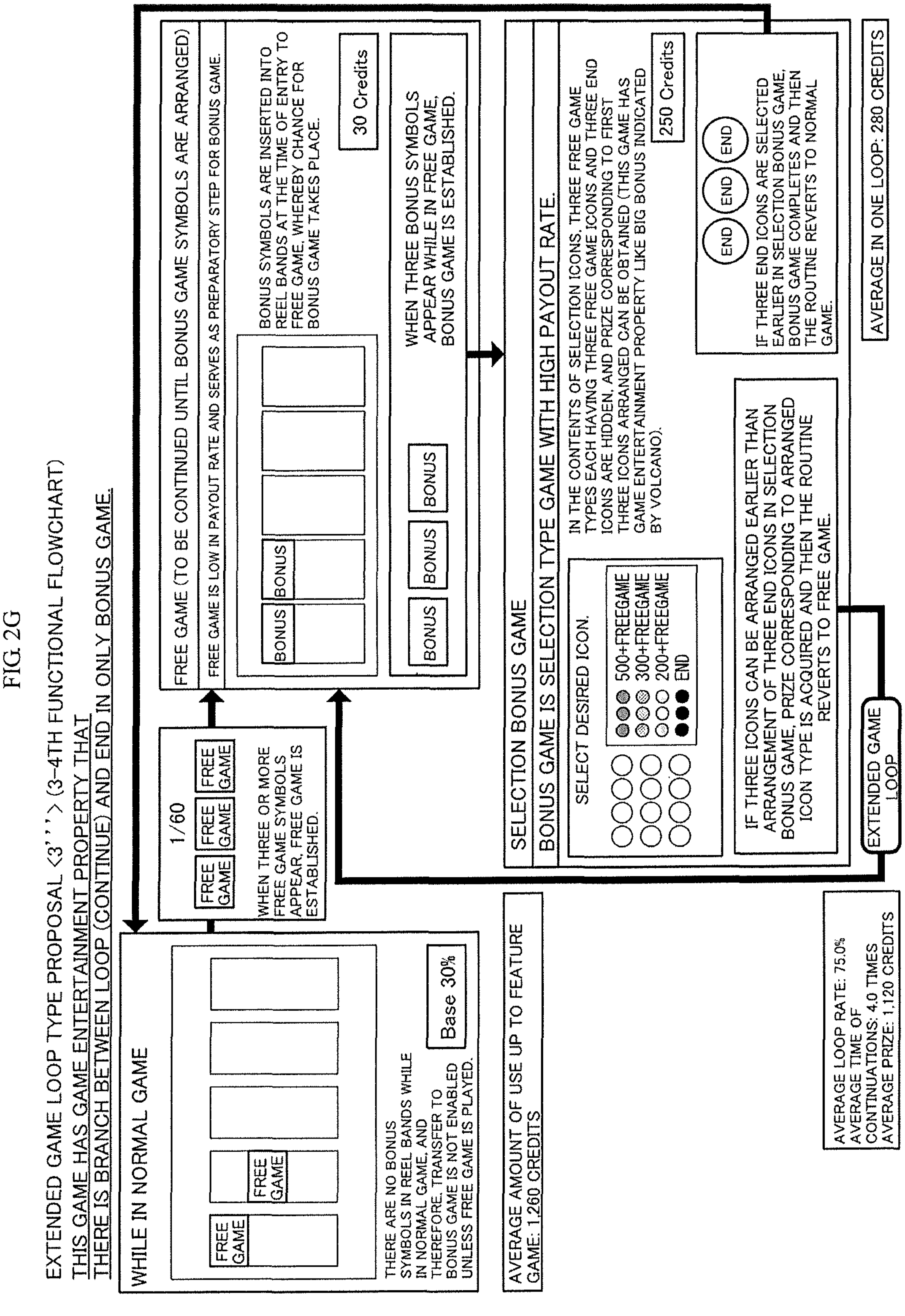
FIG. 2G is a view showing a 3-4th functional flowchart of the gaming machine according to the embodiment of the present invention.
Figure 2H:
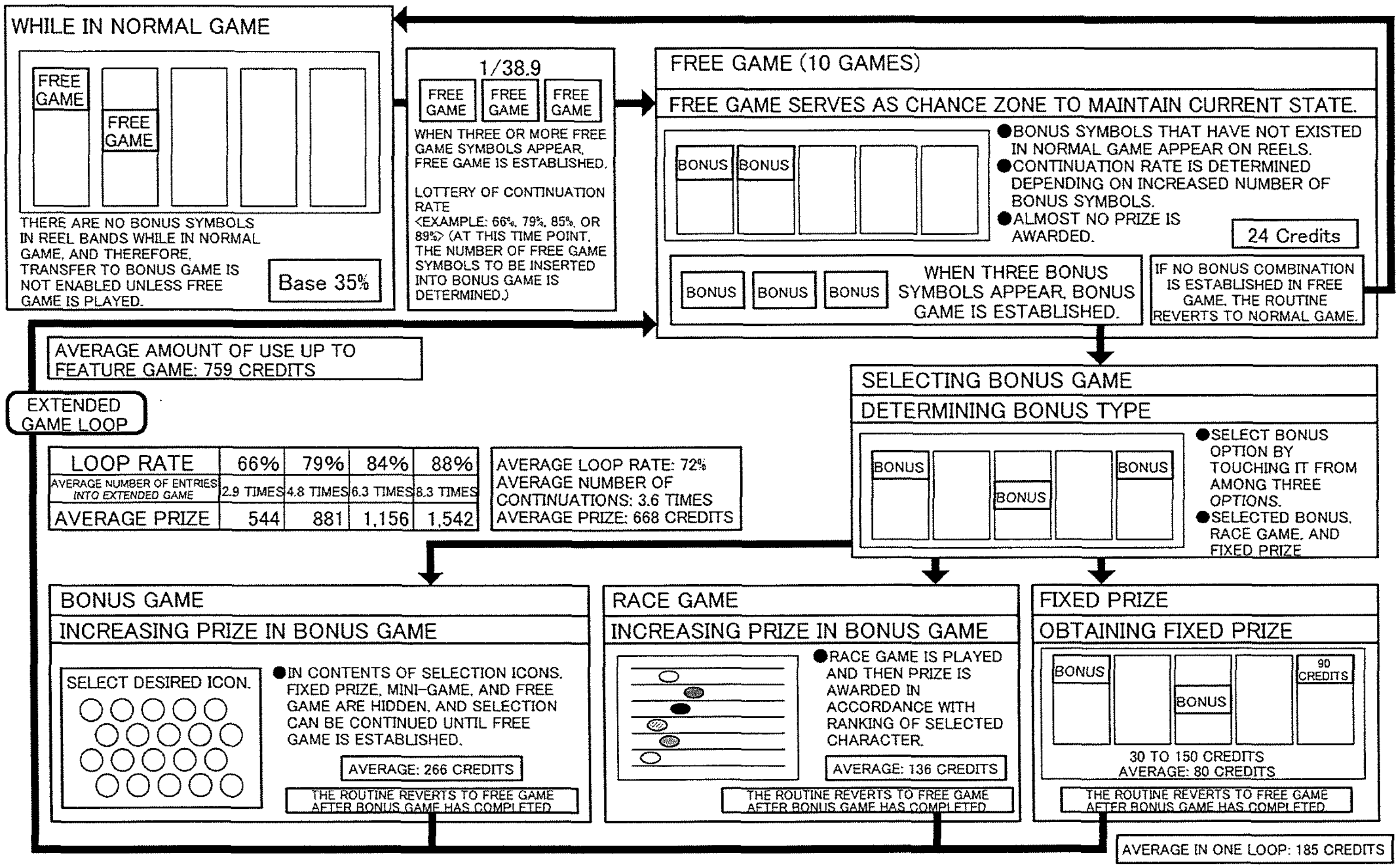
FIG. 2H is a view showing a 4-1st functional flowchart of the gaming machine according to the embodiment of the present invention.
Figure 2I:
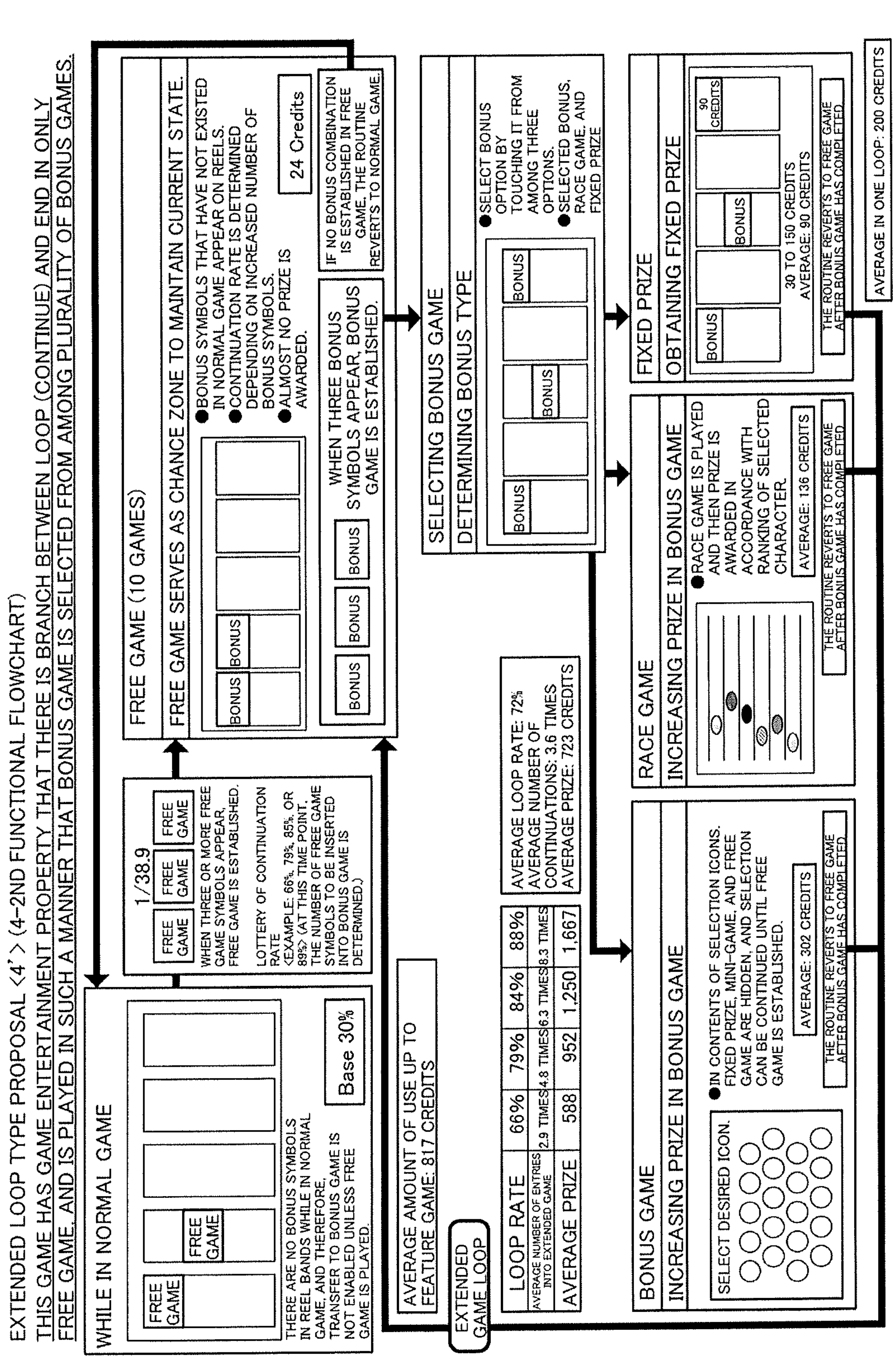
FIG. 2I is a view showing a 4-2nd functional flowchart of the gaming machine according to the embodiment of the present invention.
Figure 2J:
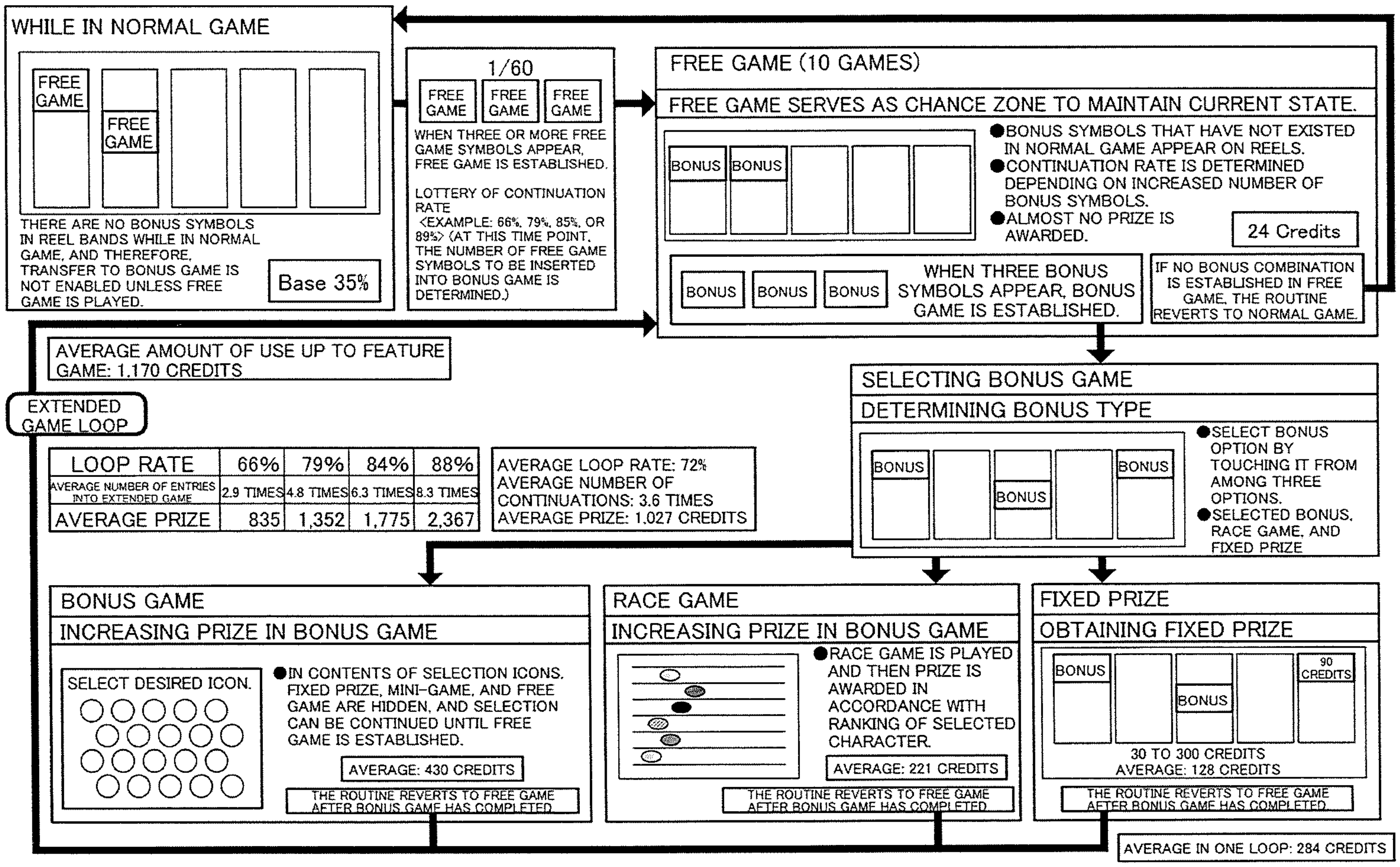
FIG. 2J is a view showing a 4-3rd functional flowchart of the gaming machine according to the embodiment of the present invention.
Figure 2K:
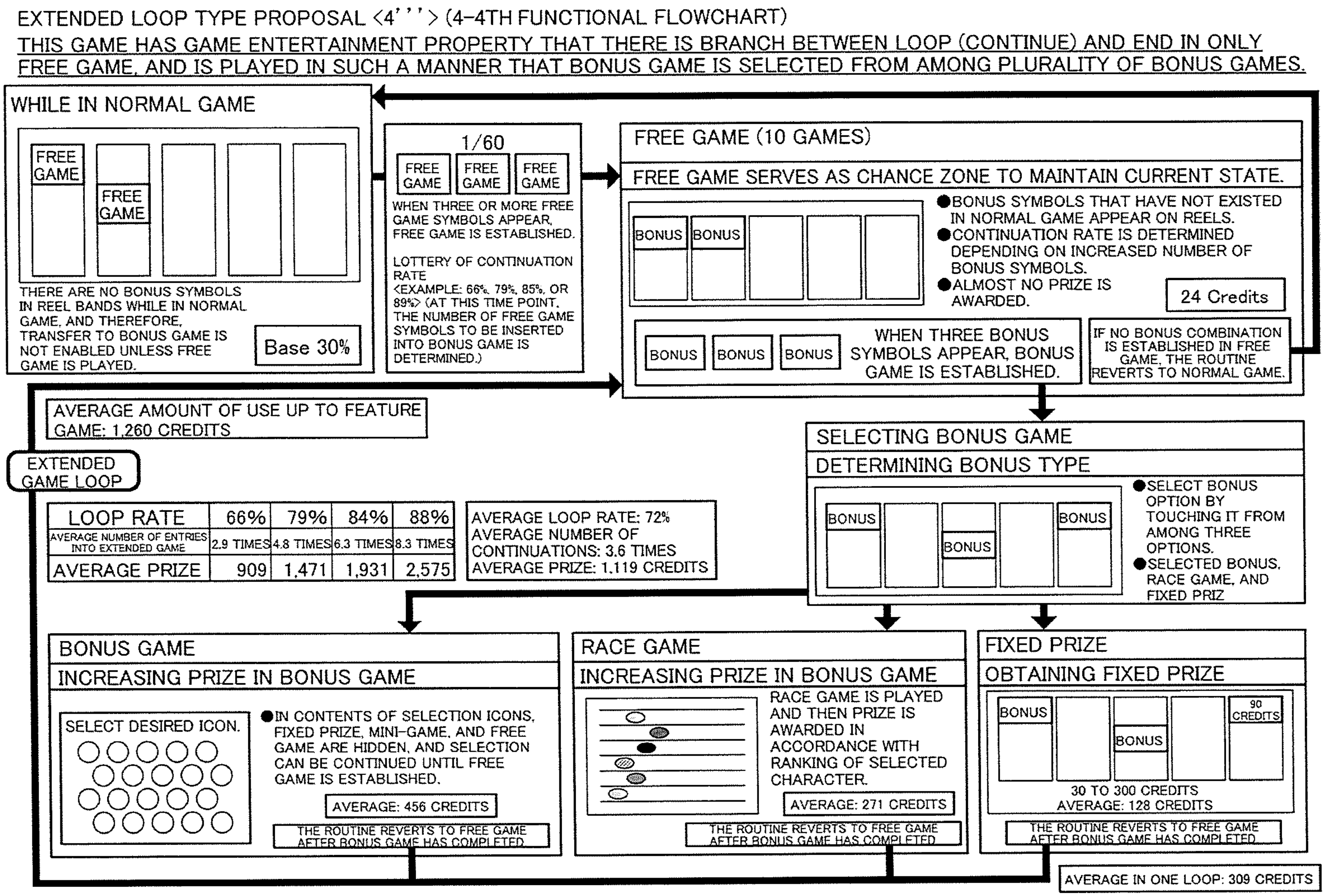
FIG. 2K is a view showing a 4-4th functional flowchart of the gaming machine according to the embodiment of the present invention.
Figure 2L:
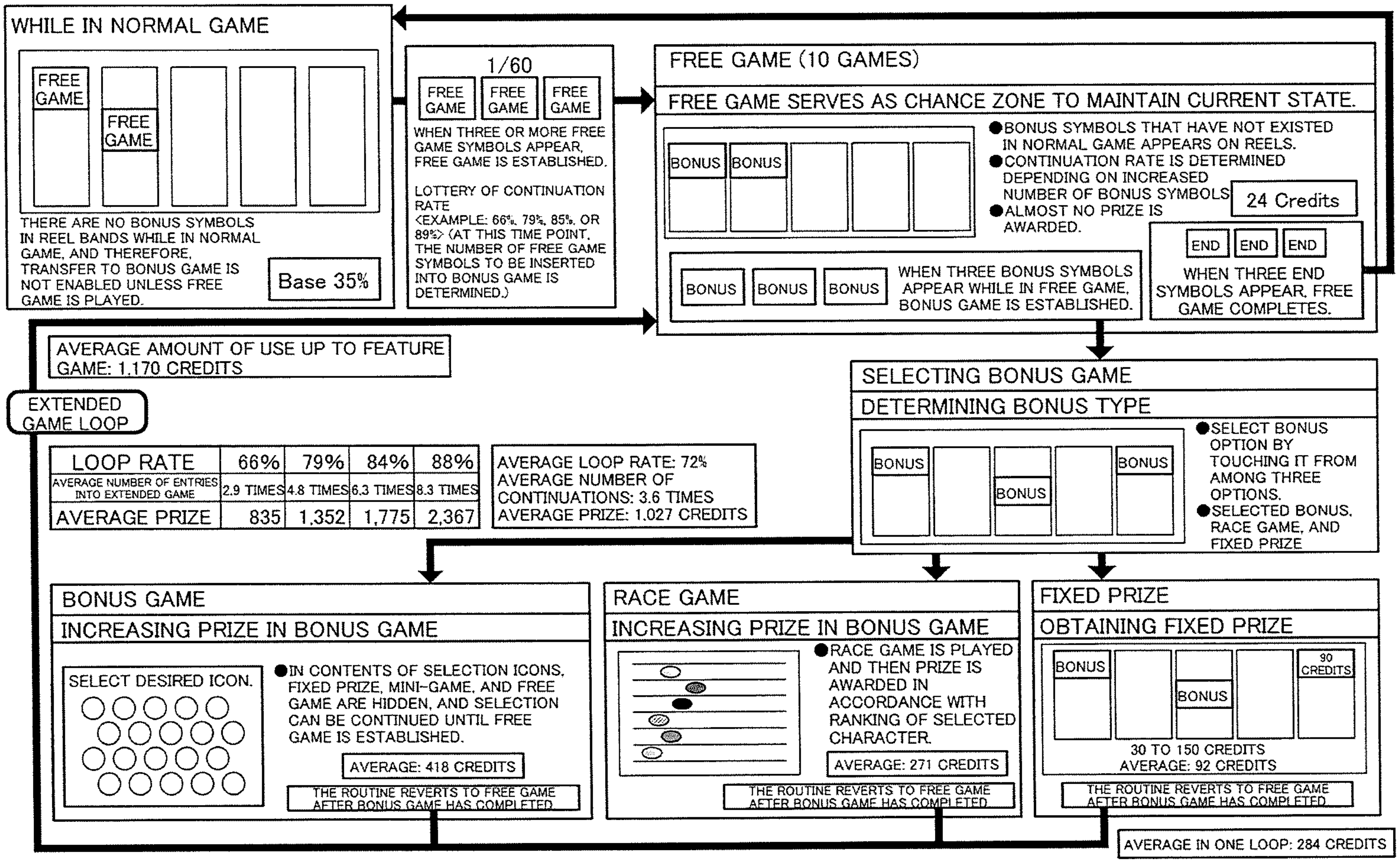
FIG. 2L is a view showing a fifth functional flowchart of the gaming machine according to the embodiment of the present invention.
Figure 2M:
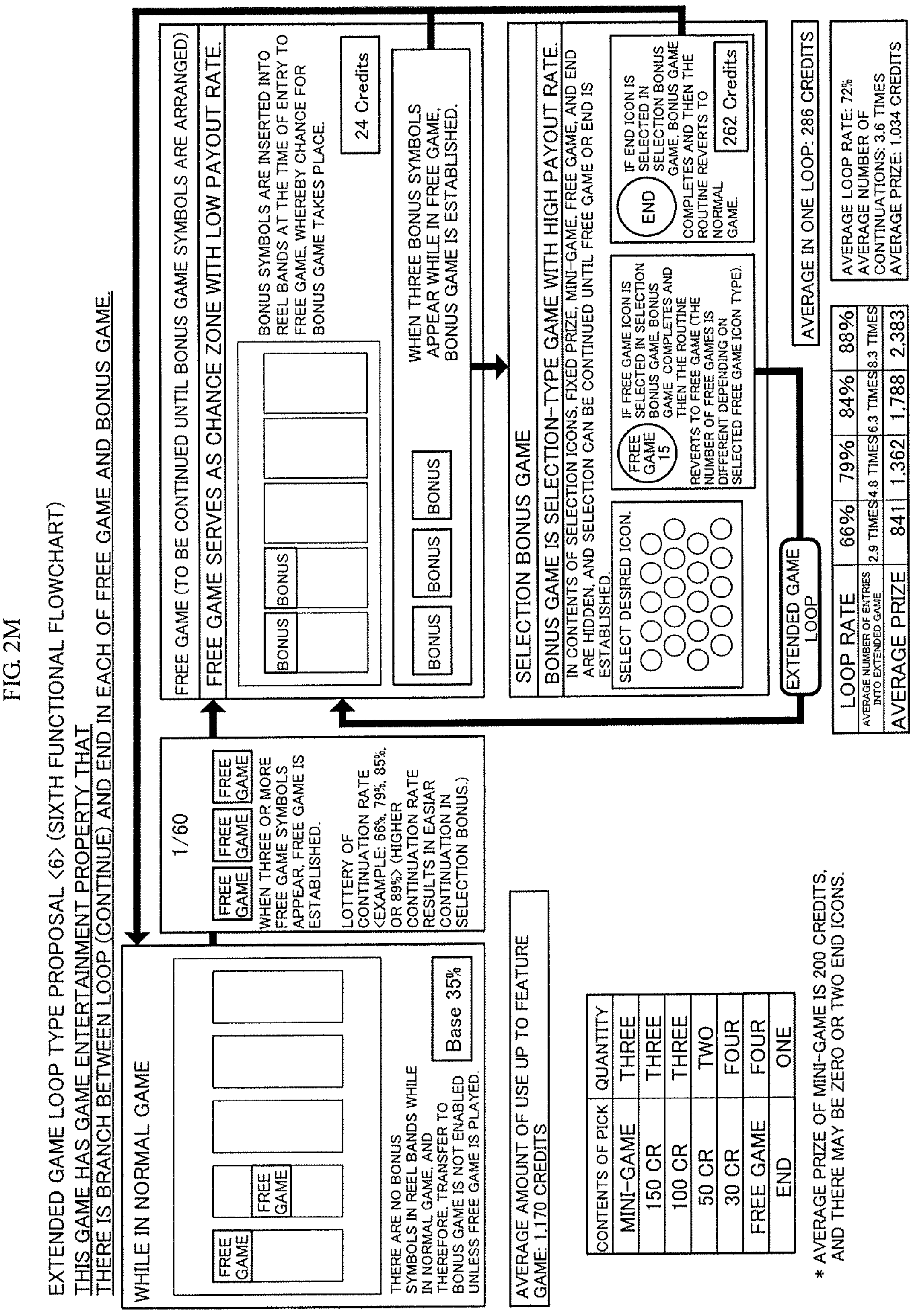
FIG. 2M is a view showing a sixth functional flowchart of the gaming machine according to the embodiment of the present invention.

The first benefit game corresponds to a 1-1st functional flowchart (FIG. 2A); the second benefit game corresponds to a 1-2nd functional flowchart (FIG. 2B); the third benefit game corresponds to a second functional flowchart (FIG. 2C); the eighth benefit game corresponds to a 4-1st functional flowchart (FIG. 2H); the ninth benefit game corresponds to a 4-2nd functional flowchart (FIG. 2I); the tenth benefit game corresponds to a 4-3rd functional flowchart (FIG. 2J); the eleventh benefit game corresponds to a 4-5th functional flowchart (FIG. 2K); the twelfth benefit game corresponds to a fifth functional flowchart (FIG. 2L); and the thirteenth benefit game corresponds to a sixth functional flowchart (FIG. 2M).

It is to be noted that the number of free games icons shown in these various functional flowcharts (such as FIG. 2A) indicates an example corresponding to one continuation rate and then changes in accordance with the selected continuation rate.

In the fourth to seventh benefit games, the continuation rate is not changed because lottery processing of continuation rate is not executed.

<Example of Condition for Establishing Bonus Game Trigger>

The example of return condition in the extended bonus game, described above, showed that difficulty of return condition in the extended bonus game was defined in accordance with the number of free game icons that are employed in the extended bonus game. Therefore, the easiness of transfer by way of the second route was determined in accordance with the number of free game icons. Hereinafter, the contents of free game icons that are employed in the extended bonus game determine a state of a free game when the routine has returned to the free game. That is, difficulty of a condition for establishing a bonus game trigger in a free game is defined in accordance with the contents of free game icons. Therefore, the easiness of transfer by way of the first route is determined in accordance with the contents of free game icons.

Like the example of return condition in the extended bonus game, the selection bonus game is also a game which is to be played in accordance with the contents assigned to an icon that is selected by a player. In addition, the icons that are employed in the selection bonus game include a fixed prize icon, a mini-game icon, and a free game icon, and functions of these icons also work in the same manner.

Therefore, when a player selects a free game icon, the routine transfers (returns) from a selection bonus game to a free game. Determination of the return condition in the extended bonus game in this case is also to determine whether or not a player selects a free game icon. Therefore, in a selection bonus game, when a player selects a free game icon, the return condition in the extended bonus game is met.

The free game icons that are employed in the selection bonus game in the example of the condition for establishing a bonus game trigger consist of a plurality of various kinds of contents as to free game. For example, the free game icons include icons such as a number-of-games icon, a number-of-symbols icon, or a zero game icon.

As described above, when the routine transfers from a base game to a free game, lottery processing of continuation rate is executed. The contents of free game icons are predetermined in correspondence with each of a plurality of continuation rates. The contents of free game icon according to the continuation rate determined in accordance with a lottery result are determined.

The number-of-games icon is an icon in which the number of free games is determined when the routine reverts from a selection bonus game. In a case where a player selects the number-of-games icon in the selection bonus game, the number of games that is defined in the number-of-games icon when the routine reverts to a free game is added to the number of games and then, a free game can be played. By doing this, the number of unit games that a player can play as a free game can be increased, so that a possibility of transfer to an extended bonus game (a selection bonus game) can be increased.

In a case where a high continuation rate is determined in accordance with a lottery result, a number-of-games icon whose number of games is large is selected. Alternatively, in a case where a low continuation rate is determined in accordance with a lottery result, a number-of-games icon whose number of games is small is selected. In this manner, an opportunity of determining a condition for establishing a bonus game trigger can be increased according to the contents of icons that are employed in the selection bonus game, transfer by way of the first route can be easily realized, and then, a possibility of entry into an extended game can be increased.

The number-of-symbols icon is an icon in which the number of free game symbols employed in a free game is defined when the routine reverts from a selection bonus game. In a case where a player selects the number-of-symbols icon, when the routine reverts from the selection bonus game to the free game, free game symbols whose number is defined in the number-of-symbols icon are displayed after added to free game reel bands. By doing this, there increases a possibility that free game symbols are arranged when symbols are rearranged after a free game has been played. When the free game symbols are arranged, these symbols can function as free game retrigger symbols. In this manner, a predetermined number of unit games are added as free games. Therefore, a player can play a free game without decreasing credits, and a possibility of transfer from the free game to an extended bonus game (a selection bonus game) can be increased.

In a case where a high continuation rate is determined in accordance with a lottery result, a number-of-symbols icon whose number of symbols is large is selected. Alternatively, in a case where a low continuation rate is determined in accordance with a lottery result, a number-of-symbols icon whose number of symbols is small is selected. In this manner, an opportunity of determining a condition for establishing a bonus game trigger is increased in accordance with the contents of icons that are employed in a selection bonus game, whereby transfer by means of the first route can be easily realized and then a possibility of entry into an extended game can be increased.

The zero game icon is an icon in which the number of bonus game symbols employed in a free game is set to zero. In a case where a player selects the zero game icon, when the routine reverts from a selection bonus game to the free game, the number of bonus symbols that is displayed on free game reel bands is set to zero. That is, no bolus game symbols are displayed on reel bands used in a free game. Therefore, in the free game, there is no case in which a condition for establishing a bonus game trigger is met and then a possibility of transfer from the free game to the selection bonus game is eliminated. In this manner, the condition for establishing a bonus game trigger itself is changed in accordance with the contents of icons that are employed in the selection bonus game, whereby transfer by way of the first route can be hardly realized and then a possibility of entry into an extended game can be decreased.

In a case where a high continuation rate is determined in accordance with a lottery result, no zero game icon is selected, or alternatively, a small number of zero game icons are selected. Further, in a case where a low continuation rate is determined in accordance with a lottery result, a zero game icon is selected, or alternatively, a large number of zero game icons are selected.

In a case where the number of bonus game symbols is set to zero, transfer from a free game to a selection bonus game is disabled, or alternatively, transfer from a selection bonus game to a base game is also disabled. Therefore, in this case, a completion condition for transfer (return) from a free game to a base game or a completion condition for transfer (return) from a selection bonus game to a base game can also be changed at the same time in accordance with the contents of icons that are employed in the selection bonus game.

As described above, in accordance with types of contents of icons that are employed in a selection bonus game, it has been possible to make adjustments related to a condition for establishing a bonus game trigger and then change the easiness of transfer by way of the first route by changing an opportunity of determining a condition for bonus game trigger or changing a condition for bonus game trigger itself.

In the first to fifteenth benefit games to be described later, the contents of icons that are employed in a selection bonus game can be determined in accordance with lottery processing of continuation rate.

<Example of Completion Condition for Extended Bonus Game>

An example of a completion condition for extended bonus game will be described by way of example of case in which a selection bonus game is executed as an extended bonus game. That is, an extended bonus game is completed in accordance with the contents of icons that are employed in the extended bonus game, enabling the routine to return to a base game. The selection bonus game used here is also a game which is to be played in accordance with the contents assigned to an icon that is selected by a player. In addition, the icons that are employed in the selection bonus game include an icon to which END is assigned (hereinafter, referred to as an END icon). When a player selects the END icon, an extended bonus game is completed and then the routine reverts to a base game.

Determination of the completion condition in the extended bonus game in this example is to determine whether or not a player selects the END icon. Therefore, in the selection bonus game, when a player selects the END icon, the completion condition in the extended bonus game is met. In addition, a difficulty of the completion condition in the extended bonus game is determined in accordance with the number of END icons.

As described above, when the routine transfers from a base game to a free game, lottery processing of continuation rate is executed. The number of END icons is predetermined in correspondence with each of a plurality of continuation rates. In a case where a high continuation rate is determined in accordance with a lottery result, a large number of END icons are determined. In a case where a low continuation rate is determined in accordance with a lottery result, a small number of END icons are determined.

In the third to seventh and thirteenth benefit games to be described later, an END icon is included in the icons that are employed in the extended bonus game. In these benefit games, when the routine transfers from a base game to a free game, lottery processing of continuation rate is executed and then the number of END icons is determined in accordance with the continuation rate. In this manner, in the third to seventh and thirteenth benefit games, a possibility of return from an extended bonus game to a base game can be defined in accordance with the number of END icons.

<Example of Completion Condition in Free Game>

An example of a completion condition in a free game will be described. That is, a free game is completed in accordance with the contents of symbols employed in the free game, enabling the routine to revert to a base game. The symbols employed in the free game includes a symbol to which END is assigned (hereinafter, referred to as an END symbol). In the free game, when symbols are rearranged and then END symbols are arranged, the free game is completed and then the routine reverts to a base game.

Determination of the completion condition in the free game in this example is to determine whether or not symbols are rearranged and then END symbols are arranged. Therefore, in the free game, when the END symbols are arranged, the completion condition in the free game is met. In addition, a difficulty of the completion condition in the free game is determined in accordance with the number of END symbols.

As described above, when the routine transfers from a base game to a free game, lottery processing of continuation rate is executed. The number of END symbols is predetermined in correspondence with each of a plurality of continuation rates. In a case where a high continuation rate is determined in accordance with a lottery result, a large number of END symbols are determined. In a case where a low continuation rate is determined in accordance with a lottery result, a small number of END symbols are determined.

In the twelfth benefit game to be described later, the symbols employed in a free game include an END symbol. In this benefit game, when transfer from a base frame to a free game is established, lottery processing of continuation rate is executed and then the number of END symbols is determined in accordance with the continuation rate. In this manner, in the twelfth benefit game, a possibility of return from a free game to a base game can be defined in accordance with the number of END symbols.

<Timing of Lottery of Continuation Rate>

The example described above showed a case of executing lottery processing of continuation rate when the routine transfers from a base game to a free game. For example, in a base game, lottery processing of continuation rate is executed as triggered by establishment of a free game trigger. In the embodiment, the free game trigger is established when free game symbols are arranged by means of symbol rearrangement in the base game.

Lottery processing of continuation rate may be executed not only when the routine transfers from a base game to a free game, but as triggered by establishment of another condition, or alternatively, may be executed with another timing. For example, in a free game, lottery processing of continuation rate may be executed as triggered by establishment of a bonus game trigger. In the embodiment, a bonus game trigger is established when bonus game symbols are arranged by means of symbol rearrangement in a free game. Alternatively, this bonus game trigger may be executed as triggered by establishment of a predetermined condition while an extended bonus game is played, or alternatively, may be executed with another timing.

Lottery processing of continuation rate may be executed with a timing that is capable of achieving formation of an extended game loop between a free game and an extended bonus game.

<<<<Concrete Descriptions of the Embodiment According to the Present Invention>>>>

[Basic of Function Flow Diagram]

Basic functions of the gaming machine according to the present embodiment are described.

<Coin-Insertion/Start-Check>

First, the gaming machine checks whether or not a BET button has been pressed by the player, and subsequently checks whether or not a spin button has been pressed by the player.

<Symbol Determination>

Next, when the spin button has been pressed by the player, the gaming machine extracts random values for symbol determination, and determines symbols to be displayed at the time of stopping scrolling of symbol arrays for the player, for a plurality of respective video reels displayed to a display.

<Symbol Display>

Next, the gaming machine starts scrolling of the symbol array of each of the video reels and then stops scrolling so that the determined symbols are displayed for the player.

<Winning Determination>

When scrolling of the symbol array of each video reel has been stopped, the gaming machine determines whether or not a combination of symbols displayed for the player is a combination related to winning.

<Payout>

When the combination of symbols displayed for the player is a combination related to winning, the gaming machine offers benefits according to the combination to the player.

For example, when a combination of symbols related to a payout of coins has been displayed, the gaming machine pays out coins of the number corresponding to the combination of symbols to the player.

Further, when a combination of symbols related to a free game trigger has been displayed, the gaming machine starts the free game.

When a combination of symbols related to a jackpot trigger is displayed, the gaining machine pays out coins in an amount of jackpot to the player. The jackpot refers to a function which accumulates parts of coins used by players at the respective gaming machines as the amount of jackpot and which, when the jackpot trigger has been established in any of the gaming machines, pays out coins of the accumulated amount of jackpot to that gaming machine.

In each game, the gaming machine calculates the amount (amount for accumulation) to be accumulated to the amount of jackpot and transmits to an external control device. The external control device accumulates to the amount of jackpot the amounts for accumulation transmitted from the respective gaming machines.

Further, in addition to the aforementioned benefits, the gaming machine may be provided with benefits such as a mystery bonus and insurance.

The mystery bonus is a bonus in which a predetermined amount of coins are paid out for winning of a lottery that is intended for the mystery bonus. When the spin button has been pressed, the gaming machine extracts a random value for mystery bonus and determines whether or not to establish a mystery bonus by lottery.

The insurance is a function provided for a purpose of relieving the player from a situation in which a bonus game and a free game has not been played for long periods of time. In the present embodiment, the player can arbitrarily select whether or not to make the insurance effective. Making insurance effective requires a predetermined insurance-purchase amount to be paid in exchange.

In the case where the insurance has been made effective, the gaming machine starts counting the number of games. The gaming machine conducts a payout of coins of the amount that is set for the insurance, when the number of counted games has reached a previously determined number of times without a large amount of payout relating to a free game or the like being conducted.

<Determination of Effects>

The gaming machine produces effects by displaying images to the display, outputting the light from lamps, and outputting sounds from speakers. The gaming machine extracts a random value for effect and determines contents of the effects based on the symbols and the like determined by lottery.

[Description of Functional Flowchart]

Hereinafter, a variety of functional flowcharts of gaming machines shown in FIG. 2A to FIG. 2O will be described. These functional flowcharts show flowcharts of forming an extended game loop in which a free game and an extended bonus game enter an extended game and then a game is played. It is to be noted that, in the functional flowcharts shown in FIG. 2A to FIG. 2O, the inside of frames described "in normal game" corresponds to a "base game".

<<1-1st Functional Flowchart>>

FIG. 2A is a view showing a 1-1st functional flowchart. This 1-1st functional flowchart has a game entertainment that there is a branch between an extended game loop (continue) and an end in only a free game.

<In Normal Game>

Since no bonus game symbols are present on reel bands employed in a normal game (while in a normal game, that is, which in a base game), transfer to an extended bonus game is not realized unless a free game is played. This normal game (base game) is defined so that "Base" is set to 35%.

When symbols are rearranged in a normal game (a base game), if three or more free game symbols appear, the routine transfers to a free game. In a game according to the 1-1st functional flowchart, a probability of enabling transfer from a normal game to a free game is 1/60.

An average amount of use taken until the routine transfers from a normal game to a free game is 1,170. When the routine transfers to the free game, lottery processing of continuation rate of an extended game loop is executed. For example, lottery processing is executed so that the continuation rate is 66%, 79%, 85%, or 89%. At this time point, the number of free game icons to be inserted into an extended bonus game is determined in accordance with a result of the lottery processing. The easiness of entry into an extended game between the free game and the extended bonus game can be adjusted in accordance with the number of free game icons. Alternatively, the contents of free game icons may be determined in place of the number of free game icons to be inserted into the extended bonus game. The easiness of entry into an extended game can be adjusted in accordance with the contents of free game icons as well.

In the 1-1st functional flowchart, when a continuation rate (a loop rate) is 66%, an average number of extended games is 2.9 times, and an average prize is 835. When the continuation rate is 79%, the average number of extended games is 4.8 times, and the average prize is 1,352. When the continuation rate is 84%, the average number of extended games is 6.3 times, and the average prize is 1,775. When the continuation rate is 88%, the average number of extended games is 8.3 times, and the average prize is 2.367. In a game according to the 1-1st functional flowchart, an average loop rate is 72%, an average number of continuations is 3.6 times, and the average prize is 1,028. In addition, the average prize in each loop is 284.

<Free Game>

In the game according to the 1-1st functional flowchart, ten unit games can be played as a free game. When the ten unit games are consumed, the free game completes and then the routine reverts to a normal game. It is to be noted that the number of unit games is a minimum number of games (a minimally guaranteed number of games), and is changed in accordance with a result of a continuation rate. For example, the number of unit games can be changed in accordance with a result of an extended bonus game. The free game is low in payout rate and serves as a chance zone. When the routine transfers to the free game, bonus game symbols are inserted into reel bands. In this manner, the bonus game symbols are inserted into the reel bands employed in the free game, thereby making it possible to generate an opportunity of enabling transfer to the extended bonus game. The continuation rate in extended game loop can be made different depending on the number of bonus game symbols to be inserted into the reel bands employed in the free game. The prize in the free game is 24, for example. If three bonus games appear in the free game, the routine transfers to the extended bonus game.

<Bonus Game (Extended Bonus Game (Selection Bonus Game)>

In the game according to the 1-1st functional flowchart, a selection bonus game is played as an extended bonus game. The extended bonus game functions as a selection type game with its high payout rate. The selection bonus game is a game to be played by means of player icon selection. Twenty icons are displayed on the lower image display panel 141 to be described later, a player is caused to select one icon, and then, a game whose contents are defined according to the selected icon type is executed. A fixed prize, a mini-game, and a free game are assigned to these icons. A player can continue the selection bonus game until the player selects an icon to which a free game is assigned.

For icons to which fixed prizes are assigned, there are two icons whose prize is 150, two icons whose prize is 100, five icons whose prize is 50, and five icons whose prize is 30. When a player selects an icon to which a fixed prize is assigned, the prize indicated by the icon is awarded to the player. Assume that there are two icons to which mini-games are assigned, for example. When a player selects an icon to which a mini-game is assigned, the player plays the selected mini-game and then a prize according to the result is awarded to the player. Assume that there are four icons to which free games are assigned, for example. The numbers of fixed prizes, mini-games, and free games assigned to the icons are predetermined in accordance with the continuation rates. The number to be assigned to an icon is determined in accordance with a lottery result of continuation rate.

In a case where the number of free game icons is small, return from a selection bonus game to a free game can be hardly realized and then entry into an extended game can be easily realized. Alternatively, in a case where the number of free game icons is large in an extended bonus game (a selection bonus game), return from the selection bonus game to a free game can be easily realized and then entry into an extended game can be easily realized. While the number of icons assigned to the free game is predetermined in accordance with a continuation rate, the number of icons that are employed in the selection bonus game may be determined in accordance with the continuation rate that is determined in lottery processing.

An average prize of mini-game is 200, for example. The prize in the selection bonus game is 260, for example. These prizes are merely provided as one example, and change according to a continuation rate.

In a selection bonus game, if a player selects an icon to which a free game is assigned, the selection bonus game completes and then the routine reverts to the free game. As described above, a plurality of various kinds of contents are predetermined for icons to which free games are assigned. The number of unit games in free game or the number of bonus game symbols to be inserted into reel bands when a free game starts is different depending on what kind of icon is selected by a player.

For example, icons to which free games are assigned include icons such as an icon in which the number of free games is defined (hereinafter, referred to as a number-of-games icon); another icon in which the number of free game symbols is defined (hereinafter, referred to as a number-of-symbols icon); or still another icon in which the number of bonus game symbols is set to zero (hereinafter, a zero game icon).

In a case where a player selects a number-of-games icon in a selection bonus game, when the routine reverts from the selected bonus game to a free game, the number of games that is defined in the number-of-game icon is added to the current number of games and then a free game can be played. Doing this makes it possible to increase the number of unit games that a player can play as a free game.

In a case where a player selects a number-of-symbols icon, when the routine reverts from a selection bonus game to a free game, free game symbols whose number is defined in the number-of-symbols icon are displayed after added to reel bands of the free game. Doing this makes it possible to increase a possibility that free game symbols are arranged when symbols are rearranged after the free game has been played.

In a case where a player selects a zero game icon, when the routine reverts from a selection bonus game to a free game, the number of bonus game symbols that is displayed on reel bands in the free game is set to zero. That is, no bonus symbols are displayed on the reel bands used in the free game. Therefore, there is no possibility of enabling transfer from the free game to the selection bonus game.

As described above, while, in the 1-1st functional flowchart, ten unit games can be played as a free game, for example, the number of games is a minimum number of games, and changes in accordance with a continuation rate. For example, the number of games can be changed in accordance with a result of an extended bonus game. Doing this makes it possible to adjust the easiness of entry into an extended game between the free game and the extended bonus game.

<<1-2nd Functional Flowchart>>

FIG. 2B is a view showing a 1-2nd functional flowchart. The 1-2nd functional flowchart has a game entertainment property that there is a branch between an extended game loop (continue) and an end in only a free game.

<In Normal Game>

No bonus game symbols are assigned on reel bands employed in a normal game (while in a normal game, i.e., while in a base game), and therefore, transfer to an extended bonus game is not realized unless a free game is played. This normal game (base game) is defined so that "Base" is 30%.

When symbols are rearranged in a normal game (a base game), if three or more free game symbols appear, the routine transfers to a free game. In a game according to the 1-2nd functional flowchart, a probability of enabling transfer from the normal game to the free game is 1/60. An average amount of use taken until the routine transfers from the normal game to the free game is 1,260. When the routine transfers to the free game, lottery processing of continuation rate in extended game loop is executed. For example, lottery processing is executed so that the continuation rate is 66%, 79%, 85%, or 89%. At this time point, the number of free game icons to be inserted into an extended bonus game is determined in accordance with a result of the lottery processing. The easiness of entry into an extended game between the free game and the extended bonus game can be adjusted in accordance with the number of free game icons. Alternatively, the contents of free game icons may be determined in place of the number of free game icons to be inserted into the extended bonus game. The easiness of entry into an extended game between the free game and the extended bonus game can be adjusted in accordance with the contents of free game icons as well.

In the 1-2nd functional flowchart, when a continuation rate (a loop rate) is 66%, an average number of extended games is 2.9 times, and an average prize is 906. When the continuation rate is 79%, the average number of extended games is 4.8 times, and the average prize is 1,467. When the continuation rate is 84%, the average number of extended games is 6.3 times, and the average prize is 1,925. When the continuation rate is 88%, the average number of extended games is 8.3 times, and the average prize is 2,567. In a game according to the 1-2nd functional flowchart, an average loop rate is 72%, an average number of continuations is 3.6 times, and the average prize is 1,115. In addition, an average prize in each loop is 308.

<Free Game>

In a game according to the 1-2nd functional flowchart, ten unit games can be played as a free game. When the ten unit games are consumed, the free game completes and then the routine reverts to a normal game. The number of unit games is a minimum number of games (a minimally guaranteed number of games), and is changed in accordance with a continuation rate. For example, the number of unit games can be changed in accordance with a result of an extended bonus game. The free game is low in payout rate and serves as a chance zone. When the routine transfers to the free game bonus game, symbols are inserted into reel bands. In this manner, the bonus game symbols are inserted into the reel bands employed in the free game, thereby making it possible to generate an opportunity of enabling transfer to the extended bonus game. The continuation rate in extended game loop can be made different depending on the number of bonus game symbols to be inserted into the reel bands employed in the free game. The prize in the free game is 24, for example. If three bonus games appear in the free game, the routine transfers to the extended bonus game.

<Bonus Game (Extended Bonus Game (Selection Bonus Game)>

In the game according to the 1-2nd functional flowchart, a selection bonus game is played as an extended bonus game. The extended bonus game functions as a selection type game with its high payout rate. The selection bonus game is a game to be played by means of player icon selection. Twenty icons are displayed on the lower image display panel 141 to be described later, a player is caused to select one icon, and then, a game whose contents are defined according to the selected icon type is executed. A fixed prize, a mini-game, and a free game are assigned to these icons. A player can continue the selection bonus game until the player selects an icon to which a free game is assigned.

For icons to which fixed prizes are assigned, there are two icons whose prize is 150, four icons whose prize is 100, four icons whose prize is 50, and four icons whose prize is 30. When a player selects an icon to which a fixed prize is assigned, the prize indicated by the icon is awarded to the player. Assume that there are two icons to which mini-games are assigned, for example. When a player selects an icon to which a mini-game is assigned, the player plays the selected mini-game and then a prize according to the result is awarded to the player. Assume that there are four icons to which free games are assigned, for example. The numbers of fixed prizes, mini-games, and free games assigned to the icons are predetermined in accordance with the continuation rates. The number to be assigned to an icon is determined in accordance with a lottery result of continuation rate.

In a case where the number of free game icons is small, return from a selection bonus game to a free game can be hardly realized and then entry into an extended game can be easily realized. Alternatively, in a case where the number of free game icons is large in an extended bonus game (a selection bonus game), return from the selection bonus game to a free game can be easily realized and then entry into an extended game can be easily realized. While the number of icons assigned to the free game is predetermined in accordance with a continuation rate, the number of icons that are employed in the selection bonus game may be determined in accordance with the continuation rate that is determined in lottery processing.

An average prize of mini-game is 200, for example. The prize in the selection bonus game is 284, for example. These prizes are merely provided as one example, and change according to a continuation rate.

In a selection bonus game, if a player selects an icon to which a free game is assigned, the selection bonus game completes and then the routine reverts to the free game. As described above, a plurality of various kinds of contents are predetermined for icons to which free games are assigned. The number of unit games in free game or the number of bonus game symbols to be inserted into reel bands when a free game starts is different depending on what kind of icon is selected by a player.

For example, icons to which free games are assigned include icons such as an icon in which the number of free games is defined (hereinafter, referred to as a number-of-games icon); another icon in which the number of free game symbols is defined (hereinafter, referred to as a number-of-symbols icon); or still another icon in which the number of bonus game symbols is set to zero (hereinafter, a zero game icon).

In a case where a player selects a number-of-games icon in a selection bonus game, when the routine reverts from the selected bonus game to a free game, the number of games that is defined in the number-of-game icon is added to the current number of games and then a free game can be played. Doing this makes it possible to increase the number of unit games that a player can play as a free game.

In a case where a player selects a number-of-symbols icon, when the routine reverts from a selection bonus game to a free game, free game symbols whose number is defined in the number-of-symbols icon are displayed after added to reel bands of the free game. Doing this makes it possible to increase a possibility that free game symbols are arranged when symbols are rearranged after the free game has been played.

In a case where a player selects a zero game icon, when the routine reverts from a selection bonus game to a free game, the number of bonus game symbols that is displayed on reel bands in the free game is set to zero. That is, no bonus symbols are displayed on the reel bands used in the free game. Therefore, there is no possibility of enabling transfer from the free game to the selection bonus game.

As described above, while, in the 1-2nd functional flowchart, ten unit games can be played as a free game, for example, the number of games is a minimum number of games, and changes in accordance with a continuation rate. For example, the number of games can be changed in accordance with a result of an extended bonus game. Doing this makes it possible to adjust the easiness of entry into an extended game between the free game and the extended bonus game.

<<Second Functional Flowchart>>

FIG. 2C is a view showing a second functional flowchart. The second functional flowchart has a game entertainment property that there is a branch between a loop (continue) and an end in each of a free game and an extended bonus game.

<In Normal Game>

No bonus game symbols are assigned on reel bands employed in a normal game (while in a normal game, i.e., while in a base game), and therefore, transfer to an extended bonus game is not realized unless a free game is played. This normal game (base game) is defined so that "Base" is 35%.

When symbols are rearranged in a normal game (a base game), if three or more free game symbols appear, the routine transfers to a free game. In a game according to the second functional flowchart, a probability of enabling transfer from the normal game to the free game is 1/60. An average amount of use taken until the routine transfers from the normal game to the free game is 1,170. When the routine transfers to the free game, lottery processing of continuation rate in extended game loop is executed. For example, lottery processing is executed so that the continuation rate is 66%, 79%, 85%, or 89%. At this time point, the number of free game icons to be inserted into an extended bonus game is determined in accordance with a result of the lottery processing. The easiness of entry into an extended game between the free game and the extended bonus game can be adjusted in accordance with the number of free game icons. Alternatively, the contents of free game icons may be determined in place of the number of free game icons to be inserted into the extended bonus game. The easiness of entry into an extended game between the free game and the extended bonus game can be adjusted in accordance with the contents of free game icons as well.

In the second functional flowchart, when a continuation rate (a loop rate) is 66%, an average number of extended games is 2.9 times, and an average prize is 841. When the continuation rate is 79%, the average number of extended games is 4.8 times, and the average prize is 1,362. When the continuation rate is 84%, the average number of extended games is 6.3 times, and the average prize is 1,788. When the continuation rate is 88%, the average number of extended games is 8.3 times, and the average prize is 2,383. In a game according to the second functional flowchart, an average loop rate is 72%, an average number of continuations is 3.6 times, and the average prize is 1,034. In addition, an average prize in each loop is 286.

<Free Game>

In a game according to the second functional flowchart, ten unit games can be played as a free game. When the ten unit games are consumed, the free game completes and then the routine reverts to a normal game. The number of unit games is a minimum number of games (a minimally guaranteed number of games), and is changed in accordance with a continuation rate. For example, the number of unit games can be changed in accordance with a result of an extended bonus game. The free game is low in payout rate and serves as a chance zone. When the routine transfers to the free game, bonus game symbols are inserted into reel bands. In this manner, the bonus game symbols are inserted into the reel bands employed in the free game, thereby making it possible to generate an opportunity of enabling transfer to the extended bonus game. The continuation rate in extended game loop can be made different depending on the number of bonus game symbols to be inserted into the reel bands employed in the free game. The prize in the free game is 24, for example. If three bonus games appear in the free game, the routine transfers to the extended bonus game.

<Bonus Game (Extended Bonus Game (Selection Bonus Game)>

In the game according to the second functional flowchart, a selection bonus game is played as an extended bonus game. The extended bonus game functions as a selection type game with its high payout rate. The selection bonus game is a game to be played by means of player icon selection. Twenty icons are displayed on the lower image display panel 141 to be described later, a player is caused to select one icon, and then, a game whose contents are defined according to the selected icon type is executed. A fixed prize, a mini-game, and a free game are assigned to these icons. A player can continue the selection bonus game until the player selects an icon to which a free game is assigned.

For icons to which fixed prizes are assigned, there are three icons whose prize is 150, three icons whose prize is 100, two icons whose prize is 50, and four icons whose prize is 30. When a player selects an icon to which a fixed prize is assigned, the prize indicated by the icon is awarded to the player. Assume that there are two icons to which mini-games are assigned, for example. When a player selects an icon to which a mini-game is assigned, the player plays the selected mini-game and then a prize according to the result is awarded to the player. Assume that there are one icon to which END is assigned, for example. When a player selects the icon to which END is assigned, a selection bonus game is completed and then the routine reverts to a normal game (a base game). Assume that there are four icons to which free games are assigned, for example. The numbers of fixed prizes, mini-games, and free games assigned to the icons are predetermined in accordance with the continuation rates. The number to be assigned to an icon is determined in accordance with a lottery result of continuation rate.

In a case where the number of free game icons is small, return from a selection bonus game to a free game can be hardly realized and then entry into an extended game can be easily realized. Alternatively, in a case where the number of free game icons is large in an extended bonus game (a selection bonus game), return from the selection bonus game to a free game can be easily realized and then entry into an extended game can be easily realized. While the number of icons assigned to the free game is predetermined in accordance with a continuation rate, the number of icons that are employed in the selection bonus game may be determined in accordance with the continuation rate that is determined in lottery processing.

An average prize of mini-game is 200, for example. The prize in the selection bonus game is 262, for example. These prizes are merely provided as one example, and change according to a continuation rate.

In a selection bonus game, if a player selects an icon to which a free game is assigned, the selection bonus game completes and then the routine reverts to the free game. As described above, a plurality of various kinds of contents are predetermined for icons to which free games are assigned. The number of unit games in free game or the number of bonus game symbols to be inserted into reel bands when a free game starts, are different depending on what kind of icon is selected by a player.

For example, icons to which free games are assigned include icons such as an icon in which the number of free games is defined (hereinafter, referred to as a number-of-games icon); another icon in which the number of free game symbols is defined (hereinafter, referred to as a number-of-symbols icon); or still another icon in which the number of bonus game symbols is set to zero (hereinafter, a zero game icon).

In a case where a player selects a number-of-games icon in a selection bonus game, when the routine reverts from the selected bonus game to a free game, the number of games that is defined in the number-of-game icon is added to the current number of games and then a free game can be played. Doing this makes it possible to increase the number of unit games that a player can play as a free game.

In a case where a player selects a number-of-symbols icon, when the routine reverts from a selection bonus game to a free game, free game symbols whose number is defined in the number-of-symbols icon are displayed after added to reel bands of the free game. Doing this makes it possible to increase a possibility that free game symbols are arranged when symbols are rearranged after the free game has been played.

In a case where a player selects a zero game icon, when the routine reverts from a selection bonus game to a free game, the number of bonus game symbols that is displayed on reel bands in the free game is set to zero. That is, no bonus symbols are displayed on the reel bands used in the free game. Therefore, there is no possibility of enabling transfer from the free game to the selection bonus game.

As described above, while, in the second functional flowchart, ten unit games can be played as a free game, for example, the number of games is a minimum number of games, and changes depending on a continuation rate. For example, the number of games can be changed in accordance with a result of an extended bonus game. Doing this makes it possible to adjust the easiness of entry into an extended game between the free game and the extended bonus game.

<<3-1st Functional Flowchart>>

FIG. 2D is a view showing a 3-1st functional flowchart. The 3-1st functional flowchart has a game entertainment property that there is a branch between an extended game loop (continue) and an end in only an extended bonus game.

<In Normal Game>

No bonus game symbols are assigned on reel bands employed in a normal game (while in a normal game, i.e., while in a base game), and therefore, transfer to an extended bonus game is not realized unless a free game is played. This normal game (base game) is defined so that "Base" is 35%.

When symbols are rearranged in a normal game (a base game), if three or more free game symbols appear, the routine transfers to a free game. In a game according to the 3-1st functional flowchart, a probability of enabling transfer from a normal game to a free game is 1/60. An average amount of use taken until the routine transfers from the normal game to the free game is 1,170.

In a game according to the 3-1st functional flowchart, an average loop rate is 80.0%, an average number of continuations is 5.0 times, and an average prize is 1,030. In addition, an average prize in each loop is 206.

<Free Game>

In a game according to the 3-1st functional flowchart, a unit game that can be continued until bonus symbols are arranged can be played as a free game. The free game is low in payout rate, and functions as a preparatory step for an extended bonus game. When the routine transfers to the free game, bonus game symbols are inserted into reel bands. In this manner, the bonus game symbols are inserted into the reel bands employed in the free game, thereby making it possible to generate an opportunity of enabling transfer to the extended bonus game. The prize in the free game is 24, for example. If three bonus games appear in the free game, the routine transfers to the extended bonus game.

<Bonus Game (Extended Bonus Game (Selection Bonus Game)>

In a game according to the 3-1st functional flowchart, a selection bonus game is played as an extended bonus game. The extended bonus game functions as a selection type game with its high payout rate. The selection bonus game is a game that is played by a player icon selection. Fifteen icons are displayed on the lower image display panel 141 to be described later, a player is caused to select one icon, and then, a game whose contents are defined in accordance with the selected icon type is executed. A fixed prize plus a free game and END are assigned to the icons.

For icons to which a fixed prize plus a free game are assigned, for example, there are three icons whose prize is 400, three icons whose prize is 300, three icons whose prize is 150, and three icons whose prize is 60.

In a selection bonus game, if a player can select and arrange three icons to which a fixed prize plus a free game are assigned, earlier than when three END icons are arranged, a fixed prize corresponding to the arranged three icons is awarded to the player and then the routine reverts to a free game. The prize in the selection bonus game is defined so as to be 182.

In a selection bonus game, if a player arranges three END icons, the selection bonus game is completed and then the routine reverts to a normal game (a base game).

<<3-2nd Functional Flowchart>>

FIG. 2E is a view showing a 3-2nd functional flowchart. The 3-2nd functional flowchart has a game entertainment property that there is a branch between an extended game loop (continue) and an end in only an extended bonus game.

<In Normal Game>

No bonus game symbols are assigned on reel bands employed in a normal game (while in a normal game, i.e., while in a base game), and therefore, transfer to an extended bonus game is not realized unless a free game is played. This normal game (base game) is defined so that "Base" is 30%.

When symbols are rearranged in a normal game (a base game), if three or more free game symbols appear, the routine transfers to a free game. In a game according to the 3-2nd functional flowchart, a probability of enabling transfer from a normal game to a free game is 1/60. An average amount of use taken until the routine transfers from the normal game to the free game is 1,260.

In a game according to the 3-2nd functional flowchart, an average loop rate is 80.0%, an average number of continuations is 5.0 times, and an average prize is 1,120. In addition, an average prize in each loop is 224.

<Free Game>

In a game according to the 3-2nd functional flowchart, a unit game that can be continued until bonus symbols are arranged can be played as a free game. The free game is low in payout rate, and functions as a preparatory step for an extended bonus game. When the routine transfers to the free game, bonus game symbols are inserted into reel bands. In this manner, the bonus game symbols are inserted into the reel bands employed in the free game, thereby making it possible to generate an opportunity of enabling transfer to the extended bonus game. The prize in the free game is 24, for example. If three bonus games appear in the free game, the routine transfers to the extended bonus game.

<Bonus Game (Extended Bonus Game (Selection Bonus Game)>

In a game according to the 3-2nd functional flowchart, a selection bonus game is played as an extended bonus game. The extended bonus game functions as a selection type game with its high payout rate. The selection bonus game is a game that is played by a player icon selection. Fifteen icons are displayed on the lower image display panel 141 to be described later, a player is caused to select one icon, and then, a game whose contents are defined in accordance with the selected icon type is executed. A fixed prize plus a free game and END are assigned to the icons.

For icons to which a fixed prize plus a free game are assigned, for example, there are three icons whose prize is 400, three icons whose prize is 300, three icons whose prize is 200, and three icons whose prize is 100.

In a selection bonus game, if a player can select and arrange three icons to which a fixed prize plus a free game are assigned, earlier than when three END icons are arranged, a fixed prize corresponding to the arranged three icons is awarded to the player and then the routine reverts to a free game. The prize in the selection bonus game is defined so as to be 200.

In a selection bonus game, if a player arranges three END icons, the selection bonus game is completed and then the routine reverts to a normal game (a base game).

<<3-3rd Functional Flowchart>>

FIG. 2F is a view showing a 3-3rd functional flowchart. The 3-3rd functional flowchart has a game entertainment property that there is a branch between an extended game loop (continue) and an end in only an extended bonus game.

<In Normal Game>

No bonus game symbols are assigned on reel bands employed in a normal game (while in a normal game, i.e., while in a base game), and therefore, transfer to an extended bonus game is not realized unless a free game is played. This normal game (base game) is defined so that "Base" is 35%.

When symbols are rearranged in a normal game (a base game), if three or more free game symbols appear, the routine transfers to a free game. In a game according to the 3-3rd functional flowchart, a probability of enabling transfer from a normal game to a free game is 1/60. An average amount of use taken until the routine transfers from the normal game to the free game is 1,170.

In a game according to the 3-3rd functional flowchart, an average loop rate is 75.0%, an average number of continuations is 4.0 times, and an average prize is 1,030, In addition, an average prize in each loop is 258.

<Free Game>

In a game according to the 3-3rd functional flowchart, a unit game that can be continued until bonus symbols are arranged can be played as a free game. The free game is low in payout rate, and functions as a preparatory step for an extended bonus game. When the routine transfers to the free game, bonus game symbols are inserted into reel bands. In this manner, the bonus game symbols are inserted into the reel bands employed in the free game, thereby making it possible to generate an opportunity of enabling transfer to the extended bonus game. The prize in the free game is 20, for example. If three bonus games appear in the free game, the routine transfers to the extended bonus game.

<Bonus Game (Extended Bonus Game (Selection Bonus Game)>

In a game according to the 3-3rd functional flowchart, a selection bonus game is played as an extended bonus game. The extended bonus game functions as a selection type game with its high payout rate. The selection bonus game is a game that is played by a player icon selection. Twelve icons are displayed on the lower image display panel 141 to be described later, a player is caused to select one icon, and then, a game whose contents are defined in accordance with the selected icon type is executed. A fixed prize plus a free game and END are assigned to the icons.

For icons to which a fixed prize plus a free game are assigned, for example, there are three icons whose prize is 500, three icons whose prize is 300, and three icons whose prize is 150.

In a selection bonus game, if a player can select and arrange three icons to which a fixed prize plus a free game are assigned, earlier than when three END icons are arranged, a fixed prize corresponding to the arranged three icons is awarded to the player and then the routine reverts to a free game. The prize in the selection bonus game is defined so as to be 238.

In a selection bonus game, if a player arranges three END icons, the selection bonus game is completed and then the routine reverts to a normal game (a base game).

<<3-4th Functional Flowchart>>

FIG. 2G is a view showing a 3-4th functional flowchart. The 3-4th functional flowchart has a game entertainment property that there is a branch between an extended game loop (continue) and an end in only an extended bonus game.

No bonus game symbols are assigned on reel bands employed in a normal game (while in a normal game, i.e., while in a base game), and therefore, transfer to an extended bonus game is not realized unless a free game is played. This normal game (base game) is defined so that "Base" is 30%.

When symbols are rearranged in a normal game (a base game), if three or more free game symbols appear, the routine transfers to a free game. In a game according to the 3-4th functional flowchart, a probability of enabling transfer from a normal game to a free game is 1/60. An average amount of use taken until the routine transfers from the normal game to the free game is 1,260.

In a game according to the 3-4th functional flowchart, an average loop rate is 75.0%, an average number of continuations is 4.0 times, and an average prize is 1,120. In addition, an average prize in each loop is 280.

<Free Game>

In a game according to the 3-4th functional flowchart, a unit game that can be continued until bonus symbols are arranged can be played as a free game. The free game is low in payout rate, and functions as a preparatory step for an extended bonus game. When the routine transfers to the free game, bonus game symbols are inserted into reel bands. In this manner, the bonus game symbols are inserted into the reel bands employed in the free game, thereby making it possible to generate an opportunity of enabling transfer to the extended bonus game. The prize in the free game is 30, for example. If three bonus games appear in the free game, the routine transfers to the extended bonus game.

<Bonus Game (Extended Bonus Game (Selection Bonus Game)>

In a game according to the 3-4th functional flowchart, a selection bonus game is played as an extended bonus game. The extended bonus game functions as a selection type game with its high payout rate. The selection bonus game is a game that is played by a player icon selection. Twelve icons are displayed on the lower image display panel 141 to be described later, a player is caused to select one icon, and then, a game whose contents are defined in accordance with the selected icon type is executed. A fixed prize plus a free game and END are assigned to the icons.

For icons to which a fixed prize plus a free game are assigned, for example, there are three icons whose prize is 500, three icons whose prize is 300, and three icons whose prize is 200.

In a selection bonus game, if a player can select and arrange three icons to which a fixed prize plus a free game are assigned, earlier than when three END icons are arranged, a fixed prize corresponding to the arranged three icons is awarded to the player and then the routine reverts to a free game. The prize in the selection bonus game is defined so as to be 250.

In a selection bonus game, if a player arranges three END icons, the selection bonus game is completed and then the routine reverts to a normal game (a base game).

<<4-1st Functional Flowchart>>

FIG. 2H is a view showing a 4-1st functional flowchart. The 4-1st functional flowchart has a game entertainment property that there is a branch between an extended game loop (continue) and an end in only a free game, and an extended bonus game is selected from among a plurality of games.

<In Normal Game>

No bonus game symbols are assigned on reel bands employed in a normal game (while in a normal game, i.e., while in a base game), and therefore, transfer to an extended bonus game is not realized unless a free game is played. This normal game (base game) is defined so that "Base" is 35%.

When symbols are rearranged in a normal game (a base game), if three or more free game symbols appear, the routine transfers to a free game. In a game according to the 4-1st functional flowchart, a probability of enabling transfer from the normal game to the free game is 1/38.9. An average amount of use taken until the routine transfers from the normal game to the free game is 759. When the routine transfers to the free game, lottery processing of continuation rate in extended game loop is executed. For example, lottery processing is executed so that the continuation rate is 66%, 79%, 85%, or 89%. At this time point, the number of free game icons to be inserted into an extended bonus game is determined in accordance with a result of the lottery processing. The easiness of entry into an extended game between the free game and the extended bonus game can be adjusted in accordance with the number of free game icons. Alternatively, the contents of free game icons may be determined in place of the number of free game icons to be inserted into the extended bonus game. The easiness of entry into an extended game between the free game and the extended bonus game can be adjusted in accordance with the contents of free game icons as well.

In the 4-1st functional flowchart, when a continuation rate (a loop rate) is 66%, an average number of extended games is 2.9 times, and an average prize is 544. When the continuation rate is 79%, the average number of extended games is 4.8 times, and the average prize is 881. When the continuation rate is 84%, the average number of extended games is 6.3 times, and the average prize is 1,156. When the continuation rate is 88%, the average number of extended games is 8.3 times, and the average prize is 1,542. In a game according to the 4-1st functional flowchart, an average loop rate is 72%, an average number of continuations is 3.6 times, and the average prize is 668. In addition, an average prize in each loop is 185.

<Free Game>

In a game according to the 4-1st functional flowchart, ten unit games can be played as a free game. If three bonus game symbols cannot be generated until the ten unit games are consumed, the free game completes and then the routine reverts to a normal game. It is to be noted that the number of unit games is a minimum number of games (a minimally guaranteed number of games), and is changed in accordance with a continuation rate. For example, the number of unit games can be changed in accordance with a result of an extended bonus game. The free game functions as a change zone indicating that a current state is maintained. When the routine transfers to the free game, bonus game symbols that have not existed in a normal game (a base game) can appear in reel bands. In this manner, the bonus game symbols are inserted into reel bands employed in a free game, thereby making it possible to generate an opportunity of enabling transfer to an extended bonus game. A continuation rate in extended game loop can be determined in accordance with the number of bonus game symbols that are inserted into the reel bands employed in the free game. A prize in the free game is almost nothing (very low), and the prize is 24, for example. In the free game, if three bonus game symbols appear, the routine transfers to the extended bonus game.

<Bonus Game (Extended Bonus Game)>

In the 4-1st functional flowchart, one of three kinds of games can be selected as an extended bonus game. When the routine transfers from a free game, a processing operation of selecting one of the three kinds of games can be first executed. A selection symbols are then displayed on three of five reels on the lower image display panel 141 to be described later. A player touches one of the displayed symbols to be thereby able to select a game that corresponds to the touched symbol. Three kinds of games that a player can select are a selection bonus game, a race game, and a fixed prize game.

It is to be noted that, in the lower image display panel 141, selection symbols are displayed in such a manner that the contents of a game that corresponds to each of the three selection symbols cannot be visually recognized. Doing this makes it possible to impart a tense atmosphere or a sense of expectation to a player.

<Selection Bonus Game>

A Selection bonus game is a game that is played by a player icon selection. Twenty icons are displayed on the lower image display panel 141 to be described later, a player is caused to select one icon, and then, a game whose contents are defined in accordance with the selected icon type is executed. A fixed prize, a mini-game, and a free game are assigned to the icons. The numbers of fixed prizes, mini-games, and free games assigned to the icons are predetermined in accordance with a continuation rate. The numbers assigned to the icons are determined in accordance with a lottery result of continuation rate.

In a case where the number of free game icons is small, return from a selection bonus game to a free game can be hardly realized and then entry into an extended game can be easily realized. Alternatively, in a case where the number of free game icons is large in the selection bonus game, return from the selection bonus game to a free game can be easily realized and then entry into an extended game can be easily realized. While the number of icons assigned to the free game is predetermined in accordance with a continuation rate, the number of icons that are employed in the selection bonus game may be determined in accordance with the continuation rate that is determined in lottery processing.

The selection bonus game can be continued until a player selects an icon to which a free game is assigned. A prize of the selection bonus game is 266 on average. When a player selects a free game icon, the selection bonus game is completed. When the selection bonus game completes, the routine reverts to the free game.

A plurality of various kinds of contents are predetermined for an icon to which a free game is assigned. The number of unit games in the free game or the number of bonus game symbols to be inserted into reel bands when a free game starts is different depending on an icon type that is selected by a player.

For example, icons to which free games are assigned include icons such as an icon in which the number of free games is defined (hereinafter, referred to as a number-of-games icon); another icon in which the number of free game symbols is defined (hereinafter, referred to as a number-of-symbols icon); or still another icon in which the number of bonus game symbols is set to zero (hereinafter, a zero game icon).

In a case where a player selects a number-of-games icon in a selection bonus game, when the routine reverts from the selection bonus game to a free game, the number of games that is defined in the number-of-games icon is added to the number of games and then a free game can be played. Doing this makes it possible to increase the number of unit games in which a player can play as a free game.

In a case where a player selects a number-of-symbols icon, when the routine reverts from a selection bonus game to a free game, free game symbols whose number is defined in the number-of-symbols icon are displayed after added to reel bands in the free game. Doing this increases a possibility that free game symbols are arranged when symbols are rearranged after the free game has been played.

In a case where a player selects a zero game icon, when the routine reverts from a selection bonus game to a free game, the number of bonus game symbols that are displayed on reel bands in the free game is set to zero. That is, no bonus symbols are displayed on the reel bands used in the free game. Therefore, there is no possibility of enabling transfer from the free game to the selection bonus game.

<Race Game>

A race game is a game in which an image indicating that a plurality of characters compete against each other is displayed on the lower image display panel 141 and then a player predicts rankings of the characters. As a result of racing, a predetermined prize is imparted to a player according to the ranking that the player has predicted. A prize in the race game is 136 on average. When the result of the racing is determined, the race game is completed. When the race game completes, the routine reverts to a free game.

<Fixed Prize Game>

A fixed prize game is a game in which a plurality of icons are displayed on the lower image display panel 141 and then a player selects one icon. A predetermined fixed prize is assigned in advance to each of the plurality of icons. A player selects one of the plurality of icons. A fixed prize assigned to the icon that is selected by the player is awarded to the player. The prize in the fixed prize game is 30 to 150, and is 80 on average. When the fixed prize game completes, the routine reverts to a free game.

As described above, when a selection bonus game, a race game, or a fixed prize game completes, the routine reverts to a free game.

As described above, in the 4-1st functional flowchart, while ten unit games can be played as a free game, the number of games is a minimum number of games, and is changed in accordance with a continuation rate. For example, the number of games can be changed in accordance with a result of an extended bonus game. By doing this, the easiness of entry into an extended game between the free game and the extended bonus game can be adjusted.

<<4-2nd Functional Flowchart>>

FIG. 2I is a view showing a 4-2nd functional flowchart. The 4-2 functional flowchart has a game entertainment property that there is a branch between an extended game loop (continue) and an end in only a free game, and an extended bonus game is selected from among a plurality of games.

<In Normal Game>

No bonus game symbols are assigned on reel bands employed in a normal game (while in a normal game, i.e., while in a base game), and therefore, transfer to an extended bonus game is not realized unless a free game is played. This normal game (base game) is defined so that “Base” is 30%.

When symbols are rearranged in a normal game (a base game), if three or more free game symbols appear, the routine transfers to a free game. In a game according to the 4-2nd functional flowchart, a probability of enabling transfer from the normal game to the free game is 1/38.9. An average amount of use taken until the routine transfers from the normal game to the free game is 817. When the routine transfers to the free game, lottery processing of continuation rate in extended game loop is executed. For example, lottery processing is executed so that the continuation rate is 66%, 79%, 85%, or 89%. At this time point, the number of free game icons to be inserted into an extended bonus game is determined in accordance with a result of the lottery processing. The easiness of entry into an extended game between the free game and the extended bonus game can be adjusted in accordance with the number of free game icons. Alternatively, the contents of free game icons may be determined in place of the number of free game icons to be inserted into the extended bonus game. The easiness of entry into an extended game between the free game and the extended bonus game can be adjusted in accordance with the contents of free game icons as well.

In the 4-2nd functional flowchart, when a continuation rate (a loop rate) is 66%, an average number of extended games is 2.9 times, and an average prize is 588. When the continuation rate is 79%, the average number of extended games is 4.8 times, and the average prize is 952. When the continuation rate is 84%, the average number of extended games is 6.3 times, and the average prize is 1,250. When the continuation rate is 88%, the average number of extended games is 8.3 times, and the average prize is 1,667. In a game according to the 4-2nd functional flowchart, an average loop rate is 72%, an average number of continuations is 3.6 times, and the average prize is 723. In addition, an average prize in each loop is 200.

<Free Game>

In a game according to the 4-2nd functional flowchart, ten unit games can be played as a free game. If three bonus game symbols cannot be generated until the ten unit games are consumed, the free game completes and then the routine reverts to a normal game. It is to be noted that the number of unit games is a minimum number of games (a minimally guaranteed number of games), and is changed in accordance with a continuation rate. For example, the number of unit games can be changed in accordance with a result of an extended bonus game. The free game functions as a change zone indicating that a current state is maintained. When the routine transfers to the free game, bonus game symbols that have not existed in a normal game (a base game) can appear in reel bands. In this manner, the bonus game symbols are inserted into reel bands employed in a free game, thereby making it possible to generate an opportunity of enabling transfer to an extended bonus game. A continuation rate in extended game loop can be determined in accordance with the number of bonus game symbols that are inserted into the reel bands employed in the free game. A prize in the free game is almost nothing (very low), and the prize is 24, for example. In the free game, if three bonus game symbols appear, the routine transfers to the extended bonus game.

<Bonus Game (Extended Bonus Game)>

In the 4-2nd functional flowchart, one of three kinds of games can be selected as an extended bonus game. When the routine transfers from a free game, a processing operation of selecting one of the three kinds of games can be first executed. A selection symbols are then displayed on three of five reels on the lower image display panel 141 to be described later. A player touches one of the displayed symbols to be thereby able to select a game that corresponds to the touched symbol. Three kinds of games that a player can select are a selection bonus game, a race game, and a fixed prize game.

It is to be noted that, in the lower image display panel 141, selection symbols are displayed in such a manner that the contents of a game that corresponds to each of the three selection symbols cannot be visually recognized. Doing this makes it possible to impart a tense atmosphere or a sense of expectation to a player.

<Selection Bonus Game>

A Selection bonus game is a game that is played by a player icon selection. Twenty icons are displayed on the lower image display panel 141 to be described later, a player is caused to select one icon, and then, a game whose contents are defined in accordance with the selected icon type is executed. A fixed prize, a mini-game, and a free game are assigned to the icons. The numbers of fixed prizes, mini-games, and free games assigned to the icons are predetermined in accordance with a continuation rate. The numbers assigned to the icons are determined in accordance with a lottery result of continuation rate.

In a case where the number of free game icons is small, return from a selection bonus game to a free game can be hardly realized and then entry into an extended game can be easily realized. Alternatively, in a case where the number of free game icons is large in the selection bonus game, return from the selection bonus game to a free game can be easily realized and then entry into an extended game can be easily realized. While the number of icons assigned to the free game is predetermined in accordance with a continuation rate, the number of icons that are employed in the selection bonus game may be determined in accordance with the continuation rate that is determined in lottery processing.

The selection bonus game can be continued until a player selects an icon to which a free game is assigned. A prize of the selection bonus game is 302 on average. When a player selects a free game icon, the selection bonus game is completed. When the selection bonus game completes, the routine reverts to the free game.

A plurality of various kinds of contents are predetermined for an icon to which a free game is assigned. The number of unit games in the free game or the number of bonus game symbols to be inserted into reel bands when a free game starts is different depending on an icon type that is selected by a player.

For example, icons to which free games are assigned include icons such as an icon in which the number of free games is defined (hereinafter, referred to as a number-of-games icon); another icon in which the number of free game symbols is defined (hereinafter, referred to as a number-of-symbols icon); or still another icon in which the number of bonus game symbols is set to zero (hereinafter, a zero game icon).

In a case where a player selects a number-of-games icon in a selection bonus game, when the routine reverts from the selection bonus game to a free game, the number of games that is defined in the number-of-games icon is added to the number of games and then a free game can be played. Doing this makes it possible to increase the number of unit games in which a player can play as a free game.

In a case where a player selects a number-of-symbols icon, when the routine reverts from a selection bonus game to a free game, free game symbols whose number is defined in the number-of-symbols icon are displayed after added to reel bands in the free game. Doing this increases a possibility that free game symbols are arranged when symbols are rearranged after the free game has been played.

In a case where a player selects a zero game icon, when the routine reverts from a selection bonus game to a free game, the number of bonus game symbols that are displayed on reel bands in the free game is set to zero. That is, no bonus symbols are displayed on the reel bands used in the free game. Therefore, there is no possibility of enabling transfer from the free game to the selection bonus game.

<Race Game>

A race game is a game in which an image indicating that a plurality of characters compete against each other is displayed on the lower image display panel 141 and then a player predicts rankings of the characters. As a result of racing, a predetermined prize is imparted to a player according to the ranking that the player has predicted. A prize in the race game is 136 on average. When the result of the racing is determined, the race game is completed. When the race game completes, the routine reverts to a free game.

<Fixed Prize Game>

A fixed prize game is a game in which a plurality of icons are displayed on the lower image display panel 141 and then a player is caused to select one icon. A predetermined fixed prize is assigned in advance to each of the plurality of icons. A player is caused to select one of the plurality of icons. A fixed prize assigned to the icon that is selected by the player is awarded to the player. The prize in the fixed prize game is 30 to 150, and is 90 on average. When the fixed prize game completes, the routine reverts to a free game.

As described above, when a selection bonus game, a race game, or a fixed prize game completes, the routine reverts to a free game.

As described above, in the 4-2nd functional flowchart, while ten unit games can be played as a free game, the number of games is a minimum number of games, and is changed in accordance with a continuation rate. For example, the number of games can be changed in accordance with a result of an extended bonus game. By doing this, the easiness of entry into an extended game between the free game and the extended bonus game can be adjusted.

<<4-3rd Functional Flowchart>>

FIG. 2J is a view showing a 4-3rd functional flowchart. The 4-3rd functional flowchart has a game entertainment property that there is a branch between an extended game loop (continue) and an end in only a free game, and an extended bonus game is selected from among a plurality of games.

<In Normal Game>

No bonus game symbols are assigned on reel bands employed in a normal game (while in a normal game, i.e., while in a base game), and therefore, transfer to an extended bonus game is not realized unless a free game is played. This normal game (base game) is defined so that "Base" is 35%.

When symbols are rearranged in a normal game (a base game), if three or more free game symbols appear, the routine transfers to a free game. In a game according to the 4-3rd functional flowchart, a probability of enabling transfer from the normal game to the free game is 1/60. An average amount of use taken until the routine transfers from the normal game to the free game is 1,170. When the routine transfers to the free game, lottery processing of continuation rate in extended game loop is executed. For example, lottery processing is executed so that the continuation rate is 66%, 79%, 85%, or 89%. At this time point, the number of free game icons to be inserted into an extended bonus game is determined in accordance with a result of the lottery processing. The easiness of entry into an extended game between the free game and the extended bonus game can be adjusted in accordance with the number of free game icons. Alternatively, the contents of free game icons may be determined in place of the number of free game icons to be inserted into the extended bonus game. The easiness of entry into an extended game between the free game and the extended bonus game can be adjusted in accordance with the contents of free game icons as well.

In the 4-3rd functional flowchart, when a continuation rate (a loop rate) is 66%, an average number of extended games is 2.9 times, and an average prize is 835. When the continuation rate is 79%, the average number of extended games is 4.8 times, and the average prize is 1,352. When the continuation rate is 84%, the average number of extended games is 6.3 times, and the average prize is 1,775. When the continuation rate is 88%, the average number of extended games is 8.3 times, and the average prize is 2,367. In a game according to the 4-3rd functional flowchart, an average loop rate is 72%, an average number of continuations is 3.6 times, and the average prize is 1,027. In addition, an average prize in each loop is 284.

<Free Game>

In a game according to the 4-3rd functional flowchart, ten unit games can be played as a free game. If three bonus game symbols cannot be generated until the ten unit games are consumed, the free game completes and then the routine reverts to a normal game. It is to be noted that the number of unit games is a minimum number of games (a minimally guaranteed number of games), and is changed in accordance with a continuation rate. For example, the number of unit games can be changed in accordance with a result of an extended bonus game. The free game functions as a change zone indicating that a current state is maintained. When the routine transfers to the free game, bonus game symbols that have not existed in a normal game (a base game) can appear in reel bands. In this manner, the bonus game symbols are inserted into reel bands employed in a free game, thereby making it possible to generate an opportunity of enabling transfer to an extended bonus game. A continuation rate in extended game loop can be determined in accordance with the number of bonus game symbols that are inserted into the reel bands employed in the free game. A prize in the free game is almost nothing (very low), and the prize is 24, for example. In the free game, if three bonus game symbols appear, the routine transfers to the extended bonus game.

<<Bonus Game (Extended Bonus Game)>

In the 4-3rd functional flowchart, one of three kinds of games can be selected as an extended bonus game. When the routine transfers from a free game, a processing operation of selecting one of the three kinds of games can be first executed. A selection symbols are then displayed on three of five reels on the lower image display panel 141 to be described later. A player touches one of the displayed symbols to be thereby able to select a game that corresponds to the touched symbol. Three kinds of games that a player can select are a selection bonus game, a race game, and a fixed prize game.

It is to be noted that, in the lower image display panel 141, selection symbols are displayed in such a manner that the contents of a game that corresponds to each of the three selection symbols cannot be visually recognized. Doing this makes it possible to impart a tense atmosphere or a sense of expectation to a player.

<Selection Bonus Game>

A Selection bonus game is a game that is played by a player icon selection. Twenty icons are displayed on the lower image display panel 141 to be described later, a player is caused to select one icon, and then, a game whose contents are defined in accordance with the selected icon type is executed. A fixed prize, a mini-game, and a free game are assigned to the icons. The numbers of icons to which the fixed prize, mini-game, and free game are assigned are predetermined in accordance with a continuation rate. The numbers of icons to which they are assigned are determined in accordance with a lottery result of continuation rate.

In a case where the number of free game icons is small, return from a selection bonus game to a free game can be hardly realized and then entry into an extended game can be easily realized. Alternatively, in a case where the number of free game icons is large in the selection bonus game, return from the selection bonus game to a free game can be easily realized and then entry into an extended game can be easily realized. While the number of icons assigned to the free game is predetermined in accordance with a continuation rate, the number of icons that are employed in the selection bonus game may be determined in accordance with the continuation rate that is determined in lottery processing.

The selection bonus game can be continued until a player selects an icon to which a free game is assigned. A prize of the selection bonus game is 430 on average. When a player selects a free game icon, the selection bonus game is completed. When the selection bonus game completes, the routine reverts to the free game.

A plurality of various kinds of contents are predetermined for an icon to which a free game is assigned. The number of unit games in the free game or the number of bonus game symbols to be inserted into reel bands when a free game starts is different depending on an icon type that is selected by a player.

For example, icons to which free games are assigned include icons such as an icon in which the number of free games is defined (hereinafter, referred to as a number-of-games icon); another icon in which the number of free game symbols is defined (hereinafter, referred to as a number-of-symbols icon); or still another icon in which the number of bonus game symbols is set to zero (hereinafter, a zero game icon).

In a case where a player selects a number-of-games icon in a selection bonus game, when the routine reverts from the selection bonus game to a free game, the number of games that is defined in the number-of-games icon is added to the number of games and then a free game can be played. Doing this makes it possible to increase the number of unit games in which a player can play as a free game.

In a case where a player selects a number-of-symbols icon, when the routine reverts from a selection bonus game to a free game, free game symbols whose number is defined in the number-of-symbols icon are displayed after added to reel bands in the free game. Doing this increases a possibility that free game symbols are arranged when symbols are rearranged after the free game has been played.

In a case where a player selects a zero game icon, when the routine reverts from a selection bonus game to a free game, the number of bonus game symbols that are displayed on reel bands in the free game is set to zero. That is, no bonus symbols are displayed on the reel bands used in the free game. Therefore, there is no possibility of enabling transfer from the free game to the selection bonus game.

<Race Game>

A race game is a game in which an image indicating that a plurality of characters compete against each other is displayed on the lower image display panel 141 and then a player predicts rankings of the characters. As a result of racing, a predetermined prize is imparted to a player according to the ranking that the player has predicted. A prize in the race game is 221 on average. When the result of the racing is determined, the race game is completed. When the race game completes, the routine reverts to a free game.

<Fixed Prize Game>

A fixed prize game is a game in which a plurality of icons are displayed on the lower image display panel 141 and then a player is caused to select one icon. A predetermined fixed prize is assigned in advance to each of the plurality of icons. A player selects one of the plurality of icons. A fixed prize assigned to the icon that is selected by the player is awarded to the player. The prize in the fixed prize game is 30 to 300, and is 128 on average. When the fixed prize game completes, the routine reverts to a free game.

As described above, when a selection bonus game, a race game, or a fixed prize game completes, the routine reverts to a free game.

As described above, in the 4-3rd functional flowchart, while ten unit games can be played as a free game, the number of games is a minimum number of games, and is changed in accordance with a continuation rate. For example, the number of games can be changed in accordance with a result of an extended bonus game. By doing this, the easiness of entry into an extended game between the free game and the extended bonus game can be adjusted.

<<4-4th Functional Flowchart>>

FIG. 2K is a view showing a 4-4th functional flowchart. The 4-4th functional flowchart has a game entertainment property that there is a branch between an extended game loop (continue) and an end in only a free game, and an extended bonus game is selected from among a plurality of games.

<In Normal Game>

No bonus game symbols are assigned on reel bands employed in a normal game (while in a normal game, i.e., while in a base game), and therefore, transfer to an extended bonus game is not realized unless a free game is played. This normal game (base game) is defined so that "Base" is 30%.

When symbols are rearranged in a normal game (a base game), if three or more free game symbols appear, the routine transfers to a free game. In a game according to the 4-4th functional flowchart, a probability of enabling transfer from the normal game to the free game is 1/60. An average amount of use taken until the routine transfers from the normal game to the free game is 1,260. When the routine transfers to the free game, lottery processing of continuation rate in extended game loop is executed. For example, lottery processing is executed so that the continuation rate is 66%, 79%, 85%, or 89%. At this time point, the number of free game icons to be inserted into an extended bonus game is determined in accordance with a result of the lottery processing. The easiness of entry into an extended game between the free game and the extended bonus game can be adjusted in accordance with the number of free game icons. Alternatively, the contents of free game icons may be determined in place of the number of free game icons to be inserted into the extended bonus game. The easiness of entry into an extended game between the free game and the extended bonus game can be adjusted in accordance with the contents of free game icons as well.

In the 4-4th functional flowchart, when a continuation rate (a loop rate) is 66%, an average number of extended games is 2.9 times, and an average prize is 909. When the continuation rate is 79%, the average number of extended games is 4.8 times, and the average prize is 1,471, When the continuation rate is 84%, the average number of extended games is 6.3 times, and the average prize is 1,931. When the continuation rate is 88%, the average number of extended games is 8.3 times, and the average prize is 2,575. In a game according to the 4-4th functional flowchart, an average loop rate is 72%, an average number of continuations is 3.6 times, and the average prize is 1,119. In addition, an average prize in each loop is 309.

<Free Game>

In a game according to the 4-4th functional flowchart, ten unit games can be played as a free game. If three bonus game symbols cannot be generated until the ten unit games are consumed, the free game completes and then the routine reverts to a normal game. It is to be noted that the number of unit games is a minimum number of games (a minimally guaranteed number of games), and is changed in accordance with a continuation rate. For example, the number of unit games can be changed in accordance with a result of an extended bonus game. The free game functions as a change zone indicating that a current state is maintained. When the routine transfers to the free game, bonus game symbols that have not existed in a normal game (a base game) can appear in reel bands. In this manner, the bonus game symbols are inserted into reel bands employed in a free game, thereby making it possible to generate an opportunity of enabling transfer to an extended bonus game. A continuation rate in extended game loop can be determined in accordance with the number of bonus game symbols that are inserted into the reel bands employed in the free game. A prize in the free game is almost nothing (very low), and the prize is 24, for example. In the free game, if three bonus game symbols appear, the routine transfers to the extended bonus game.

<<Bonus Game (Extended Bonus Game>

In the 4-4th functional flowchart, one of three kinds of games can be selected as an extended bonus game. When the routine transfers from a free game, a processing operation of selecting one of the three kinds of games can be first executed. A selection symbols are then displayed on three of five reels on the lower image display panel 141 to be described later. A player touches one of the displayed symbols to be thereby able to select a game that corresponds to the touched symbol. Three kinds of games that a player can select are a selection bonus game, a race game, and a fixed prize game.

It is to be noted that, in the lower image display panel 141, selection symbols are displayed in such a manner that the contents of a game that corresponds to each of the three selection symbols cannot be visually recognized. Doing this makes it possible to impart a tense atmosphere or a sense of expectation to a player.

<Selection Bonus Game>

A Selection bonus game is a game that is played by a player icon selection. Twenty icons are displayed on the lower image display panel 141 to be described later, a player is caused to select one icon, and then, a game whose contents are defined in accordance with the selected icon type is executed. A fixed prize, a mini-game, and a free game are assigned to the icons. The numbers of icons to which the fixed prize, mini-game, and free game are assigned are predetermined in accordance with a continuation rate. The numbers assigned to the icons are determined in accordance with a lottery result of continuation rate.

In a case where the number of free game icons is small, return from a selection bonus game to a free game can be hardly realized and then entry into an extended game can be easily realized. Alternatively, in a case where the number of free game icons is large in the selection bonus game, return from the selection bonus game to a free game can be easily realized and then entry into an extended game can be easily realized. While the number of icons assigned to the free game is predetermined in accordance with a continuation rate, the number of icons that are employed in the selection bonus game may be determined in accordance with the continuation rate that is determined in lottery processing.

The selection bonus game can be continued until a player selects an icon to which a free game is assigned. A prize of the selection bonus game is 456 on average. When a player selects a free game icon, the selection bonus game is completed. When the selection bonus game completes, the routine reverts to the free game.

A plurality of various kinds of contents are predetermined for an icon to which a free game is assigned. The number of unit games in the free game or the number of bonus game symbols to be inserted into reel bands when a free game starts is different depending on an icon type that is selected by a player.

For example, icons to which free games are assigned include icons such as an icon in which the number of free games is defined (hereinafter, referred to as a number-of-games icon); another icon in which the number of free game symbols is defined (hereinafter, referred to as a number-of-symbols icon); or still another icon in which the number of bonus game symbols is set to zero (hereinafter, a zero game icon).

In a case where a player selects a number-of-games icon in a selection bonus game, when the routine reverts from the selection bonus game to a free game, the number of games that is defined in the number-of-games icon is added to the number of games and then a free game can be played. Doing this makes it possible to increase the number of unit games in which a player can play as a free game.

In a case where a player selects a number-of-symbols icon, when the routine reverts from a selection bonus game to a free game, free game symbols whose number is defined in the number-of-symbols icon are displayed after added to reel bands in the free game. Doing this increases a possibility that free game symbols are arranged when symbols are rearranged after the free game has been played.

In a case where a player selects a zero game icon, when the routine reverts from a selection bonus game to a free game, the number of bonus game symbols that are displayed on reel bands in the free game is set to zero. That is, no bonus symbols are displayed on the reel bands used in the free game. Therefore, there is no possibility of transfer from the free game to the selection bonus game.

<Race Game>

A race game is a game in which an image indicating that a plurality of characters compete against each other is displayed on the lower image display panel 141 and then a player predicts rankings of the characters. As a result of racing, a predetermined prize is imparted to a player according to the ranking that the player has predicted. A prize in the race game is 271 on average. When the result of the racing is determined, the race game is completed. When the race game completes, the routine reverts to a free game.

<Fixed Prize Game>

A fixed prize game is a game in which a plurality of icons are displayed on the lower image display panel 141 and then a player is caused to select one icon. A predetermined fixed prize is assigned in advance to each of the plurality of icons. A player selects one of the plurality of icons. A fixed prize assigned to the icon that is selected by the player is awarded to the player. The prize in the fixed prize game is 30 to 300, and is 128 on average. When the fixed prize game completes, the routine reverts to a free game.

As described above, when a selection bonus game, a race game, or a fixed prize game completes, the routine reverts to a free game.

As described above, in the 4-4th functional flowchart, while ten unit games can be played as a free game, the number of games is a minimum number of games, and is changed in accordance with a continuation rate. For example, the number of games can be changed in accordance with a result of an extended bonus game. By doing this, the easiness of entry into an extended game between the free game and the extended bonus game can be adjusted.

<<Fifth Functional Flowchart>>

FIG. 2L is a view showing a fifth functional flowchart. The fifth functional flowchart has a game entertainment property that there is a branch between an extended game loop (continue) and an end in only a free game, and an extended bonus game is selected from among a plurality of games.

<In Normal Game>

No bonus game symbols are assigned on reel bands employed in a normal game (while in a normal game, i.e., while in a base game), and therefore, transfer to an extended bonus game is not realized unless a free game is played. This normal game (base game) is defined so that “Base” is 35%.

When symbols are rearranged in a normal game (a base game), if three or more free game symbols appear, the routine transfers to a free game. In a game according to the fifth functional flowchart, a probability of enabling transfer from the normal game to the free game is 1/60. An average amount of use taken until the routine transfers from the normal game to the free game is 1,170. When the routine transfers to the free game, lottery processing of continuation rate in extended game loop is executed. For example, lottery processing is executed so that the continuation rate is 66%, 79%, 85%, or 89%. At this time point, the number of free game icons to be inserted into an extended bonus game is determined in accordance with a result of the lottery processing. The easiness of entry into an extended game between the free game and the extended bonus game can be adjusted in accordance with the number of free game icons. Alternatively, the contents of free game icons may be determined in place of the number of free game icons to be inserted into the extended bonus game. The easiness of entry into an extended game between the free game and the extended bonus game can be adjusted in accordance with the contents of free game icons as well.

In the fifth functional flowchart, when a continuation rate (a loop rate) is 66%, an average number of extended games is 2.9 times, and an average prize is 835. When the continuation rate is 79%, the average number of extended games is 4.8 times, and the average prize is 1,352. When the continuation rate is 84%, the average number of extended games is 6.3 times, and the average prize is 1,775. When the continuation rate is 88%, the average number of extended games is 8.3 times, and the average prize is 2,367. In a game according to the fifth functional flowchart, an average loop rate is 72%, an average number of continuations is 3.6 times, and the average prize is 1,027. In addition, an average prize in each loop is 284.

<Free Game>

In the game according to the fifth functional flowchart, ten unit games can be played as a free game. If three END symbols are generated until the ten unit games are consumed, the free game completes and then the routine reverts to a normal game. It is to be noted that the number of unit games is a minimum number of games (a minimally guaranteed number of games), and is changed in accordance with a result of an extended bonus game. The free game is low in payout rate and serves as a chance zone indicating that a current state is maintained. When the routine transfers to the free game, bonus game symbols and END symbols that have not existed in a normal game (a base game) can be generated in reel bands. In this manner, the bonus game symbols are inserted into the reel bands employed in the free game, thereby making it possible to generate an opportunity of enabling transfer to the extended bonus game. The continuation rate in extended game loop can be determined in accordance with the number of bonus game symbols to be inserted into the reel bands employed in the free game. The prize in the free game is almost nothing (very low), and the prize is 24, for example. If three END symbols appear in the free game, the routine transfers to the extended bonus game. In addition, if three END symbols appear while in a free game, the free game is completed and then the routine reverts to a base game.

<Bonus Game (Extended Bonus Game)>

In the fifth functional flowchart, one of three kinds of games can be selected as an extended bonus game. When the routine transfers from a free game, a processing operation of selecting one of the three kinds of games can be first executed. A selection symbols are then displayed on three of five reels on the lower image display panel 141 to be described later. A player touches one of the displayed symbols to be thereby able to select a game that corresponds to the touched symbol. Three kinds of games that a player can select are a selection bonus game, a race game, and a fixed prize game.

It is to be noted that, in the lower image display panel 141, selection symbols are displayed in such a manner that the contents of a game that corresponds to each of the three selection symbols cannot be visually recognized. Doing this makes it possible to impart a tense atmosphere or a sense of expectation to a player.

<Selection Bonus Game>

A Selection bonus game is a game that is played by a player icon selection. Twenty icons are displayed on the lower image display panel 141 to be described later, a player is caused to select one icon, and then, a game whose contents are defined in accordance with the selected icon type is executed. A fixed prize, a mini-game, and a free game are assigned to the icons. The numbers of icons to which the fixed prize, mini-game, and free game are assigned are predetermined in accordance with a continuation rate. The numbers assigned to the icons are determined in accordance with a lottery result of continuation rate.

In a case where the number of free game icons is small, return from a selection bonus game to a free game can be hardly realized and then entry into an extended game can be easily realized. Alternatively, in a case where the number of free game icons is large in the selection bonus game, return from the selection bonus game to a free game can be easily realized and then entry into an extended game can be easily realized. While the number of icons assigned to the free game is predetermined in accordance with a continuation rate, the number of icons that are employed in the selection bonus game may be determined in accordance with the continuation rate that is determined in lottery processing.

The selection bonus game can be continued until a player selects an icon to which a free game is assigned. A prize of the selection bonus game is 418 on average. When a player selects a free game icon, the selection bonus game is completed. When the selection bonus game completes, the routine reverts to the free game.

A plurality of various kinds of contents are predetermined for an icon to which a free game is assigned. The number of unit games in the free game or the number of bonus game symbols to be inserted into reel bands when a free game starts is different depending on an icon type that is selected by a player.

For example, icons to which free games are assigned include icons such as an icon in which the number of free games is defined (hereinafter, referred to as a number-of-games icon); another icon in which the number of free game symbols is defined (hereinafter, referred to as a number-of-symbols icon); or still another icon in which the number of bonus game symbols is set to zero (hereinafter, a zero game icon).

In a case where a player selects a number-of-games icon in a selection bonus game, when the routine reverts from the selection bonus game to a free game, the number of games that is defined in the number-of-games icon is added to the number of games and then a free game can be played. Doing this makes it possible to increase the number of unit games in which a player can play as a free game.

In a case where a player selects a number-of-symbols icon, when the routine reverts from a selection bonus game to a free game, free game symbols whose number is defined in the number-of-symbols icon are displayed after added to reel bands in the free game. Doing this increases a possibility that free game symbols are arranged when symbols are rearranged after the free game has been played.

In a case where a player selects a zero game icon, when the routine reverts from a selection bonus game to a free game, the number of bonus game symbols that are displayed on reel bands in the free game is set to zero. That is, no bonus symbols are displayed on the reel bands used in the free game. Therefore, there is no possibility of enabling transfer from the free game to the selection bonus game.

<Race Game>

A race game is a game in which an image indicating that a plurality of characters compete against each other is displayed on the lower image display panel 141 and then a player predicts rankings of the characters. As a result of racing, a predetermined prize is imparted to a player according to the ranking that the player has predicted. A prize in the race game is 271 on average. When the result of the racing is determined, the race game is completed. When the race game completes, the routine reverts to a free game.

<Fixed Prize Game>

A fixed prize game is a game in which a plurality of icons are displayed on the lower image display panel 141 and then a player is caused to select one icon. A predetermined fixed prize is assigned in advance to each of the plurality of icons. A player is caused to select one of the plurality of icons. A fixed prize assigned to the icon that is selected by the player is awarded to the player. The prize in the fixed prize game is 30 to 150, and is 92 on average. When the fixed prize game completes, the routine reverts to a free game.

As described above, when a selection bonus game, a race game, or a fixed prize game completes, the routine reverts to a free game.

As described above, in the fifth functional flowchart, while ten unit games can be played as a free game, the number of games is a minimum number of games, and is changed in accordance with a continuation rate. For example, the number of games can be changed in accordance with a result of an extended bonus game. By doing this, the easiness of entry into an extended game between the free game and the extended bonus game can be adjusted.

<<Sixth Functional Flowchart>>

FIG. 2M is a view showing a sixth functional flowchart. The sixth functional flowchart has a game entertainment property that there is a branch between a loop (continue) and an end in each of a free game and an extended bonus game.

<In Normal Game>

No bonus game symbols are assigned on reel bands employed in a normal game (while in a normal game, i.e., while in a base game), and therefore, transfer to an extended bonus game is not realized unless a free game is played. This normal game (base game) is defined so that "Base" is 35%.

When symbols are rearranged in a normal game (a base game), if three or more free game symbols appear, the routine transfers to a free game. In a game according to the fifth functional flowchart, a probability of enabling transfer from the normal game to the free game is 1/60. An average amount of use taken until the routine transfers from the normal game to the free game is 1,170. When the routine transfers to the free game, lottery processing of continuation rate in extended game loop is executed. For example, lottery processing is executed so that the continuation rate is 66%, 79%, 85%, or 89%. At this time point, the number of free game icons to be inserted into an extended bonus game is determined in accordance with a result of the lottery processing. The easiness of entry into an extended game between the free game and the extended bonus game can be adjusted in accordance with the number of free game icons. Alternatively, the contents of free game icons may be determined in place of the number of free game icons to be inserted into the extended bonus game. The easiness of entry into an extended game between the free game and the extended bonus game can be adjusted in accordance with the contents of free game icons as well.

In the sixth functional flowchart, when a continuation rate (a loop rate) is 66%, an average number of extended games is 2.9 times, and an average prize is 841. When the continuation rate is 79%, the average number of extended games is 4.8 times, and the average prize is 1,362. When the continuation rate is 84%, the average number of extended games is 6.3 times, and the average prize is 1,788. When the continuation rate is 88%, the average number of extended games is 8.3 times, and the average prize is 2,383. In a game according to the sixth functional flowchart, an average loop rate is 72%, an average number of continuations is 3.6 times, and the average prize is 1,034. In addition, an average prize in each loop is 286.

<Free Game>

In a game according to the sixth functional flowchart, a unit game that can be continued until bonus symbols are arranged can be played as a free game. If ten unit games are consumed before bonus games are arranged, the free game completes and then the routine reverts to a normal game. It is to be noted that the number of unit games may be changed in accordance with a continuation rate after defined as a minimum number of games (a minimally guaranteed number of games). For example, the number of unit games may be changed in accordance with a result of an extended bonus game. The free game is low in payout rate, and functions as a chance zone. When the routine transfers to the free game, bonus game symbols are inserted into reel bands. In this manner, the bonus game symbols are inserted into the reel bands employed in the free game, thereby making it possible to generate an opportunity of enabling transfer to the extended bonus game. The continuation rate in extended game loop can be made different depending on the number of bonus game symbols to be inserted into the reel bands employed in the free game. The prize in the free game is 24, for example. If three bonus game symbols appear in the free game, the routine transfers to the extended bonus game.

<Bonus Game (Extended Bonus Game (Selection Bonus Game)>

In the game according to the second functional flowchart, a selection bonus game is played as an extended bonus game. The extended bonus game functions as a selection type game with its high payout rate. The selection bonus game is a game to be played by means of player icon selection. Twenty icons are displayed on the lower image display panel 141 to be described later, a player is caused to select one icon, and then, a game whose contents are defined according to the selected icon type is executed. A fixed prize, a mini-game, a free game, and END are assigned to these icons. A player can continue the selection bonus game until the player selects an icon to which a free game is assigned or an icon to which END is assigned.

For icons to which fixed prizes are assigned, for example, there are three icons whose prize is 150, three icons whose prize is 100, two icons whose prize is 50, and four icons whose prize is 30. When a player selects an icon to which a fixed prize is assigned, the prize indicated by that icon is awarded to the player. Assume that there are three icons to which mini-games are assigned, for example. When a player selects an icon to which a mini-game is assigned, the player plays the mini-game and then the prize according to the result is awarded to the player. Assume that there is one icon to which END is assigned, for example. When a player selects the icon to which END is assigned, a selection bonus game is completed and then the routine reverts to a normal game (a base game). Assume that there are four icons to which free games are assigned, for example. The numbers of fixed prizes, mini-games, free games, and END assigned to the icons are predetermined in accordance with a continuation rate. The number assigned to the icons is determined in accordance with a lottery result of continuation rate.

In a case where the number of free game icons is small, return from a selection bonus game to a free game can be hardly realized and then entry into an extended game can be easily realized. Alternatively, in a case where the number of free game icons is large in the selection bonus game, return from the selection bonus game to a free game can be easily realized and then entry into an extended game can be easily realized. While the number of icons assigned to the free game is predetermined in accordance with a continuation rate, the number of icons that are employed in the selection bonus game may be determined in accordance with the continuation rate that is determined in lottery processing.

An average prize of mini-games is 200, for example. The prize in the selection bonus game is 262, for example. These prizes are merely provided as one example, and changes in accordance with a continuation rate.

In a selection bonus game, If a player selects an icon to which a free game is assigned, the selection bonus game completes and then the routine reverts to the free game. As described above, a plurality of various kinds of contents are predetermined for the icons to which free games are assigned. The number of unit games in the free game or the number of bonus game symbols to be inserted into reel bands when the free game starts is different depending on the icon type selected by a player.

For example, icons to which free games are assigned include icons such as an icon in which the number of free games is defined (hereinafter, referred to as a number-of-games icon); another icon in which the number of free game symbols is defined (hereinafter, referred to as a number-of-symbols icon); or still another icon in which the number of bonus game symbols is set to zero (hereinafter, a zero game icon).

In a case where a player selects a number-of-games icon in a selection bonus game, when the routine reverts from the selection bonus game to a free game, the number of games that is defined in the number-of-games icon is added to the number of games and then a free game can be played. Doing this makes it possible to increase the number of unit games in which a player can play as a free game.

In a case where a player selects a number-of-symbols icon, when the routine reverts from a selection bonus game to a free game, free game symbols whose number is defined in the number-of-symbols icon are displayed after added to reel bands in the free game. Doing this increases a possibility that free game symbols are arranged when symbols are rearranged after the free game has been played.

In a case where a player selects a zero game icon, when the routine reverts from a selection bonus game to a free game, the number of bonus game symbols that are displayed on reel bands in the free game is set to zero. That is, no bonus symbols are displayed on the reel bands used in the free game. Therefore, there is no possibility of transfer from the free game to the selection bonus game.

<<Seventh Functional Flowchart>>

FIG. 2N is a view showing a seventh functional flowchart. The seventh functional flowchart has a game entertainment property that there is a branch between an extended game loop (continue) and an end in only an extended bonus game, and continuing lottery is performed with a timing with which free game symbols are arranged.

<In Normal Game>

No bonus game symbols are assigned on reel bands employed in a normal game (while in a normal game, i.e., while in a base game), and therefore, transfer to an extended bonus game is not realized unless a free game is played. This normal game (base game) is defined so that "Base" is 35%.

When symbols are rearranged in a normal game (a base game), if three or more free game symbols appear, the routine transfers to a free game. In a game according to the seventh functional flowchart, a probability of enabling transfer from the normal game to the free game is 1/60. An average amount of use taken until the routine transfers from the normal game to the free game is 1,170. When the routine transfers to the free game, lottery processing of continuation rate in extended game loop is executed. For example, lottery processing is executed so that the continuation rate is 66%, 79%, 85%, or 89%. At this time point, the number of free game symbols to be inserted into an extended bonus game is determined in accordance with a result of the lottery processing. The easiness of entry into an extended game between the free game and the extended bonus game can be adjusted in accordance with the number of free game symbols.

In the seventh functional flowchart, when a continuation rate (a loop rate) is 66%, an average number of extended games is 2.9 times, and an average prize is 838. When the continuation rate is 79%, the average number of extended games is 4.8 times, and the average prize is 1,357. When the continuation rate is 84%, the average number of extended games is 6.3 times, and the average prize is 1,781. When the continuation rate is 88%, the average number of extended games is 8.3 times, and the average prize is 2,375. In a game according to the sixth functional flowchart, an average loop rate is 72%, an average number of continuations is 3.6 times, and the average prize is 1,030. In addition, an average prize in each loop is 285.

<Free Game (Normal Free Game)>

In a game according to the seventh functional flowchart, a unit game that can be continued until bonus symbols are arranged can be played as a free game. In the game according to the seventh functional flowchart, there is a free game that is playable as an extended bonus game to be described later, and thus, for the sake of clarity, this free game in the seventh functional flowchart may be referred to as a normal free game as well. The normal free game is low in payout rate, and functions as a preparatory step for an extended bonus game. When the routine transfers to the normal free game, bonus game symbols are inserted into reel bands. In this manner, the bonus game symbols are inserted to the reel bands employed in the normal free game, thereby making it possible to generate an opportunity of enabling transfer to the extended bonus game. The prize in the normal free game is 24, for example. If three bonus game symbols appear in the normal free game, the routine transfers to the extended bonus game.

<Bonus Game (Extended Bonus Game (Free Game)>

In the game according to the seventh functional flowchart, a free game is played as an extended bonus game. In the free game as the extended bonus game, eight unit games can be played. When the eight unit games are consumed, the extended bonus game completes and then the routine reverts to a normal game.

The extended bonus game is a free game with its high payout rate. When the routine transfers to the free game as the extended bonus game, free game symbols are inserted into reel bands. The number of bonus game symbols to be inserted into the reel bands is different depending on a continuation rate. In the free game as the extended bonus game, if three free game symbols appear, the routine transfers to a normal free game. The prize in the free game as the extended bonus game is 261, for example. The prize is merely provided as one example, and changes in accordance with the continuation rate.

As described above, in the seventh functional flowchart, the number of free game symbols to be inserted into the extended bonus game (free game) is determined. The easiness of entry into an extended game between the free game and the extended bonus game can be adjusted in accordance with the number of free game symbols.

<<Eighth Functional Flowchart>>

FIG. 20 is a view showing an eighth functional flowchart. The eighth functional flowchart has a game entertainment property that there is a branch between an extended game loop (continue) and an end in only an extended bonus game, and whether or not to enable continuing is displayed by way of image rendering.

<In Normal Game>

No bonus game symbols are assigned on reel bands employed in a normal game (while in a normal game, i.e., while in a base game), and therefore, transfer to an extended bonus game is not realized unless a free game is played. This normal game (base game) is defined so that "Base" is 35%.

When symbols are rearranged in a normal game (a base game), if three or more free game symbols appear, the routine transfers to a free game. In a game according to the seventh functional flowchart, a probability of enabling transfer from the normal game to the free game is 1/60. An average amount of use taken until the routine transfers from the normal game to the free game is 1,170. When the routine transfers to the free game, lottery processing of continuation rate in extended game loop is executed. For example, lottery processing is executed so that the continuation rate is 66%, 79%, 85%, or 89%. At this time point, in accordance with a result of the lottery processing, the progress of a battle in which characters compete against each other is determined in an extended bonus game. The easiness of entry into an extended game between the free game and the extended bonus game can be adjusted in accordance with the progress of the battle in which the characters compete against each other.

In the eighth functional flowchart, when a continuation rate (a loop rate) is 66%, an average number of extended games is 2.9 times, and an average prize is 838. When the continuation rate is 79%, the average number of extended games is 4.8 times, and the average prize is 1,357. When the continuation rate is 84%, the average number of extended games is 6.3 times, and the average prize is 1,781. When the continuation rate is 88%, the average number of extended games is 8.3 times, and the average prize is 2,375. In a game according to the sixth functional flowchart, an average loop rate is 72%, an average number of continuations is 3.6 times, and the average prize is 1,030. In addition, an average prize in each loop is 285.

<Free Game>

In a game according to the eighth functional flowchart, a unit game that can be continued until bonus symbols are arranged can be played as a free game. The free game is low in payout rate, and functions as a preparatory step for an extended bonus game. When the routine transfers to the free game, bonus game symbols are inserted into reel bands. In this manner, the bonus game symbols are inserted into the reel bands employed in the free game, thereby making it possible to generate an opportunity of enabling transfer to the extended bonus game. The prize in the free game is 24, for example. If three bonus game symbols appear in the free game, the routine transfers to the extended bonus game. When transfer to the extended bonus game is determined, lottery of whether or not to enable continuing in accordance with the above-mentioned continuation rate is executed. A result of the lottery is independent of that of the lottery processing of determining the abovementioned continuation rate. The lottery result indicating whether or not to enable continuing is employed in an extended bonus game to be described later. In accordance with the lottery result, it is determined whether to transfer from the extended bonus game to the free game or whether to transfer from the extended bonus game to a base game.

<Bonus Game (Extended Bonus Game)>

In an extended bonus game according to the eighth functional flowchart, a free game that consists of eight unit games is executed on a first liquid crystal display screen (the lower image display panel 141 to be described later), a prize is determined in each of the unit games, and then, the determined prize is awarded to a player. At the same time, an image indicating that characters compete against each other during eight unit games is displayed on a second liquid crystal display screen (the upper image display panel 131 to be described later), and whether or not to enable continuing is expressed in accordance with the progress of the battle. With regard to whether or not to enable continuing, there is employed a result of lottery processing of whether or not to enable continuing, the lottery having been executed when transfer to the extended bonus game has been determined. As described above, whether to transfer from the extended bonus game to the free game or whether to transfer from the extended bonus game to the base game is determined in accordance with the lottery result of whether or not to enable continuing.

In a battle between characters, by way of image rendering, for example, in a case where a main character wins an enemy, the routine reverts to a free game. Alternatively, by way of image rendering, if a main character loses an enemy, the routine reverts to a base game. The prize in the extended bonus game is defined so as to be 261.

[Overall Game System]

The basic functions of the gaming machine have been described above. Next, with reference to FIG. 3, a game system including the gaming machine is described.

Figure 3:
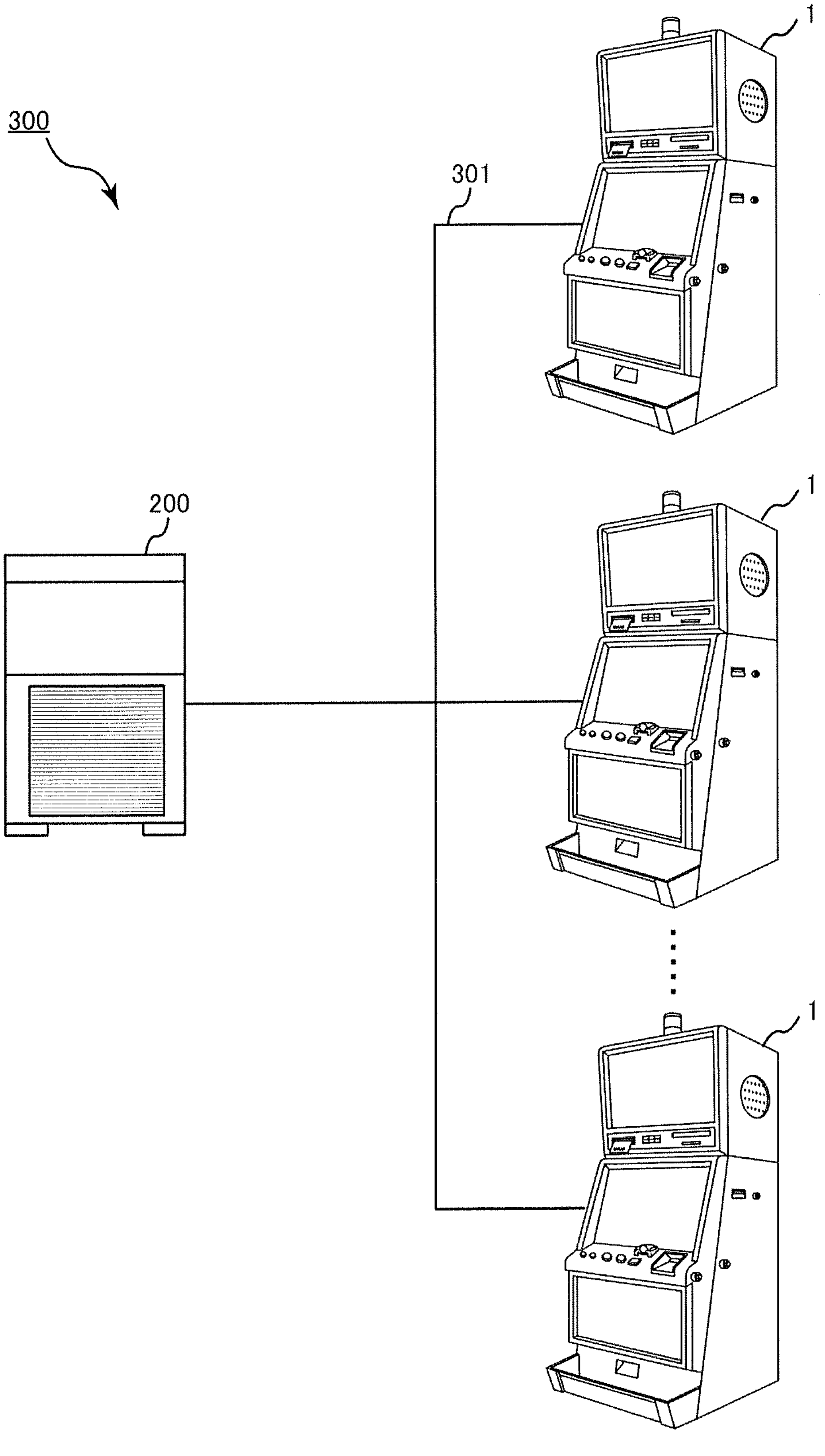
FIG. 3 is a view showing a game system including the gaming machine according to the embodiment of the present invention.

FIG. 3 is a view illustrating the game system including the gaming machine according to the embodiment of the present invention.

A game system 300 includes the plurality of gaming machines 1, and an external control device 200 that is connected to each of the gaming machines 1 through a communication line 301.

The external control device 200 is for controlling the plurality of gaming machines 1. In the present embodiment, the external control device 200 is a so-called hall server which is installed in a game facility having the plurality of gaming machines 1. Each of the gaming machines 1 is provided with a unique identification number, and the external control device 200 identifies transmission sources of data transmitted from the respective gaming machines 1 by using the identification numbers. Also in the case where the external control device 200 transmits data to a gaming machine 1, the identification numbers are used for specifying the transmission destination. Further, the external control device 200 accumulates the jackpot based on number of the game mediums betting on the game machines 1.

It is to be noted that the game system 300 may be constructed within a single game facility where various games can be conducted, such as a casino, or may be constructed among a plurality of game facilities. Further, when the game system 300 is constructed in a single game facility, the game system 300 may be constructed in each floor or section of the game facility. The communication line 301 may be a wired or wireless line, and can adopt a dedicated line, an exchange line or the like.

[Overall Configuration of Gaming Machine]

Figure 4:
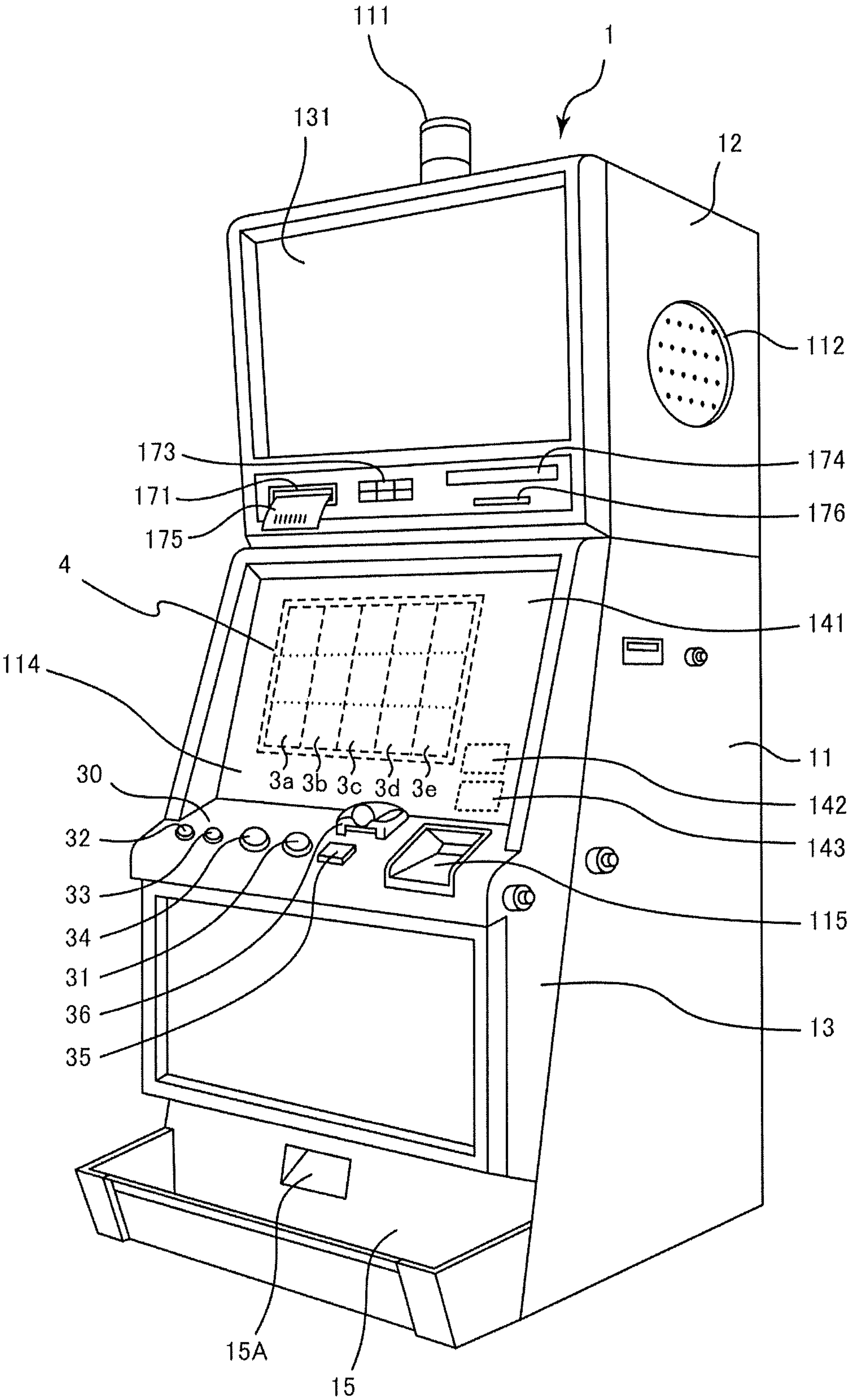
FIG. 4 is a view showing an entire configuration of the gaming machine according to the embodiment of the present invention.

The game system according to the present embodiment has been described above. Next, with reference to FIG. 4, an overall configuration of the gaming machine 1 is described. FIG. 4 is a view illustrating the overall configuration of the gaming machine according to the embodiment of the present invention.

A coin, a bill, or electrically valuable information corresponding to these is used as a game medium in the gaming machine 1. Further, in the present embodiment, a later-described ticket with a barcode is also used. It is to be noted that the game medium is not limited to these, and for example a medal, a token, electric money or the like can be adopted.

The gaming machine 1 includes a cabinet 11, a top box 12 installed on the upper side of the cabinet 11, and a main door 13 provided at the front face of the cabinet 11.

A lower image display panel 141 is provided at the center of the main door 13. The lower image display panel 141 includes a liquid crystal panel, and forms the display. The lower image display panel 141 has a symbol display region 4. To the symbol display region 4, five video reels 3 (3*a*, 3*b*, 3*c*, 3*d*, 3*e*) are displayed. Further, the symbol display region 4 includes a fifteen display blocks shows broken line, and the display blocks by three blocks assigned to in a position corresponding to each video reels 3, In the present embodiment, a video reel depicts through videos the rotational and stop motions of a mechanical reel having a plurality of symbols drawn on the peripheral surface thereof. To each of the video reels 3, a symbol array comprised of a previously determined plurality (example, 22 in the present embodiment) of symbols is assigned (see FIG. 5 which is described later).

In the symbol display region 4, the symbol arrays assigned to the respective video reels 3 are separately scrolled, and are stopped after predetermined time has elapsed. As a result, a part (three consecutive symbols in the present embodiment) of each of the symbol arrays is displayed for the player. The symbol display region 4 has three regions, namely an upper region, a middle region, and a lower region, for each video reel 3, and a single symbol is to be displayed to each region. That is, 15 (=5 columns×3 symbols) symbols are to be displayed in the symbol display region 4.

In the present embodiment, a line formed by selecting one of the aforementioned three regions for each of the video reels 3 and connecting the respective regions is referred to as a winning line (hereinafter also referred to as a "pay line"). It is to be noted that any desired shape of the winning line can be adopted, and examples of the shape of the winning line may include a straight line formed by connecting the middle regions for the respective video reels 3, a V-shaped line, and a bent line. Also, any desired number of lines can be adopted, and the number can be for example 30 lines.

In addition, the lower image display panel 141 has a number-of-credits display region 142 and a number-of-payouts display region 143. The number-of-credits display region 142 displays the number of coins that are coins owned by a player and are deposited inside the gaming machine 1 (hereinafter, referred to as the number of credits). In addition, the number-of-payouts display region 143 displays the number of coins to be paid out to a player when a winning prize has been established (hereinafter, referred to as the number of payouts).

The lower image display panel 141 has a built-in touch panel 114. The player can input various commands by touching the lower image display panel 141.

On the lower side of the lower image display panel 141, there are arranged various buttons set in a control panel 30, and various devices to be operated by the player.

A spin button 31 is used when starting scrolling of the symbol arrays of the respective video reels 3. A change button 32 is used when requesting a game facility staff member to exchange money. A CASHOUT button 33 is used when paying out the coins retained inside the gaming machine 1 to a coin tray 15.

A 1-BET button 34 and a maximum BET button 35 are used for determining the number of coins (hereinafter also referred to as "the number of BETs") to be used in the game from the coins retained inside the gaming machine 1. The 1-BET button 34 is used when determining one coin at a time for the aforementioned number of BETs. The maximum BET button 35 is used when setting the aforementioned number of BETs to a defined upper limit number.

A coin accepting slot 36 is provided to accept coins. A bill validator 115 is provided to accept bills. The bill validator 115 validates a bill, and accepts a valid bill into the cabinet 11. It is to be noted that the bill validator 115 may be configured so as to be capable of reading a later-described ticket 175 with a barcode.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The gaming machine 1 produces effects by displaying images, outputting sounds, and outputting the light.

A ticket printer 171, a card slot 176, a data display 174, and a keypad 173 are provided on the lower side of the upper image display panel 131.

The ticket printer 171 prints on a ticket a barcode representing encoded data of the number of credits, date, the identification number of the gaming machine 1, and the like, and outputs the ticket as the ticket 175 with a barcode. The player can make a gaming machine read the ticket 175 with a barcode so as to play a game thereon, and can also exchange the ticket 175 with a barcode with a bill or the like at a predetermined place (e.g. a cashier in a casino) in the game facility.

The card slot 176 is for inserting a card in which predetermined data is stored. For example, the card stores data for identifying the player, and data about the history of games played by the player. When the card is inserted into the card slot 176, a later-described card reader 172 reads data from the card or writes data into the card. It is to be noted that the card may store data corresponding to a coin, a bill or a credit.

The data display 174 includes a fluorescent display, LEDs and the like, and displays the data read by the card reader 172 or the data inputted by the player via the keypad 173, for example. The keypad 173 is for inputting a command and data related to ticket issuance or the like.

[Symbol Arrays of Video Reels]

The overall configuration of the gaming machine 1 has been described above. Next, with reference to FIG. 5, a configuration of the symbol arrays included in the video reels 3 of the gaming machine 1 is described. FIG. 5 is shows the arrangements of symbols drawn on the peripheral surfaces of the reels of the game machine according to the embodiment of the present invention.

A first video reel 3*a*, a second video reel 3*b*, a third video reel 3*c*, a fourth video reel 3*e*, and a fifth video reel 3*d* each is assigned with a symbol array consisting of 22 symbols that correspond to respective code numbers from “00” to “21”.

Types of the symbols provided are “JACKPOT 7”, “BLUE 7”, “BELL”, “CHERRY”, “STRAWBERRY”, “PLUM”, “ORANGE”, and “FREE GAME”.

A configuration of symbol arrays shown in FIG. 5 is employed in a base game (a normal game) in each of the first functional flowchart to the eighth functional flowchart described above. The symbol arrays employed in the base game include free game symbols referred to as “FREE GAME”. In the base game, when three free game symbols “FREE GAME” can be generated, the routine transfers from the base game to a free game.

In addition, in each of the first functional flowchart to the eighth functional flowchart described above, when the routine transfers from the base game to the free game (transfer to a normal free game in the seventh functional flowchart), symbol arrays (not shown) that are different from those in FIG. 5 are selected. The symbol arrays employed in a free game in each of the first functional flowchart to the eighth functional flowchart described above includes bonus game symbols referred to as “BONUS”. In the free game, when three bonus game symbols “BONUS” can be generated, the routine transfers from the free game to a bonus game.

The number of “BONUS” symbols included in the symbol arrays can be appropriately determined in accordance with the progress of a game or the like. Doing this makes it possible to adjust the easiness of transfer from the free game to an extended bonus game. Further, with respect to other symbols employed in the free game, there may be decreased the number of symbols related to winning combinations with a large number of payouts. Doing this enables the free game to function as a chance zone with its low payout rate.

In the free game as the extended bonus game in the seventh functional flowchart described above as well, symbol arrays (not shown) that are different from those in FIG. 5 are selected. The symbol arrays employed in the free game as the extended bonus game include free game symbols referred to as “FREE GAME”. In the free game as the extended bonus game, when three free game symbols “FREE GAME” can be generated, the routine transfers from the free game as the extended bonus game to a normal free game.

The number of “FREE GAME” symbols included in the symbol arrays can be appropriately determined in accordance with the progress of a game or the like. Doing this makes it possible to adjust the easiness of transfer from the free game as the extended bonus game to the normal free game. Further, with respect to other symbols employed in the free game as the extended bonus game, there may be increased the number of symbols related to winning combinations with a large number of payouts. Doing this enables the free game as the extended bonus game to function as a game with its high payout rate.

In addition, in the embodiment, each of the first video reel 3*a*, the second video reel 3*b*, the third video reel 3*c*, the fourth video reel 3*d*, and the fifth video reel 3*e* described above may be simply referred to as a reel band.

[Configuration of Circuit Included in Gaming Machine]

Figure 6:
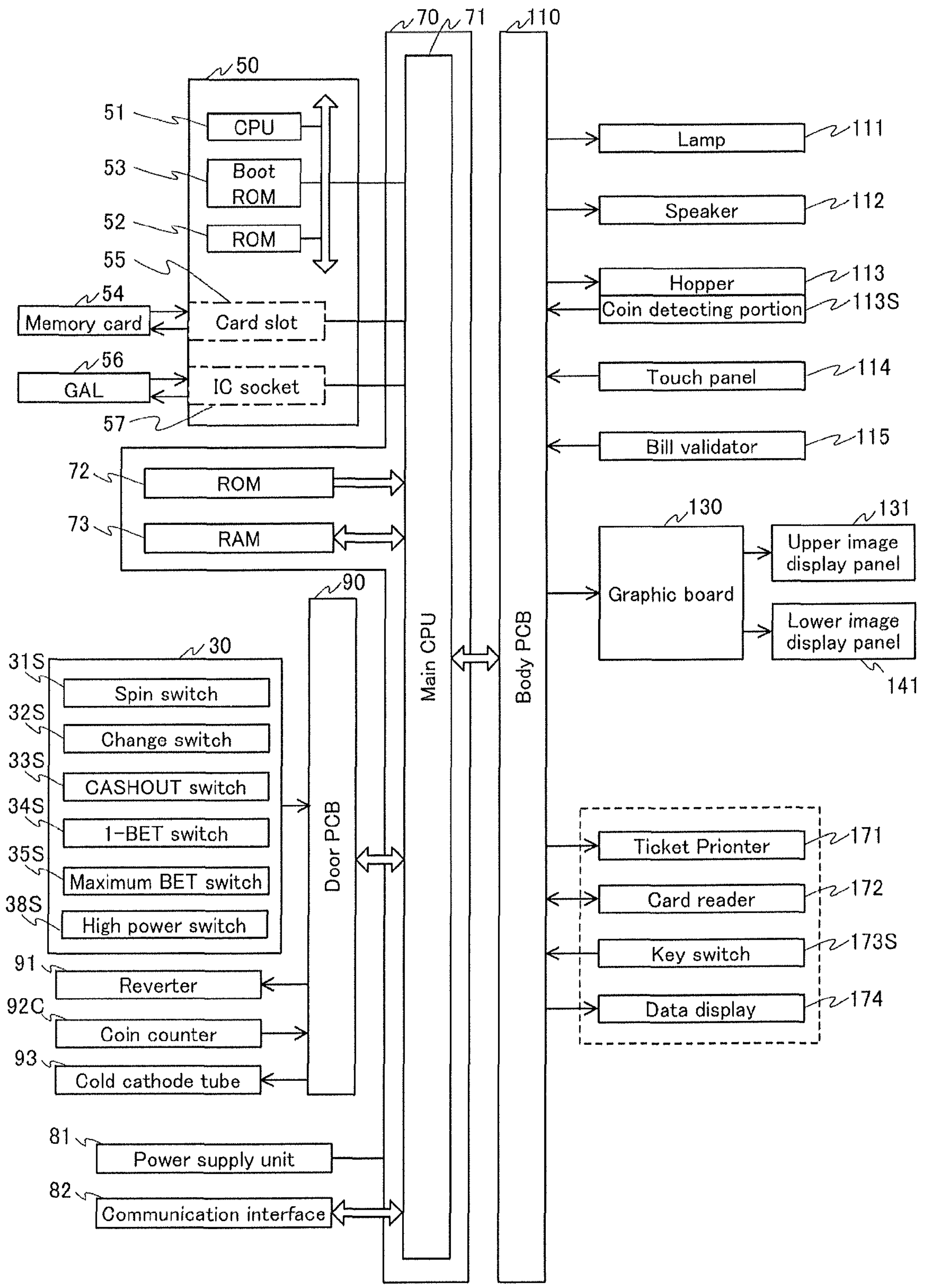
FIG. 6 is a block diagram depicting an internal configuration of the gaming machine according to the embodiment of the present invention.

The configuration of the symbol arrays included in the video reels 3 of the gaming machine 1 has been described above. Next, with reference to FIG. 6, a configuration of a circuit included in the gaming machine 1 is described. FIG. 6 is a block diagram illustrating an internal configuration of the gaming machine according to the embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a lottery program, and a program for producing effects by images and sounds (e.g. see FIGS. 8 to 19 which are described later). Further, the aforementioned game program includes data (see FIG. 5) specifying the configuration of the symbol array assigned to each video reel 3.

The lottery program is a program for determining to-be stopped symbol of each video reel 3 by lottery. The to-be stopped symbol is data for determining three symbols to be displayed to the symbol display region 4 out of the 22 symbols forming each symbol array. The gaming machine 1 of the present embodiment determines as the to-be stopped symbol the symbol to be displayed in a predetermined region (the upper region) out of the three regions provided for each of the video reels 3 of the symbol display region 4.

The aforementioned lottery program includes symbol determination data. The symbol determination data is data that specifies random values so that each of the 22 symbols (code numbers from "00" to "21") forming the symbol array is determined at an equal probability (i.e. 1/22), for each video reel 3. The probabilities of the respective 22 symbols being determined are basically equal. However, the numbers of the respective types of symbols included in the 22 symbols vary, and thus the probabilities of the respective types of symbols being determined vary (i.e. different weights on the probabilities are generated). For example, with reference to FIG. 5, the symbol array of the first video reel 3*a* includes one symbol of "RHINOCEROS", and includes four symbols of "Q". Hence, the former is determined at the probability of "1/22", whereas the latter is determined at the probability of "7/22".

It is to be noted that, although the data specifies that the equal numbers of symbols be provided to form the symbol arrays of the respective video reels 3 in the present embodiment, different numbers of symbols may form the respective video reels 3. For example, the symbol array of the first video reel 3*a* may consist of 22 symbols whereas the symbol array of the second video reel 3*b* may consist of 30 symbols. Such a configuration increases the degree of freedom in setting the probabilities of the respective types of symbols being determined for each video reel 3.

Further, the card slot 55 is configured so that the memory card 54 can be inserted thereinto and removed therefrom, and is connected to a motherboard 70 by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like. The authentication program is a program (tamper check program) for authenticating the game program and the game system program. The pre-authentication program is a program for authenticating the aforementioned authentication program. The authentication program and the pre-authentication program are written along a procedure (authentication procedure) for proving that the program to be the subject has not been tampered.

The motherboard 70 is provided with a main CPU 71, a ROM 72, a RAM 73, and a communication interface 82. The motherboard 70 corresponds to the controller of the present invention. In the present embodiment, the controller decides to be configured by means of one CPU of the main CPU 71, but the controller in the present invention may be configured from plural CPU.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started.

The RAM 73 stores data and programs which are used in operation of the main CPU 71. For example, when the processing of loading the aforementioned game program, game system program or authentication program is conducted, the RAM 73 can store the program. The RAM 73 is provided with working areas used for operations in execution of these programs. Examples of the areas include: an area that stores a counter for managing the number of games, the number of BETs, the number of payouts, the number of credits and the like; and an area that stores symbols (code numbers) determined by lottery.

The communication interface 82 is for communicating with the external control device 200 such as a server, through the communication line 301. Further, the motherboard 70 is connected with a later-described door PCB (Printed Circuit Board) 90 and a body PCB 110 by respective USBs. The motherboard 70 is also connected with a power supply unit 81.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71. The door PCB 90 is connected with a control panel 30, a reverter 91, a coin counter 92C and a cold cathode tube 93.

The control panel 30 is provided with a spin switch 31S, a change switch 32S, a CASHOUT switch 33S, a 1-BET switch 34S and a maximum BET switch 35S which correspond to the aforementioned respective buttons. Each of the switches outputs a signal to the main CPU 71 upon detection of press of the button corresponding thereto by the player.

The coin counter 92C validates a coin inserted into the coin accepting slot 36 based on its material, shape and the like, and outputs a signal to the main CPU 71 upon detection of a valid coin. Invalid coins are discharged from a coin payout exit 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speaker 112, the hopper 113, a coin detecting portion 113S, the touch panel 114, the bill validator 115, a graphic board 130, the ticket printer 171, the card reader 172, a key switch 173S and the data display 174.

The lamp 111 lights up based on a control signal outputted from the main CPU 71. The speaker 112 outputs sounds such as BGM, based on a control signal outputted from the main CPU 71.

The hopper 113 operates based on a control signal outputted from the main CPU 71, and pays out coins of the specified number of payouts from the coin payout exit 15A to the coin tray 15. The coin detecting portion 113S outputs a signal to the main CPU 71 upon detection of coins paid out by the hopper 113.

The touch panel 114 detects a place on the lower image display panel touched by the player's finger or the like, and outputs to the main CPU 71*a* signal corresponding to the detected place. Upon acceptance of a valid bill, the bill validator 115 outputs to the main CPU 71*a* signal corresponding to the face amount of the bill.

The graphic board 130 controls display of images conducted by the respective upper image display panel 131 and lower image display panel 141, based on a control signal outputted from the main CPU 71. The symbol display region 4 of the lower image display panel 141 displays the five video reels 3 by which the scrolling and stop motions of the symbol arrays included in the respective video reels 3 are displayed. The graphic board 130 is provided with a VDP generating image data, a video RAM temporarily storing the image data generated by the VDP, and the like. A number-of-stocks display portion 351 of the lower image display panel 141 displays the number S of stocks shown by the number-of-stocks data stored in the number-of-stocks storage area of the RAM 73.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

Based on a control signal outputted from the main CPU 71, the ticket printer 171 prints on a ticket a barcode representing encoded data of the number of credits stored in the RAM 73, date, the identification number of the gaming machine 1, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data display 174 displays data read by the card reader 172 and data inputted by the player through the keypad 173, based on a control signal outputted from the main CPU 71.

[Configuration of Symbol Combination Table]

The description of the circuit construction of the gaming machine 1 has now been completed. Next, with reference to FIG. 7, a symbol combination table will be described. FIG. 7 is a view showing the symbol combination table of the gaming machine according to the embodiment.

A symbol combination table specifies symbol combinations of symbols according to winning prizes and the number of payouts. In the gaming machine 1, a winning prize is established in the case where scrolling of the symbol arrays of the respective video reels 3 is stopped and then a combination of symbols displayed on a winning line coincides with a combination of symbols which are specified according to the symbol combination table. A special such as payout of coins or start of bonus game is then given to a player according to a winning combination. Alternatively, in the case where a combination of symbols which are displayed on a winning line does not coincide with any combination of symbols which are displayed on a winning line according to the symbol combination table, no winning prize (a so called "losing") is established.

Basically, a winning prize is established in the case where all of the symbols displayed on a winning line according to the respective video reels 3 are arranged as a combination of symbols of one type from among "JACKPOT 7", "FREE GAME", "BLUE 7", "BELL", "CHERRY", "STRAWBERRY", "PLUM", and "ORANGE". However, with respect to symbols of types such as "CHERRY" and "ORANGE", a winning prize is established in the case where one or three symbols of either one type of them is or are displayed on a winning line according to the video reels 3 as well.

For example, in the case where symbols "BLUE 7" are arranged on a winning line according to all the video reels 3, a winning combination is realized as "BLUE" and then "10" is determined as the number of payouts. Coin payout is then performed based on the determined number of payouts. The above coin payout is performed by actually discharging coins from a coin payout exit 15A, adding the number of coins to the number of credits, or issuing a barcode ticket.

"FREE GAME" is a symbol to be associated with the free game trigger. In the case where "FREE GAME" symbols are displayed to be arranged on a winning line according to all the video reels 3, a winning prize is realized as a "free game trigger", the corresponding free game is started from a next time of play.

[Contents of Program]

The determination of the symbol combination table has been described above. Next, with reference to FIGS. 8 to 28, the program to be executed by the gaming machine 1 is described.

<Main Control Processing>

Figure 8:
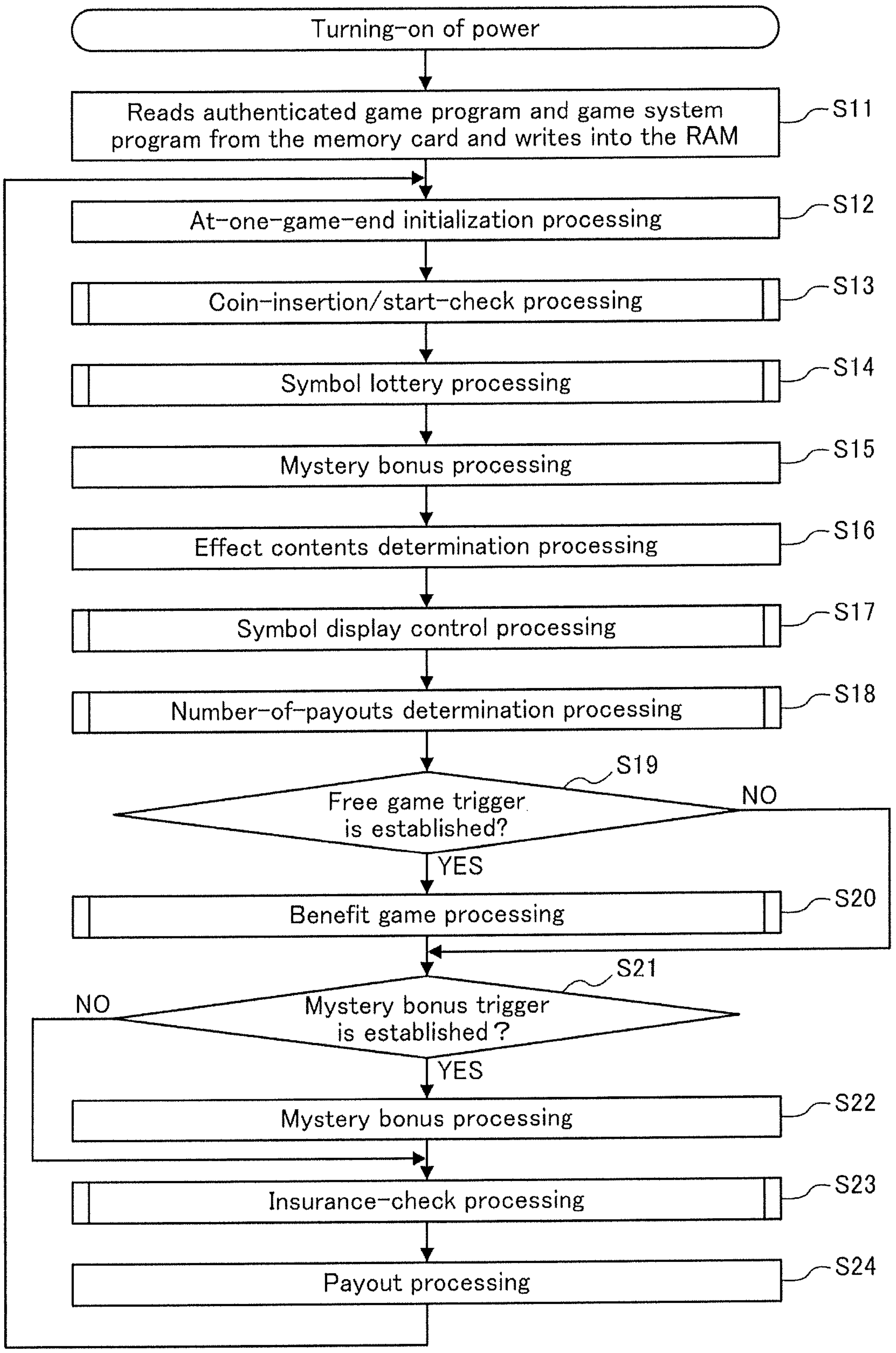
FIG. 8 is a flowchart showing a subroutine of main control processing of the gaming machine according to the embodiment of the present invention.

First, with reference to FIG. 8, main control processing is described.

FIG. 8 is a view illustrating a flowchart of the main control processing for the gaming machine according to the embodiment of the present invention.

First, when the power is supplied to the gaming machine 1, the main CPU 71 reads the authenticated game program and game system program from the memory card 54 through the gaming board 50, and writes the programs into the RAM 73 (step S11).

Next, the main CPU 71 conducts at-one-game-end initialization processing (step S12). For example, data that becomes unnecessary after each game in the working areas of the RAM 73, such as the number of BETs and the symbols determined by lottery, is cleared.

The main CPU 71 conducts coin-insertion/start-check processing which is described later with reference to FIG. 9 (step S13). In the processing, input from the BET switch and the spin switch is checked.

The main CPU 71 then conducts symbol lottery processing which is described later with reference to FIG. 12 (step S14). In the processing, to-be stopped symbols are determined based on the random values for symbol determination.

Next, the main CPU 71 conducts mystery bonus lottery processing (step S15). In the processing, lottery determining whether or not to establish a mystery bonus trigger is held. For example, the main CPU 71 extracts a random value for mystery bonus from the numbers in a range of "0 to 99", and establishes the mystery bonus trigger when the extracted random value is "0".

The main CPU 71 conducts effect contents determination processing (step S16). The main CPU 31 extracts a random value for effect, and determines any of the effect contents from the preset plurality of effect contents by lottery.

The main CPU 71 then conducts symbol display control processing which is described later with reference to FIG. 13 (step S17). In the processing, scrolling of the symbol array of each video reel 3 is started, and the to-be stopped symbol determined in the symbol lottery processing of step S14 is stopped at a predetermined position (e.g. the upper region in the symbol display region 4). That is, three symbols including the to-be stopped symbol are displayed in the symbol display region 4. For example, when the to-be stopped symbol is the symbol associated with the code number of "10" and it is to be displayed to the upper region, the symbols associated with the respective code numbers of "11", "12" and "13" are to be displayed to the respective middle region and lower region in the symbol display region 4.

Next, the main CPU 71 conducts number-of-payouts determination processing which is described later with reference to FIG. 14 (step S18). In the processing, the number of payouts is determined based on the combination of symbols displayed along one of the winning lines, and is stored into a number-of-payouts counter provided in the RAM 73.

The main CPU 71 then determines whether or not the free game is established (step S19). When the main CPU 71 determines that the free game is established, the main CPU 71 executing a benefit-game selecting processing in detail later with reference to FIG. 16.

When determining in step S19 that the bonus game trigger has not been established or after executing the processing of step S20, the main CPU 71 determines whether or not the mystery bonus trigger is established (step S21). When determining that the mystery bonus trigger has been established, the main CPU 71 conducts the mystery bonus processing (step S22). In the processing, the number of payouts (e.g. 300) being set for the mystery bonus is stored into the number-of-payouts counter provided in the RAM 73.

After the processing of step S22 or when determining in step S21 that the mystery bonus trigger has not been established, the main CPU 71 conducts insurance-check processing which is described later with reference to FIG. 15 (step S23). In the processing, whether or not to conduct payout by the insurance is checked.

The main CPU 71 conducts payout processing (step S24). The main CPU 71 adds the value stored in the number-of-payouts counter to a number-of-credits counter provided in the RAM 73. It is to be noted that operations of the hopper 113 may be controlled based on input from the CASHOUT switch 33S, and coins of the number corresponding to the value stored in the number-of-payouts counter may be discharged from the coin payout exit 15A. Further, operations of the ticket printer 171 may be controlled and a ticket with a barcode may be issued on which a value stored in the number-of-payouts counter is recorded. After the processing has been conducted, the processing is shifted to step S12.

In the embodiment, by the flowchart shows in FIG. 8, a basic processing of a base game (a normal game) is executed.

<Coin-Insertion/Start-Check Processing>

Figure 9:
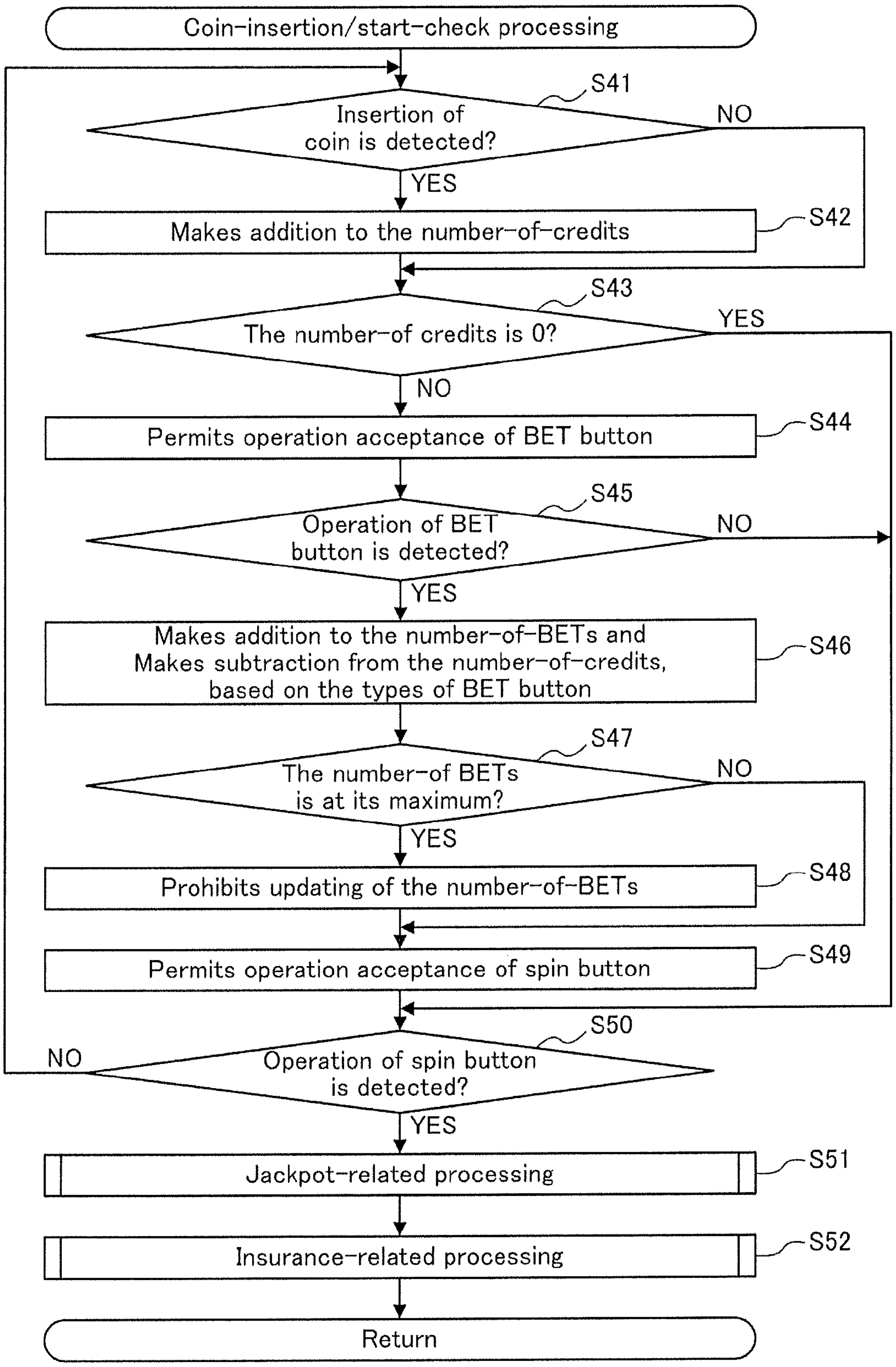
FIG. 9 is a flowchart showing a subroutine of coin entry/start check processing of the gaming machine according to the embodiment of the present invention.

Next, with reference to FIG. 9, coin-insertion/start-check processing is described. FIG. 9 is a view illustrating a flowchart of the coin-insertion/start-check processing for the gaming machine according to the embodiment of the present invention.

First, the main CPU 71 determines whether or not insertion of a coin has been detected by the coin counter 92C (step S41). When determining that the insertion of a coin has been detected, the main CPU 71 makes an addition to the number-of-credits counter (step S42). It is to be noted that, in addition to the insertion of a coin, the main CPU 71 may determine whether or not insertion of a bill has been detected by the bill validator 115, and when determining that the insertion of a bill has been detected, the main CPU 71 may add a value according to the bill to the number-of-credits counter.

After step S42 or when determining in step S41 that the insertion of a coin has not been detected, the main CPU 71 determines whether or not the number-of-credits counter is zero (step S43). When the main CPU 71 determines that the number-of-credits counter is not zero, the main CPU 71 permits operation acceptance of the BET buttons (step S44).

Next, the main CPU 71 determines whether or not operation of any of the BET buttons has been detected (step S45). When the main CPU 71 determines that the BET switch has detected press of the BET button by the player, the main CPU 71 makes an addition to a number-of-BETs counter provided in the RAM 73 and makes a subtraction from the number-of-credits counter, based on the type of the BET button (step S46).

The main CPU 71 then determines whether or not the number-of-BETs counter is at its maximum (step S47). When the main CPU 71 determines that the number-of-BETs counter is at its maximum, the main CPU 71 prohibits updating of the number-of-BETs counter (step S48). After step S48 or when determining in step S47 that the number-of-BETs counter is not at its maximum, the main CPU 71 permits operation acceptance of the spin button (step S49).

After step S49 or when determining in step S45 that the operation of any of the BET buttons has not been detected, or when determining in step S43 that the number-of-credits counter is zero, the main CPU 71 determines whether or not operation of the spin button has been detected (step S50). When the main CPU 71 determines that the operation of the spin button has not been detected, the processing is shifted to step S41.

When the main CPU 71 determines that the operation of the spin button has been detected, the main CPU 71 conducts jackpot-related processing which is described later with reference to FIG. 12 (step S51). In the processing, the amount to be accumulated to the amount of jackpot is calculated, and the amount is transmitted to the external control device 200.

Next, the main CPU 71 conducts insurance-related processing which is described later with reference to FIG. 11 (step S52). In the processing, counting of the number of games is conducted which triggers a payout by the insurance. After the processing has been conducted, the coin-insertion/start-check processing is completed.

<Jackpot-Related Processing>

Figure 10:
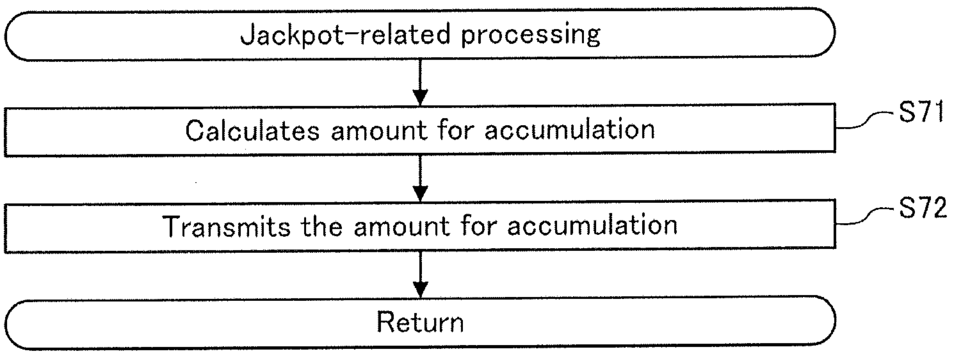
FIG. 10 is a flowchart showing a subroutine of jackpot-related processing of the gaming machine according to the embodiment of the present invention.

Now, with reference to FIG. 10, the jackpot-related processing is described.

FIG. 10 is a view illustrating a flowchart of the jackpot-related processing for the gaming machine according to the embodiment of the present invention.

First, the main CPU 71 calculates the amount for accumulation (step S71). The main CPU 71 obtains the product of the value of the number-of-BETs counter and a preset accumulation ratio, so that the amount for accumulation to the amount of jackpot is calculated.

Next, the main CPU 71 transmits the calculated amount for accumulation to the external control device 200 (step S72). Upon reception of the amount for accumulation, the external control device 200 updates the amount of jackpot. After the processing has been conducted, the jackpot-related processing is completed.

<Insurance-Related Processing>

Figure 11:
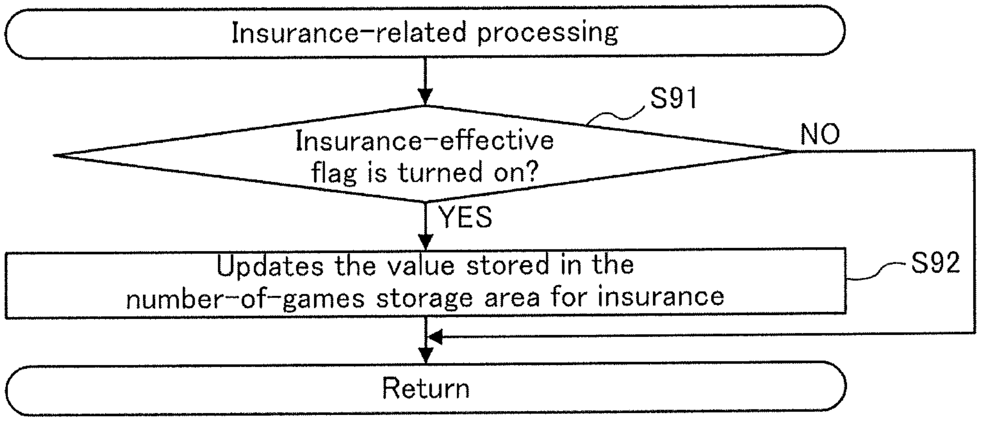
FIG. 11 is a flowchart showing a subroutine of insurance-related processing of the gaming machine according to the embodiment of the present invention.

Next, with reference to FIG. 11, the insurance-related processing is described. FIG. 11 is a view illustrating a flowchart of the insurance-related processing for the gaming machine according to the embodiment of the present invention.

First, the main CPU 71 determines whether or not an insurance-effective flag is turned on (step S91). The insurance-effective flag is turned on when a command to make the insurance effective is inputted by the player in the insurance selection processing which is described later with reference to FIG. 17.

When the main CPU 71 determines that the insurance-effective flag is not turned on, the main CPU 71 completes the insurance-related processing. On the other hand, when the main CPU 71 determines that the insurance-effective flag is turned on, the main CPU 71 updates a number-of-games counter for insurance provided in the RAM 73 (step S92). The number-of-games counter for insurance is a counter for managing the number of games up to the time of the payout by the insurance. In the processing of step S92, the main CPU 71 adds one to the number-of-games counter for insurance. After the processing has been conducted, the insurance-related processing is completed.

<Symbol Lottery Processing>

Figure 12:
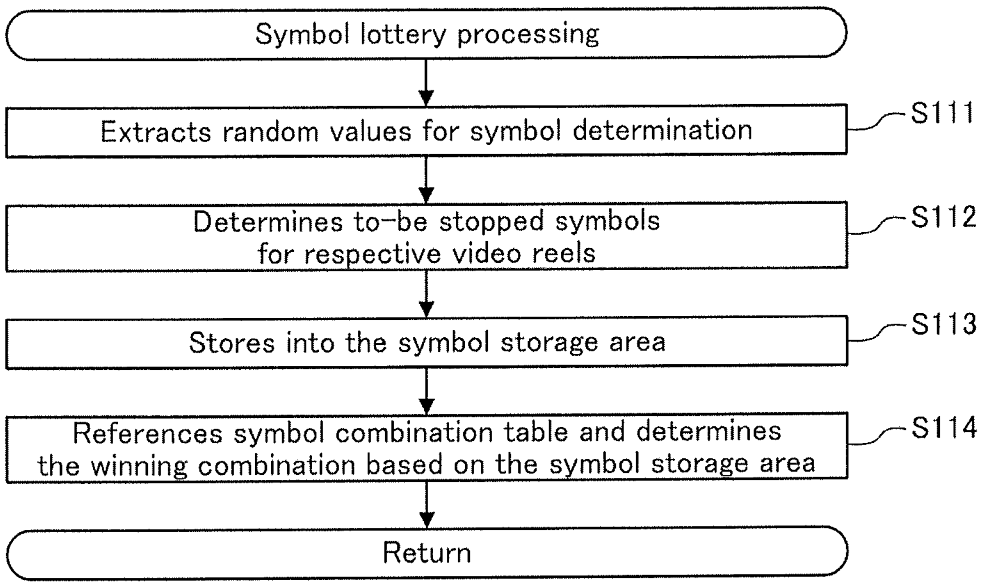
FIG. 12 is a flowchart showing a subroutine of symbol lottery processing of the gaming machine according to the embodiment of the present invention.

Next, with reference to FIG. 12, the symbol lottery processing is described. FIG. 12 is a view illustrating a flowchart of the symbol lottery processing for the gaming machine according to the embodiment of the present invention.

First, the main CPU 71 extracts random values for symbol determination (step S111). The main CPU 71 then determines to-be stopped symbols for the respective video reels 3 by lottery (step S112). The main CPU 71 holds a lottery for each video reel 3, and determines any one of the 22 symbols (code numbers from “00” to “21”) as a to-be stopped symbol. At this time, each of the 22 symbols (code numbers from “00” to “21”) is determined at an equal probability (i.e. 1/22).

Symbol arrays including a plurality of symbols associated with code numbers are assigned to a respective one of video reels 3 (the first video reel 3*a*, the second video reel 3*b*, the third video reel 3*c*, the fourth video reel 3*d*, and the fifth video reel 3*e*) included in the gaming machine 1 of the embodiment, and a data table indicating a correlation between the respective video reels 3 and the symbol arrays is stored in the ROM 72.

As described above, symbol arrays employed in a base game, symbol arrays employed in a free game (a normal free game), symbol arrays employed in an extended bonus game, and symbol arrays employed in a free game that is playable as an extended bonus game are different from each other, and a data table indicating a correlation between all of these symbol arrays and the respective video reels 3 is stored in the ROM 72. The data table is read out from the ROM 72 and then is displayed on the lower image display panel 141 in accordance with a game state.

The main CPU 71 conducts lottery in accordance with the respective video reels 3, and determines any of a plurality of symbols as symbols to be stopped. At this time, a respective one of the plurality of symbols is determined at uniform probabilities.

The main CPU 71 then stores the determined to-be stopped symbols for the respective video reels 3 into a symbol storage area provided in the RAM 73 (step S113). Next, the main CPU 71 references the number-of-payouts determination table (FIG. 7) and determines a winning combination based on the symbol storage area (step S114). The main CPU 71 determines the winning combination based on the combination of symbols to be displayed along the winning line by the respective video reels 3 and the number-of-payouts determination table. After the processing has been conducted, the symbol lottery processing is completed.

A symbol combination table specifies combinations of patterns of symbols related to winning prizes and the number of payouts. In the gaming machine 1, a winning prize is established in a case where scroll of symbol arrays of the respective video reels 3 is stopped and then a combination of symbols that are displayed on a winning line coincides with any of the symbol combinations that are specified in accordance with the symbol combination table. It is to be noted that no winning prize (a so called “losing”) is established in a case where a combination of symbols that are displayed on a winning line does not coincide with any of the symbol combinations specified in accordance with the symbol combination table.

<Symbol Display Control Processing>

Figure 13:
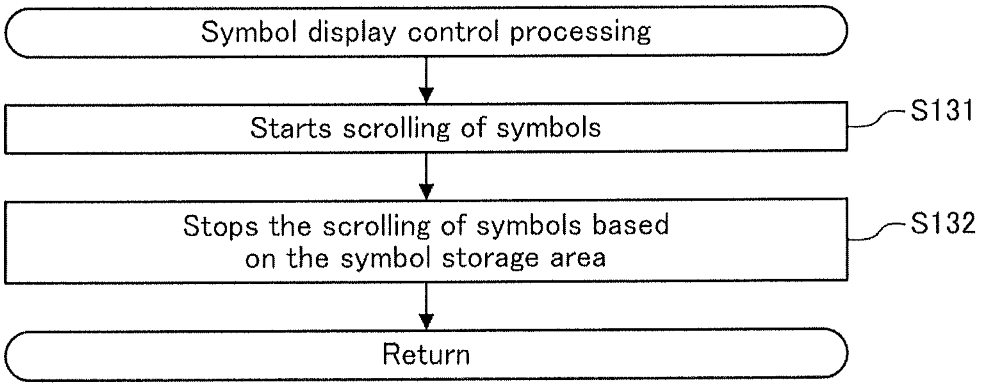
FIG. 13 is a flowchart showing a subroutine of symbol display control processing of the gaming machine according to the embodiment of the present invention.

Next, with reference to FIG. 13, the symbol display control processing is described.

FIG. 13 is a view illustrating a flowchart of the symbol display control processing for the gaming machine according to the embodiment of the present invention.

First, the main CPU 71 starts scrolling of the symbol arrays of the respective video reels 3 that are displayed to the symbol display region 4 of the lower image display panel 141 (step S131). A rearrangement processing of symbol is started by started the scrolling of the symbol arrays. The main CPU 71 then stops the scrolling of the symbol arrays of the respective video reels 3, based on the aforementioned symbol storage area (step S132). After the processing has been conducted, the symbol display control processing is completed. A rearrangement processing of symbol is completed by stopped the scrolling of the symbol arrays on each video reels 3 in the processing of the step S132. By the processing of step S131 and S132, the rearrangement processing of symbol is executed.

While the embodiment describes a case in which the respective symbols form symbol arrays and then are vertically scrolled, a mode of variable display of symbols in the present invention is not limitative thereto. For example, symbols may be scrolled in a horizontal direction, or alternatively, individual symbols may be displayed to move separately in a display region.

<Number-of-Payouts Determination Processing>

Figure 14:
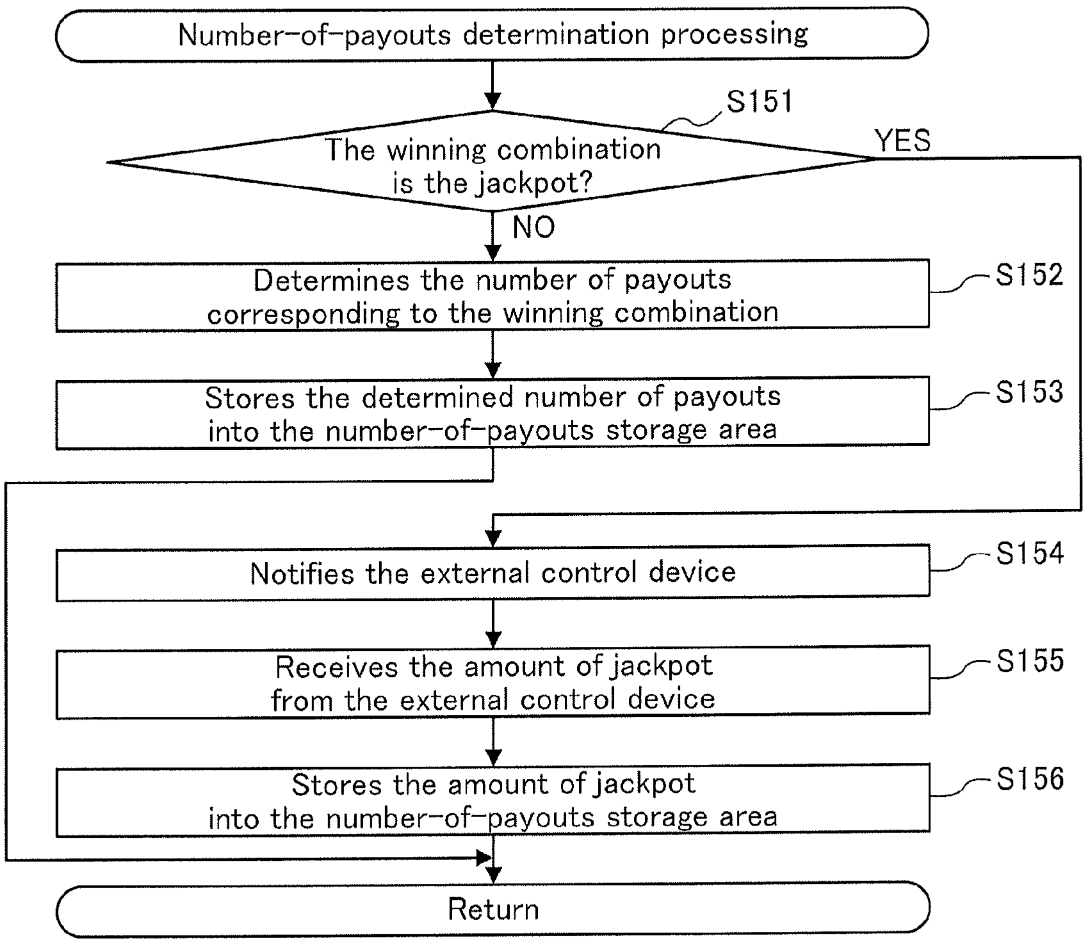
FIG. 14 is a flowchart showing a subroutine of number-of-payouts determination processing of the gaming machine according to the embodiment of the present invention.

Next, with reference to FIG. 14, the number-of-payouts determination processing is described.

FIG. 14 is a view illustrating a flowchart of the number-of-payouts determination processing for the gaming machine according to the embodiment of the present invention.

The main CPU 71 first determines whether or not the winning combination is the jackpot (step S151). When the main CPU 71 determines that the winning combination is not the jackpot, the main CPU 71 determines the number of payouts corresponding to the winning combination (step S152). The determination of the number of payouts is conducted (see, FIG. 7). It is to be noted that the main CPU 71 determines “0” as the number of payouts in the case where the game is lost. Next, the main CPU 71 stores the determined number of payouts into the number-of-payouts counter (step S153). After the processing has been conducted, the number-of-payouts determination processing is completed.

When the main CPU 71 determines that the winning combination is the jackpot, the main CPU 71 notifies the external control device 200 of the winning of the jackpot (step S154). It is to be noted that, upon reception of the notification, the external control device 200 transmits to the gaming machine 1 the amount of jackpot having updated up to that time. At this time, a part (e.g. 80%) of the amount of jackpot may be the payout subject and the rest (e.g. 20%) may be carried over for the upcoming establishment of the jackpot trigger.

Next, the main CPU 71 receives the amount of jackpot from the external control device 200 (step S155). The main CPU 71 then stores the received amount of jackpot into the number-of-payouts counter (step S156). After the processing has been conducted, the number-of-payouts determination processing is completed.

By the number-of-payouts determination processing of in FIG. 14, payout to give to a player can be determined.

<Insurance-Check Processing>

Figure 15:
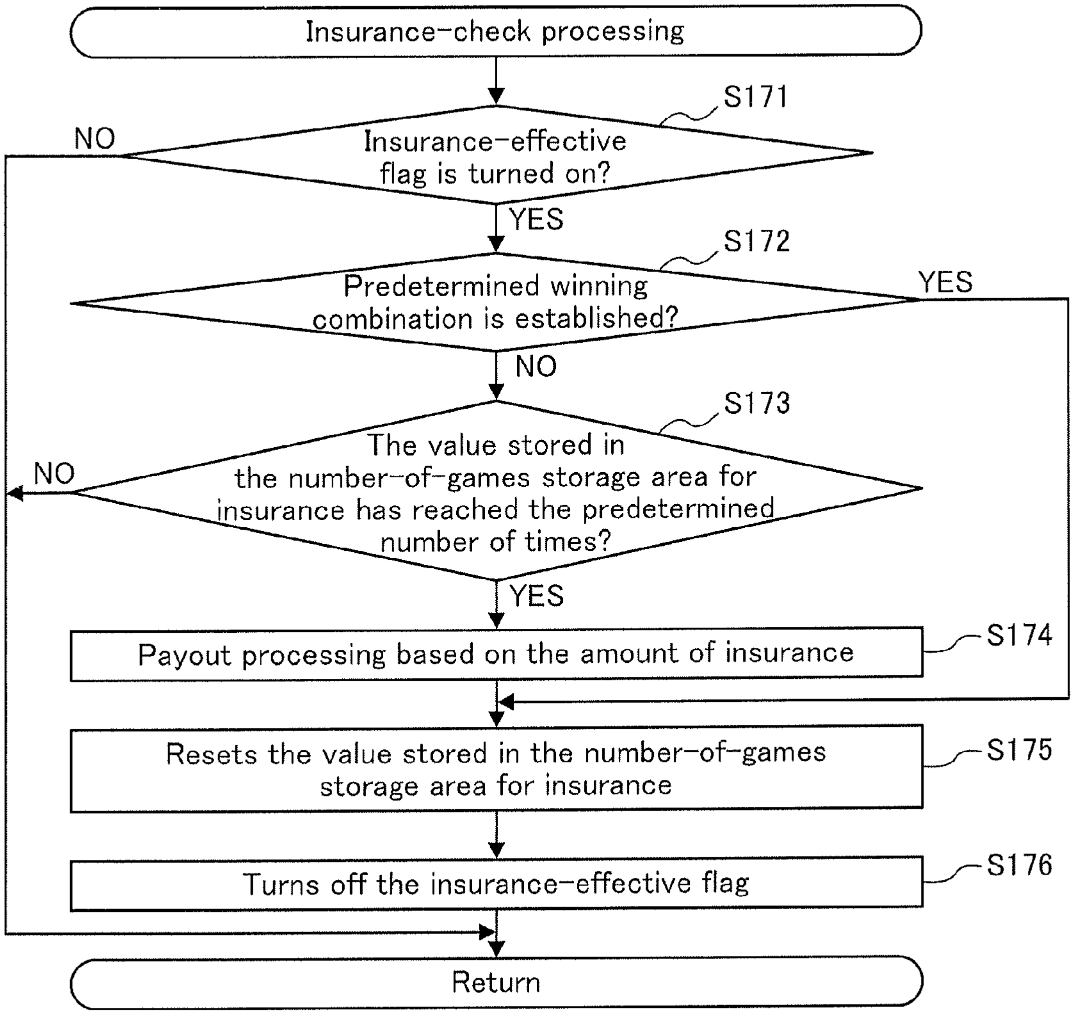
FIG. 15 is a flowchart showing a subroutine of insurance check processing of the gaming machine according to the embodiment of the present invention.

Next, with reference to FIG. 15, the insurance-check processing is described.

FIG. 15 is a view illustrating a flowchart of the insurance-check processing for the gaming machine according to the embodiment of the present invention.

First, the main CPU 71 determines whether or not the insurance-effective flag is turned on (step S171). When the main CPU 71 determines that the insurance-effective flag is not turned on, the main CPU 71 completes the insurance-check processing.

When the main CPU 71 determines that the insurance-effective flag is turned on, the main CPU 71 determines whether or not a predetermined winning combination has been established (step S172). In the present embodiment, "free game trigger", "jackpot" and "mystery bonus" are subjects of the predetermined winning combination.

When the main CPU 71 determines that the predetermined winning combination has not been established, the main CPU 71 determines whether or not the number-of-games counter for insurance has reached a predetermined number of times (e.g. 300) (step S173). When the main CPU 71 determines that the number-of-games counter for insurance has not reached the predetermined number of times, the main CPU 71 completes the insurance-check processing.

When the main CPU 71 determines that the number-of-games counter for insurance has reached the predetermined number of times, the main CPU 71 conducts payout processing based on the amount of insurance (step S174). The main CPU 31 adds an amount (e.g. 200) previously set as the amount of insurance to the number-of-credits counter.

After step S174 or when determining in step S172 that the predetermined winning combination has been established, the main CPU 71 resets the number-of-games counter for insurance (step S175). Next, the main CPU 71 turns the insurance-effective flag off (step S176). After the processing has been conducted, the insurance-check processing is completed.

<Insurance Selection Processing>

Figure 17:
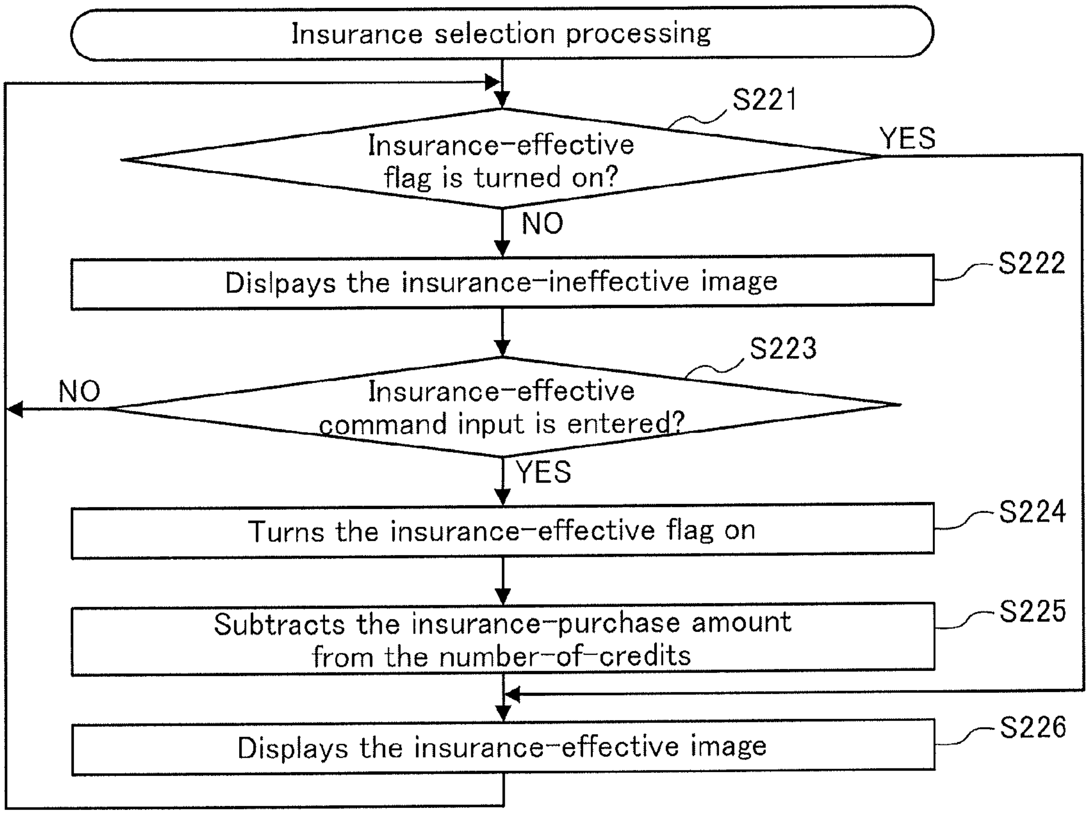
FIG. 17 is a flowchart showing a subroutine of insurance selection processing of the gaming machine according to the embodiment of the present invention.

Next, with reference to FIG. 17, the insurance selection processing is described.

FIG. 17 is a view illustrating a flowchart of the insurance selection processing for the gaming machine according to the embodiment of the present invention.

First, the main CPU 71 determines whether or not the insurance-effective flag is turned on (step S221). When the main CPU 71 determines that the insurance-effective flag is not turned on, the main CPU 71 displays an insurance-ineffective image (step S222). The main CPU 71 transmits a command to display the insurance-ineffective image to the graphic board 130. Based on the command, the graphic board 130 generates the insurance-ineffective image and displays the image to the lower image display panel 141.

As the insurance-ineffective image, for example, an image showing "INSURANCE BET $1.00 TOUCH TO BET" is displayed. This image is an image for prompting the player to select whether or not to make the insurance effective, and notifying the player of the amount required for making the insurance effective. The player can input a command to make the insurance effective by touching a predetermined place on the touch panel 114.

Subsequently, the main CPU 71 determines whether or not an insurance-effective command input has been entered (step S223). When the main CPU 71 determines that the insurance-effective command input has not been entered, the main CPU 71 shifts the processing to step S221 with the insurance-effective flag turned off. On the other hand, when the main CPU 71 determines that the insurance-effective command input has been entered, the main CPU 71 turns the insurance-effective flag on (step S224).

Next, the main CPU 71 subtracts the insurance-purchase amount from the number-of-credits counter (step S225). In the present embodiment, an amount corresponding to, for example, one dollar is subtracted from the number-of-credits counter. After step S225 or when determining in step S221 that the insurance-effective flag is turned on, the main CPU 71 displays the insurance-effective image (step S226).

As the insurance-effective image, for example, an image showing "INSURANCE CONTINUED WIN 200 CREDIT" is displayed. This image is an image informing the player that the insurance is effective, and that the value of "200" is to be added to the number-of-credits counter when the insurance condition is satisfied. After the processing has been conducted, the processing is shifted to step S221.

<<Benefit Game Selection Processing>>

Figure 16:
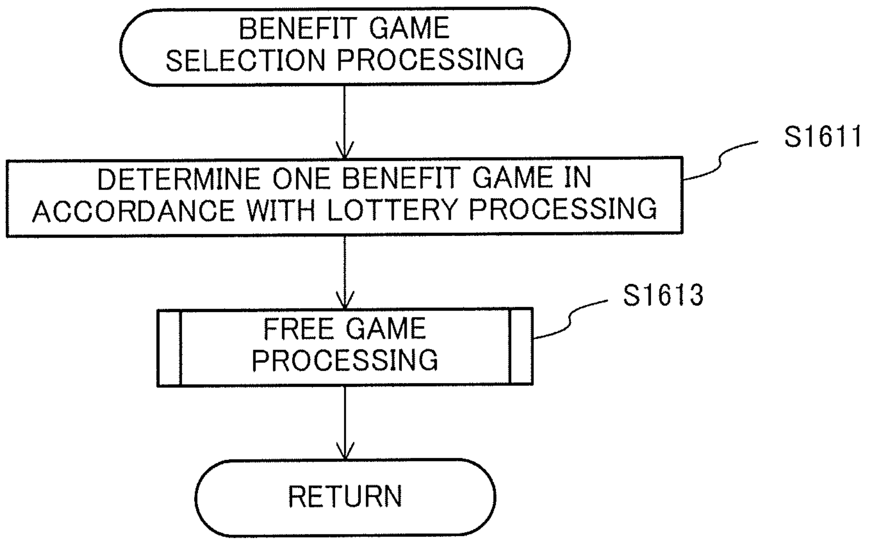
FIG. 16 is a flowchart showing a subroutine of benefit game selection processing to be invoked and executed in the processing operation of step S20 in FIG. 8.

FIG. 16 is a flowchart showing a subroutine of benefit game selection processing to be invoked and executed in the processing operation of step S20 in FIG. 8. Benefit games, as shown in FIG. 29, include combinations of free games and extended bonus games.

First, the main CPU 71 determines one benefit game in accordance with lottery processing (step S1611). As described above, benefit games include combinations of free games and extended bonus games. Specifically, the benefit games, as shown in FIG. 29, include fifteen kinds of games, and include combinations of various kinds of free games (free games 1 to 4) and extended bonus games (extended bonus games 1 to 7). These fifteen kinds of benefit games respectively correspond to the 1-1st functional flowchart to the eighth flowchart shown in FIG. 2A to FIG. 2O. The processing operation of step S1611 is a processing operation of determining one kind of benefit game from among fifteen kinds of benefit games in accordance with lottery processing.

As shown in FIG. 29, a first benefit game corresponds to the 1-1st functional flowchart. A second benefit game corresponds to the 1-2nd functional flowchart. The first benefit game and the second benefit game are executed in accordance with a subroutine of a free game 1 and a subroutine of an extended bonus game 1 to be described later.

Similarly, as shown in FIG. 29, a third benefit game corresponds to the second functional flowchart. The third benefit game is executed in accordance with the subroutine of the free game 1 and the subroutine of the extended bonus game 2.

Similarly, as shown in FIG. 29, a fourth benefit game corresponds to the 3-1st functional flowchart. A fifth benefit game corresponds to the 3-2nd functional flowchart. A sixth benefit game corresponds to the 3-3rd functional flowchart. A seventh benefit game corresponds to the 3-4th functional flowchart. These fourth benefit game to seventh benefit game are executed in accordance with a subroutine of a free game 2 and a subroutine of an extended bonus game 3 to be described later.

Similarly, as shown in FIG. 29, an eighth benefit game corresponds to the 4-1st functional flowchart. A ninth benefit game corresponds to the 4-2nd functional flowchart. A tenth benefit game corresponds to the 4-3rd functional flowchart. An eleventh benefit game corresponds to the 4-4th functional flowchart. The eighth benefit game to the eleventh benefit game are executed in accordance with the subroutine of the free game 1 and a subroutine of an extended bonus game 2 to be described later.

Similarly, as shown in FIG. 29 a twelfth benefit game corresponds to the fifth functional flowchart. The twelfth benefit game is executed in accordance with a subroutine of a free game 3 and the subroutine of the extended bonus game 4 to be described later.

Similarly, as shown in FIG. 29 a thirteenth benefit game corresponds to the sixth functional flowchart. The twelfth benefit game is executed in accordance with a subroutine of a free game 4 and a subroutine of an extended bonus game 5 to be described later.

Similarly, as shown in FIG. 29 a fourteenth benefit game corresponds to the seventh functional flowchart. The fourteenth benefit game is executed in accordance with the subroutine of the free game 4 and a subroutine of an extended bonus game 6 to be described later.

Similarly, as shown in FIG. 29 a fifteenth benefit game corresponds to the eighth functional flowchart. The fifteenth benefit game is executed in accordance with the subroutine of the free game 4 and a subroutine of an extended bonus game 7 to be described later.

After executing the processing operation of step S1611 described above, the main CPU 71 invokes and executes a subroutine of a free game (step S1613) and then completes this subroutine. In the processing operation of step S1613, the main CPU 71 invokes and executes a free game that corresponds to a benefit game selected in the processing operation of step S1611.

That is, when the first benefit game, the second benefit game, the third benefit game, the eighth benefit game, the ninth benefit game, the tenth benefit game, or the eleventh benefit game is selected, the subroutine of the free game 1 is invoked and executed in step S1613. In addition, when the fourth benefit game, the fifth benefit game, the sixth benefit game, or the seventh benefit game is selected, the subroutine of the free game 2 is invoked and executed in step S1613. Further, when the twelfth benefit game is selected, the subroutine of the free game 2 is invoked and executed in step S1613. Furthermore, when the thirteenth benefit game, the fourteenth benefit game, or the fifteenth benefit game is selected, the subroutine of the free game 4 is invoked and executed in step S1613.

<<Processing Operation of Free Game 1>>

FIG. 18 is a flowchart showing a subroutine of a processing operation of a free game 1 to be invoked and executed in the processing operation of step S1613 in FIG. 16. As described above, the processing operation of the free game 1 is executed when any one of the first to third benefit games or any one of the eighth to eleventh benefit games is selected.

First, the main CPU 71 determines a continuation rate in accordance with lottery processing and then determines the number of free game icons in accordance with a result of the lottery processing (step S1811). The easiness of entry into an extended game between a free game and an extended bonus game can be adjusted in accordance with the number of free game icons. Alternatively, in the processing operation of step S1811, the contents of free game icons may be determined in accordance with the result of the lottery processing. The easiness of entry into an extended game between the free game and the extended bonus game can be adjusted in accordance with the contents of free game icons as well. The continuation rate is a rate indicating a possibility that an extended game loop can continue. In the embodiment, the continuation rate is determined as 66%, 79%, 85%, or 89% in accordance with the lottery processing.

A free game icon is an icon to be inserted in an extended bonus game. The number and contents of free game icons are predetermined as a game transfer condition in accordance with the continuation rate and then are stored in the ROM 52.

In a case where the number of free game icons is small in an extended bonus game (a selection bonus game), return from the selection bonus game to a free game can be hardly realized, and entry into an extended game can be hardly realized. On the other hand, in a case where the number of free game icons is large in an extended bonus game (a selection bonus game), return from the selection bonus game to the free game can be easily realized, and entry into an extended game can be easily realized.

The free game icons include icons such as a number-of-games icon, a number-of-symbols icon, or a zero game icon.

In a case where a player selects a number-of-games icon in a selection bonus game, when the routine reverts from the selection bonus game to a free game, the number of games that is defined in the number-of-games icon is added to the number of games and then a free game can be played. Doing this makes it possible to increase the number of unit games in which a player can play as a free game. Therefore, a possibility of transfer from a free game to an extended bonus game (a selection bonus game) can be increased.

In a case where a player selects a number-of-symbols icon, when the routine reverts from a selection bonus game to a free game, free game symbols whose number is defined in the number-of-symbols icon are displayed after added to reel bands of the free game. Doing this makes it possible to increase a possibility that free game symbols are arranged when symbols are rearranged after the free game has been played. Therefore, a player can play a free game without decreasing credits, and can increase a possibility of transfer from a free game to an extended bonus game (a selection bonus game) again.

In a case where a player selects a zero game icon, when the routine reverts from a selection bonus game to a free game, the number of bonus game symbols that is displayed on reel bands in the free game is set to zero. That is, no bonus symbols are displayed on the reel bands used in the free game. Therefore, a possibility of transfer from the free game to the selection bonus game can be decreased.

In addition, after the processing operation of the free game 1 has been invoked, when the processing operation of step S1811 described above is first executed, a continuation rate is increased and then the number or contents of free game icons may be determined. Doing this makes it possible to increase the number of free game playable times, and makes it possible to increase a possibility of transfer from a free game to an extended bonus game (a selection bonus game).

Next, the main CPU 71 changes current symbol arrays to symbol arrays for free game (step S1813). As described above, no bonus game symbols are included in symbol arrays for base game. In contrast, bonus game symbols are included in the symbol arrays for free game. The number of free game symbols may be increased in accordance with a result of a selection bonus game. In step S1813, the current symbol arrays are changed to the symbol arrays for free game, and with respect to free game symbols, a processing operation of inserting free game symbols whose number is determined in the selection bonus game into symbol arrays is executed as well.

Next, the main CPU 71 determines the number of free games (step S1815). In the embodiment, ten unit games are played as free games, and in the processing operation of step S1815, the number of free games is determined at 10.

Next, the main CPU 71 stores the determined number of free games in a number-of-free-games counter that is provided in the RAM 73 (step S1817).

Next, like the processing operation of step S12 described with reference to FIG. 8, the main CPU 71 conducts initialization processing at the time of completion of one game (step S1819). The main CPU 71 then conducts symbol lottery processing described with reference to FIG. 12 (step S1821). Like the processing operation of step S16 described with reference to FIG. 8, the main CPU 71 then conducts rendering content determination processing (step S1823). The main CPU 71 then conducts symbol display control processing described with reference to FIG. 13 (step S1825). The main CPU 71 then conducts number-of-payouts determination processing described with reference to FIG. 14 (step S1827).

Next, the main CPU 71 determines whether or not a bonus game trigger is established (step S1829). As described above, when symbols are rearranged, the routine transfers from a free game to an extended bonus game, as triggered by the fact that three bonus symbols appear. The processing operation of step S1829 is a processing operation of determining whether or not three symbols have appeared after symbols have been rearranged.

When the main CPU 71 determines that no bonus game trigger is established (NO), the main CPU 71 conducts payout processing (step S1831). In this payout processing, the main CPU 71 adds a value that is stored in the number-of-payouts storage region in the number-of-payouts determination processing of step S1827 described previously, to a value that is stored in a number-of-payouts storage region for free game. The number-of-payouts storage region for free game is a region configured to store a total number of payouts that is determined in free game. A prize can be awarded to a player in accordance with the payout processing of step S1831.

It is to be noted that, in the payout processing of step S1831, a coin may be ejected from a coin outlet 15A or a barcode-attached ticket may be issued.

In the determination processing of step S1829 described above, when the main CPU 71 determines that a bonus game trigger is established (YES), the main CPU 71 invokes and executes a subroutine of an extended bonus game (step S1833).

As a bonus game to be invoked in the processing operation of step S1833, there is an extended bonus game 1, an extended bonus game 2, or an extended bonus game 4 (refer to FIG. 29). That is, in a case where the first benefit game or the second benefit game is selected, a subroutine (FIG. 19) of the extended bonus game 1 is invoked and executed in the processing operation of step S1833. In a case where the third benefit game is selected, a subroutine (FIG. 20) of the extended bonus game 2 is invoked and executed in the processing operation of step S1833. In a case where any one of the eighth benefit game to the eleventh benefit game is selected, a subroutine (FIG. 23) of the extended bonus game 4 is invoked and executed in the processing operation of step S1833.

When the main CPU 71 executes the processing operation of step S1831 or S1833 described above, the main CPU 71 subtracts a value of the number-of-free-games counter by 1 (step S1835). Next, the main CPU 71 determines whether or not the value of the number-of-free games counter is set to 0 (step S1837). When the main CPU 71 determines that the value of the number-of-free-games counter is not set to 0 (NO), the main CPU 71 reverts the routine to step S1819. Alternatively, when the CPU 71 determines that the value of the number-of-free-games counter is set to 0 (YES), the CPU 71 completes this subroutine. When the processing operation of the free game 1 completes, the routine transfers to a subroutine of FIG. 16.

<<Processing Operation of Extended Bonus Game 1>>

Figure 19:
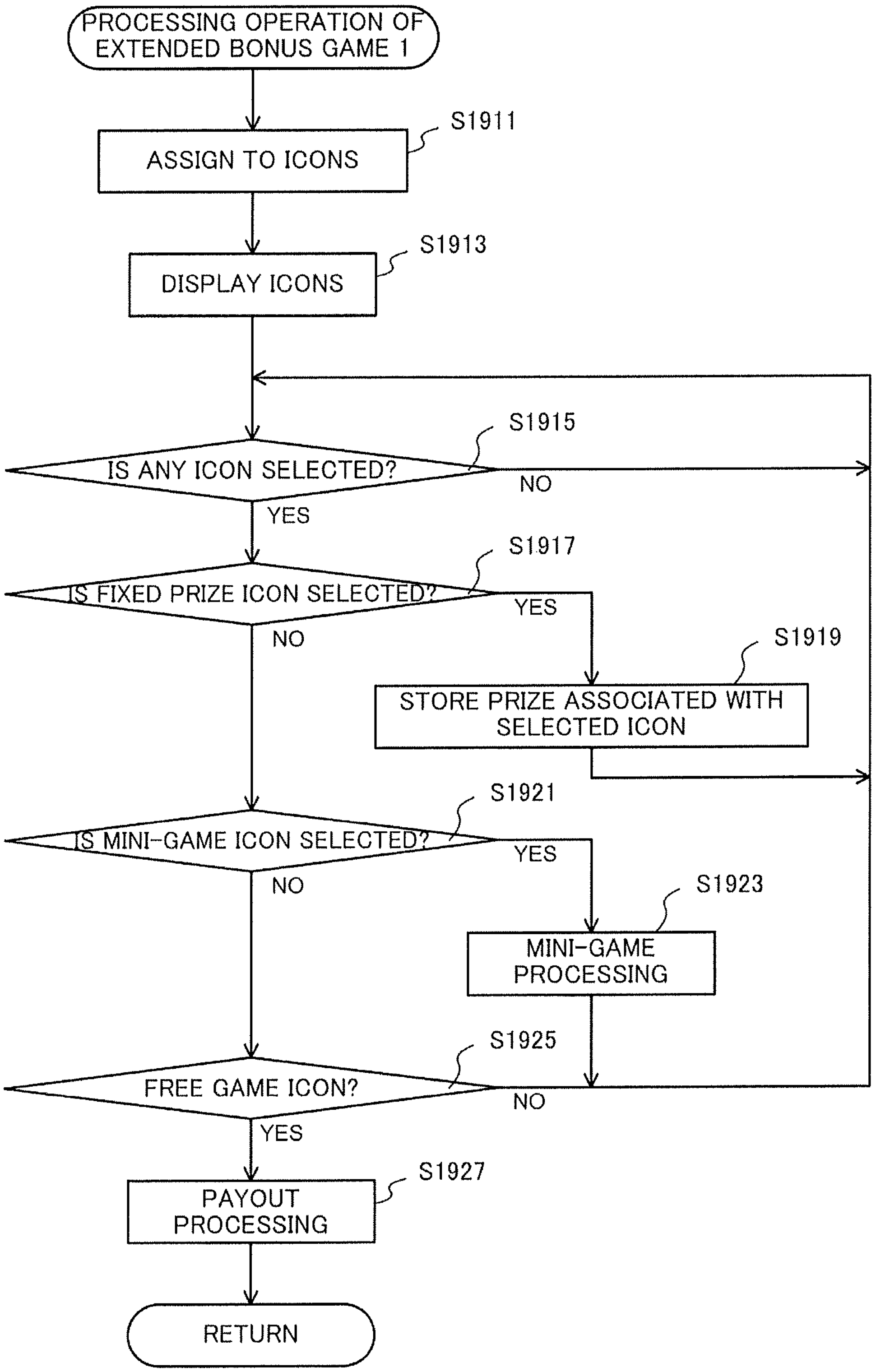
FIG. 19 is a flowchart showing a subroutine of a processing operation of an extended bonus game 1 to be invoked and executed in the processing operation of step S1833 in FIG. 18.

FIG. 19 is a flowchart showing a subroutine of a processing operation of an extended bonus game 1 to be invoked and executed in the processing operation of step S1833 of FIG. 18. As described above, the processing operation of the extended bonus game 1 is executed when the first benefit game or the second benefit game (the 1-1st functional flowchart or the 1-2nd functional flowchart) is selected (refer to FIG. 29).

As described in the 1-1st functional flowchart and the 1-2nd functional flowchart, the extended bonus game 1 is a selection bonus game. The selection bonus game is a game to be played by a player icon selection. Twenty icons are displayed on the lower image display panel 141, a player is caused to select one icon, and then, a game whose contents are defined for the selected icon type is executed. A fixed prize, a mini-game, and a free game are assigned to each of the icons.

When a player selects an icon to which a free game is assigned the extended bonus game 1 is completed and then the routine reverts to the free game. That is, a player can continue a selection bonus game until the player selects an icon to which a free game is assigned. When a player selects an icon to which a fixed prize is assigned, a prize indicated by that icon is awarded to the player. When a player selects an icon to which a mini-game is assigned, the player plays the mini-game and then a prize according to the result is awarded to the player.

In a game according to the 1-1st functional flowchart, there are two icons to which mini-games are assigned. Among the icons to which fixed prizes are assigned, there are two icons whose prize is 150, two icons whose prize is 100, five icons whose prize is 50, and five icons whose prize is 30. There are four icons to which free games are assigned. In the processing operation of step S1911 to be described later, these numbers are assigned.

On the other hand, in a game according to the 1-2nd functional flowchart, there are two icons to which mini-games are assigned. Among the icons to which fixed prizes are assigned, there are two icons whose prize is 150, four icons whose prize is 100, four icons whose prize is 50, and icons whose prize is 30. There are four icons to which free games are assigned. In the processing operation of step S1911 to be described later, these numbers are assigned.

First, the main CPU 71 assigns a fixed prize, a mini-game, and a free game to each of twenty icons (step S1911). The contents defined in accordance with the game according to the 1-1st functional flowchart or the game according to the 1-2nd functional flowchart are assigned. It is preferable that assignment to the icons be determined in accordance with lottery processing.

Next, the main CPU 71 displays images of twenty icons on the lower image display panel 141 (step S1913).

Next, the CPU 71 determines whether or not a player operates a touch panel 114 and then selects one icon from among the twenty icons (step S1915). When the main CPU 71 determines that no icon is selected (NO), the CPU 71 causes the routine to revert to step S1915.

When the main CPU 71 determines that an icon is selected in the determination processing of step S1915 (YES), the main CPU 71 determines whether or not a player selects a fixed prize icon (step S1917).

When the main CPU 71 determines that the player selects the fixed prize icon in the determination processing of step S1917 (YES), the main CPU 71 causes the RAM 73 to store a prize assigned to the selected icon (step S1919) and then causes the routine to revert to step S1915.

When the main CPU 71 determines that the player does not select the fixed prize icon in the determination processing of step S1917 (NO), the CPU 71 determines whether or not a player selects a mini-game icon (step S1921).

When the main CPU 71 determines that the player selects the mini-game icon in the determination processing of step S1921 (YES), the main CPU 71 executes a mini-game (step S1923) and then causes the routine to revert to step S1915. In a case where the player plays the mini-game and can obtain a prize as a result of the mini-game, the prize is stored in the RAM 73.

When the main CPU 71 determines that the player does not select the mini-game icon in the determination processing of step S1921 (NO), the main CPU 71 determines whether or not a player selects a free game icon (step S1925). When the main CPU 71 determines that the player does not select the free game icon (NO), the main CPU 71 causes the routine to revert to step S1915.

When the main CPU 71 determines that the player selects the free game icon in the determination processing of step S1925 (YES), the main CPU 71 executes a processing operation of paying out the prize that is determined in the extended bonus game 1 (step S1927) and then completes this subroutine. The payout processing of step 1927 is a processing operation that is identical to that of step S24 of FIG. 8.

After the subroutine of the extended bonus game 1 has been completed, the routine reverts to step S1835 of FIG. 18. After that, the free game 1 is executed until the number-of-free-games counter indicates 0, and therefore, when a bonus game trigger is established again in the processing operation of step S1829, the extended bonus game 1 is invoked and executed again. In this manner, an extended game loop between the free game 1 and the extended bonus game 1 can be formed.

<<Processing Operation of Extended Bonus Game 2>>

FIG. 20 is a flowchart showing a subroutine of a processing operation of an extended bonus game 2 to be invoiced and executed in the processing operation of step S1833 of FIG. 18. As described above, the processing operation of the extended bonus game 2 is executed when the third benefit game (the second functional flowchart) is selected (refer to FIG. 29).

As described in the second functional flowchart, the extended bonus game is also a selection bonus game. The selection bonus game is a game to be played by a player icon selection. Twenty icons are displayed on the lower image display panel 141, a player is caused to select one icon, and a game whose contents are defined for the selected icon type is executed. A fixed prize, a mini-game, a free game, and END are assigned to each of the icons.

When a player selects an icon to which a free game is assigned, the extended bonus game 1 is completed and then the routine reverts to the free game. That is, a player can continue a selection bonus game until the player selects an icon to which a free game is assigned. When a player selects an icon to which a fixed prize is assigned, the prize indicated by that icon is awarded to the player. When a player select an icon to which a mini-game is assigned, the player plays the mini-game and then the prize according to the result is awarded to the player. Further, when a player selects an icon to which END is assigned, the selection bonus game is completed and then the routine reverts to a normal game (a base game).

In a game according to the second functional flowchart, there are three icons to which mini-games are assigned. Among the icons to which fixed prizes are assigned, there are three icons whose prize is 150, three icons to which prize is 100, two icons whose prize is 50, and four icons whose prize is 30. There are four icons to which free games are assigned. There is one icon to which END is assigned. These numbers are assigned in the processing operation of step S2011 to be described later.

First, the main CPU 71 assigns a fixed prize, a mini-game, a free game, and END to each of the twenty icons (step S2011). The contents defined in accordance with the game according to the second functional flowchart are assigned. It is preferable that assignment to the icons be determined in accordance with lottery processing.

Next, the main CPU 71 displays images of the twenty icons on the lower image display panel 141 (step S2013).

Next, the main CPU 71 determines whether or not a player operates the touch panel 114 and then selects one icon from among the twenty icons (step S2015). When the main CPU 71 determines that no icon is selected (NO), the main CPU 71 causes the routine to revert to step S2015.

When the main CPU 71 determines that an icon is selected in the determination processing of step S2015 (YES), the main CPU 71 determines whether or not a player selects an END icon (step S2017).

When the main CPU 71 determines that the player selects the END icon in the determination processing of step S2017 (YES), the main CPU 71 causes the routine to a subroutine of FIG. 18 and then completes the free game 1 immediately. By doing this, in a case where the player selects the END icon, the free game 1 is completed, enabling the routine to revert to a base game immediately.

When the main CPU 71 determines that the player does not select the END icon in the determination processing of step S2017 (NO), the main CPU 71 determines whether not a player selects a fixed prize icon (step S2019).

When the main CPU 71 determines that the player selects the fixed prize icon in the determination processing of step S2019 (YES), the main CPU 71 causes the RAM 73 to store the prize assigned to the selected icon (step S2021) and then causes the routine to revert to step S2015.

When the main CPU 71 determines that the player does not select the fixed prize icon in the determination processing of step S2019 (NO), the main CPU 71 determines whether or not a player selects a mini-game icon (step S2023).

When the main CPU 71 determines that the player selects the mini-game icon in the determination processing of step S2023 (YES), the main CPU 71 executes a mini-game (step S2025) and then causes the routine to revert to step S2015. In a case where the player plays the mini-game and then can obtain a prize as the result, the prize is stored in the RAM 73.

When the main CPU 71 determines that the player does not select the mini-game icon in the determination processing of step S2023 (NO), the main CPU 71 determines whether or not a player selects a free game icon (step S2027). When the main CPU 71 determines that a player does not select the free game icon (NO), the main CPU 71 causes the routine to revert to step S2015.

When the main CPU 71 determines that the player selects the free game icon in the determination processing of step S2027 (YES), the main CPU 71 executes a processing operation of paying out the prize that is determined in the extended bonus game 2 (step S2029 and then completes this subroutine. The payout processing of step S2029 is a processing operation that is identical to that of step S24 of FIG. 8.

After a subroutine of the extended bonus game 2 has been completed, the routine reverts to step S1835 of FIG. 18. After that, the free game 1 is executed until the number-of-free-games counter indicates 0, and therefore, when a bonus game trigger is established again in the processing operation of step S1829, the extended bonus game 2 is invoked and executed again. Doing this makes it possible to form an extended game loop between the free game 1 and the extended bonus game 2.

The third benefit game that consists of the free game 1 and the extended bonus game 2 (the game according to the second functional flowchart) reverts to a base game when the value of the number-of-free-games counter is set to 0 in the free game 1 or when a player selects an END icon in the extended bonus game 2. In the third benefit game, there are a route of return from the free game 1 to a base game and a route of return from the extended bonus game 2 to a base game.

<<Processing Operation of Free Game 2>>

FIG. 21 is a flowchart showing a subroutine of a processing operation of a free game 2 to be invoked and executed in the processing operation of step S1613 of FIG. 16. As described above, the processing operation of the free game 2 is executed when any one of the fourth to seventh benefit games (any one of the 3-1st functional flowchart to the 3-4th functional flowchart) is selected.

In the fourth to seventh benefit games (the 3-1st functional flowchart and the 3-4th functional flowchart), there is no processing operation of determining a continuation rate unlike the first to third benefit games. In addition, the free game 2 can be played until bonus game symbols are arranged, and there could be no case of return from the free game 2 to a base game. When the bonus game symbols are arranged, an extended bonus game 3 to be described later is executed.

First, the main CPU 71 changes current symbol arrays to symbol arrays for free game (step S2111). As described above, no bonus symbol is included in symbol arrays for base game. In contrast, a predetermined number of bonus game symbols are included in the symbol arrays for free game.

Next, like the processing operation of step S12 described with reference to FIG. 8, the main CPU 71 conducts initialization processing at the time of completion of one game (step S2113). The main CPU 71 then conducts symbol lottery processing described with reference to FIG. 12 (step S2115). Like the processing operation of step S16 described with reference to FIG. 8, the main CPU 71 then conducts rendering content determination processing (step S2117). The main CPU 71 then conducts symbol display control processing described with reference to FIG. 13 (step S2119). The main CPU 71 then conducts number-of-payouts determination processing described with reference to FIG. 14 (step S2121).

Next, the main CPU 71 determines whether or not a bonus game trigger is established (step S2123). As described above, when symbols are rearranged, the routine transfers from a free game to an extended bonus game, as triggered by the fact that three bonus symbols appear. The processing operation of step S2123 is a processing operation of determining whether or not three symbols have appeared after symbols have been rearranged.

When the main CPU 71 determines that no bonus game trigger is established (NO), the main CPU 71 conducts payout processing (step S2125) and then causes the routine to step S2113. In this payout processing, the main CPU 71 adds a value that is stored in the number-of-payouts storage region in the number-of-payouts determination processing of step S2121 described previously, to a value that is stored in a number-of-payouts storage region for free game. The number-of-payouts storage region for free game is a region configured to store a total number of payouts that is determined in free game. A prize can be awarded to a player in accordance with the payout processing of step S2125.

It is to be noted that, in the payout processing of step S2125, a coin may be ejected from a coin outlet 15A or a barcode-attached ticket may be issued.

When the main CPU 71 determines that the bonus game trigger is established in the determination processing of step S2123 described above (YES), the main CPU 71 invokes and executes a subroutine of an extended bonus game (step S2127) and then completes this subroutine. In this manner, when the extended bonus game completes and then the routine reverts from the extended bonus game, the processing operation of the free game 2 also completes immediately, and thus, the routine reverts from the extended bonus game to a base game. The extended bonus game to be invoked and executed in the processing operation of step S2127 is an extended bonus game 3 shown in FIG. 22 to be described later.

In the processing operation of the free game 2, transfer to an extended bonus game is not realized unless a bonus game trigger is established, so that a player can repeatedly play the free game 2. Return to a base game is always realized from the extended bonus game to be executed in step S2127.

<<Processing Operation of Extended Bonus Game 3>>

FIG. 22 is a flowchart showing a subroutine of a processing operation of an extended bonus game 3 to be invoked and executed in the processing operation of step S2127 of FIG. 21. As described above, the processing operation of the extended bonus game 2 is executed when any one of the fourth to seventh benefit games (any one of the 3-1st functional flowchart to the 3-4th functional flowchart) is selected (refer to FIG. 29).

As described in the 3-1st functional flowchart to the 3-4th functional flowchart, the extended bonus game 1 is a selection bonus game. The selection bonus game is a game to be played by a player icon selection. Fifteen or twelve icons are displayed on the low image display panel 141, a player is caused to select one icon, and then, a game whose contents are defined for the selected icon type is executed. In a case where the four benefit game (the 3-1st functional flowchart) or the fifth benefit game (the 3-2nd functional flowchart) is selected, fifteen icons are displayed. In a case where the sixth benefit game (the 3-3rd functional flowchart) or the seventh benefit game (the 3-4th functional flowchart) is selected, twelve icons are displayed. In any case, a fixed prize plus a free game and END are assigned to each of the icons. A specific assignment to the icons are as described in the 3-1st to 3-4th functional flowcharts (refer to FIG. 2D to FIG. 2G).

In a case where three icons to which fixed prizes plus free games are assigned could be selected and arranged before three END icons are arranged, the fixed prizes corresponding to the arranged three icons are awarded to a player and then the routine reverts to a free game. On the other hand, if a player arranges three EN icons, a selection bonus game is competed and then the routine reverts to a normal game (a base game) immediately.

First the main CPU 71 assigns a fixed prize plus a free game and END to each of fifteenth icons or each of twelve icons (step S2211). The contents defined in accordance with each of the games according to the 3-1st to 3-4th functional flowcharts are assigned in accordance with the processing operation of step S2211. It is preferable that assignment to the icons be determined in accordance with lottery processing.

Next, the main CPU 71 displays images of all icons on the lower image display panel 141 (step S2213).

It is to be noted that, in the lower image display panel 141, icons are displayed in such a manner that the contents corresponding to each of the icons cannot be visually recognized until a player selects an icon. Doing this makes it possible to impart a tense atmosphere or a sense of expectation to a player.

Next, the main CPU 71 determines whether or not a player operates the touch panel 114 and then selects one icon from among the twenty icons (step S2215). When the main CPU 71 determines that no icon is selected (NO), the main CPU 71 causes the routine to revert to step S2215.

Next, when the main CPU 71 determines that the icon is selected in the determination processing of step S2215 (YES), the main CPU 71 determines whether or not a player selects an END icon (step S2217).

When the main CPU 71 determines that the player does not select the END icon in the determination processing of step S2217 (NO), the main CPU 71 determines whether or not three icons of fixed prizes plus free games are arranged (step S2219).

When the main CPU 71 determines that the three icons of fixed prizes plus free games are not arranged in the determination process of step S2219 (NO), the main CPU 71 causes the routine to revert to step S2215 described above.

When the main CPU determines that the three icons of fixed prizes plus free games are arranged in the determination processing of step S2219 (YES), the main CPU 71 causes the routine to revert to step S2113 of FIG. 21 described above. By doing this, the extended bonus game can be repeated until three icons of fixed prizes plus free games are arranged. In addition, successful arrangement of three icons of fixed prizes plus free games enables the routine to revert to the free game 2, making it possible to form an extended game loop by means of the free game 2 and the extended bonus game 3.

When the main CPU 71 determines that the player selects the END icon in the determination processing of step S2217 (YES), the main CPU 71 determines whether or not three END icons are arranged (step S2221).

When the main CPU 71 determines that the three END icons are not arranged in the determination processing of step S2221 (NO), the main CPU 71 causes the routine to revert to step S2215 described above.

When the main CPU 71 determines that the three END icons are arranged in the determination processing of step S2221 (YES), the main CPU 71 executes a processing operation of paying out the prize that is determined in the extended bonus game 3 (step S2223) and then completes this subroutine. The payout processing of step S2223 is a processing operation that is identical to that of step S24 of FIG. 8.

As described above, when the extended bonus game 3 completes and then the routine reverts to the free game 2, the processing operation of the free game 2 completes immediately. Thus, the routine reverts from the extended bonus game 3 to a base game immediately.

<<Processing Operation of Extended Bonus Game 4>>

Figure 23:
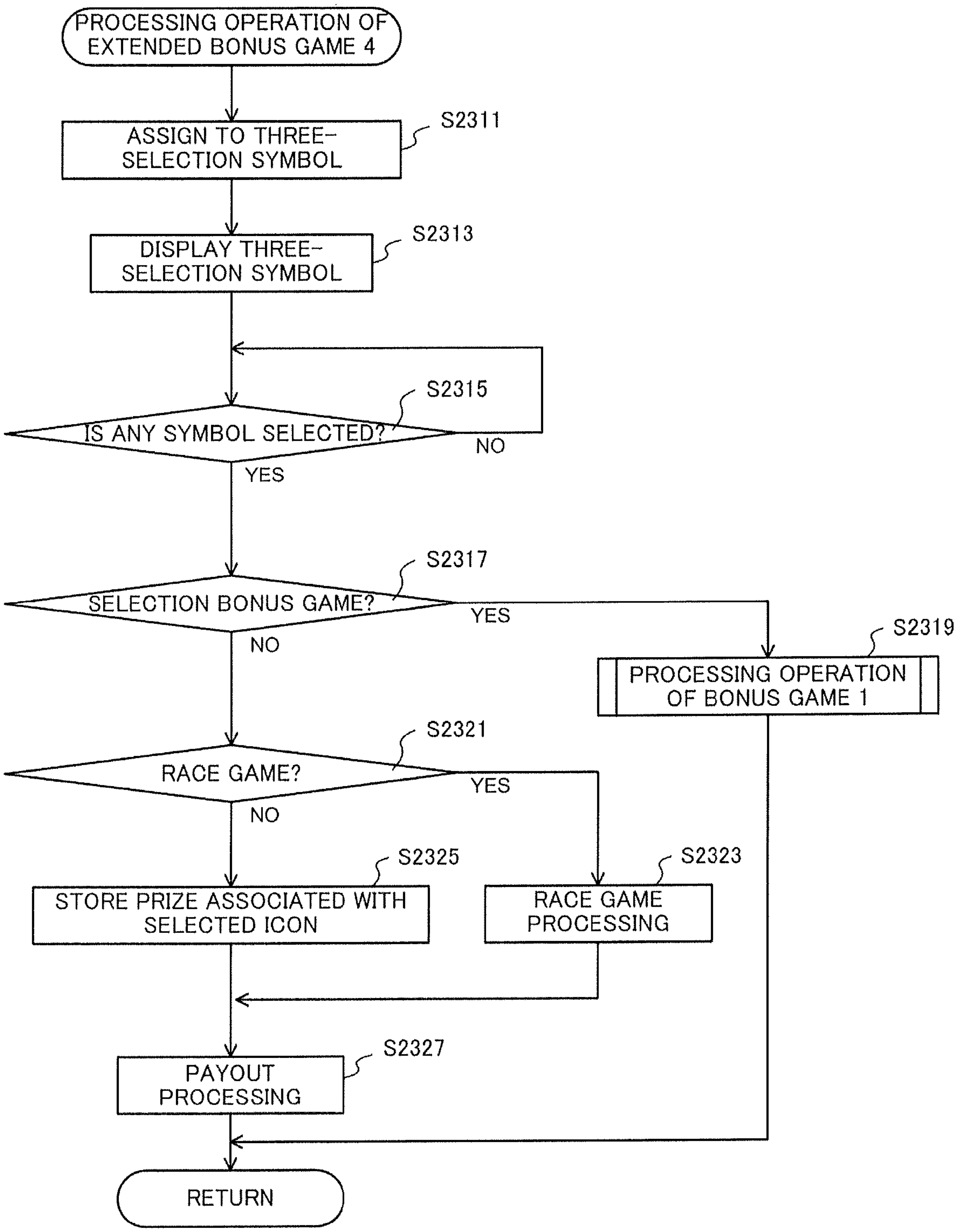
FIG. 23 is a flowchart showing a subroutine of a processing operation of an extended bonus game 4 to be invoked and executed in the processing operation of step S1833 in FIG. 18.

FIG. 23 is a flowchart showing a subroutine of an extended bonus game 4 to be invoked and executed in the processing operation of step S1833 of FIG. 18. As described above, the processing operation of the extended bonus game 4 is executed when any one of the eighth to twelfth benefit games (any one of the 4-1st functional flowchart to the 4-4th functional flowchart or the fifth functional flowchart) is selected (refer to FIG. 29).

As described in the 4-1st to 4-4th functional flowcharts, a player can select one of three kinds of games as an extended bonus game. The games of three kinds from which a player can select are a selection bonus game, a race game, and a fixed prize game.

The selection bonus game is a game to be played by a player icon selection. The processing operation of the selection bonus game is a processing operation that is identical to the extended bonus game 1 shown in FIG. 19. The race game is a game in which an image indicating that a plurality of characters compete against each other is displayed on the lower image display panel 141 and then a player predicts character rankings. The fixed prize game is a game in which a plurality of icons are displayed on the lower image display panel 141 and then a player selects one icon. When the selection bonus game, the race game, or the fixed prize game completes, the routine reverts to a free game.

First, the main CPU 71 assigns the contents of any one of three kinds of games to each of symbols for three selections (step S2311). It is preferable that assignment to the symbols for three selections be determined in accordance with lottery processing.

Next, the main CPU 71 displays symbols for three selections on the lower image display panel 141 in such a manner that a player cannot visually recognize the contents of symbols for three selections (step S2313). For example, "BONUS" symbols are displayed as symbols for three selections.

Next, the main CPU 71 determines whether or not a player operates the touch panel 114 and then selects one symbol from among the symbols for three selections (step S2315). When the main CPU 71 determines that no icon is selected (NO), the main CPU 71 causes the routine to revert to step S2315.

When the main CPU 71 determines one symbol for three selections is selected in the determination processing of step S2315 (YES), the main CPU 71 determines whether or not the selected symbol for three selections corresponds to a selection bonus game (step S2317).

When the main CPU 71 determines that the selected symbol for three selections corresponds to a selection bonus game in the determination processing of step S2317 (YES), the main CPU 71 invokes and executes a subroutine of the extended bonus game 1 shown in FIG. 19 described above (step S2319) and then completes this subroutine.

When the main CPU 71 determines that the selected symbol for three selections does not correspond to a selection bonus game in the determination processing of step S2317 (NO), the main CPU 71 determines whether or not the selected symbol for three selections corresponds to a race game (step S2321).

When the main CPU 71 determines that the selected symbol for three selections corresponds to a race game in the determination processing of step S2321 (YES), the main CPU 71 execute the race game (step S2323). In the step S2323, in a case where a prize is acquired as a result of the race game, a processing operation of storing the acquired prize is included as well.

When the main CPU 71 determines that the selected symbol for three selections does not correspond to a race game in the determination processing of step S2321 (NO), the main CPU 71 causes the RAM 73 to store the prize that is assigned to the selected symbol for three selections (step S2325).

After the processing operation of step S2323 or S2325 described above has been executed, a processing operation of paying out the prize acquired in a race game or a fixed prize game is executed (step S2327) and then this subroutine is completed. The payout processing of step S2327 is a processing operation that is identical to that of step S24 of FIG. 8.

In the processing operation of the extended bonus game 4, when a selection bonus game, a race game, or a fixed prize game completes, the routine reverts to the processing operation of the free game 1 shown in FIG. 18 immediately. After that, in the processing operation of the free game 1, the free game 1 can be repeated until the value of the number-of-free-games counter indicates 0. When the free game 1 is repeated, in a case where a bonus game trigger is established, the processing operation of the extended bonus game 4 shown in FIG. 23 is invoked and executed again. In this manner, an extended game loop by means of the free game 1 and the extended bonus game 4 can be formed.

In addition, in the eighth to eleventh benefit games, the free game 1 is selected. The free game 1, as shown in FIG. 18, completes when the value of the number-of-free-games counter indicates 0 and then the routine can return to a base game.

<<Processing Operation of Free Game 3>>

FIG. 24 is a flowchart showing a subroutine of a processing operation of a free game 3 to be invoked and executed in the processing operation of step S1613 of FIG. 16. As described above, the processing operation of a free game 3 is executed when the twelfth benefit game (the fifth functional flowchart) is selected.

First, the main CPU 71 determines a continuation rate in accordance with lottery processing and then determines the number of free game icons in accordance with a result of the lottery processing (step S2411). The easiness of entry into an extended game between a free game and an extended bonus game can be adjusted in accordance with the number of free game icons. In addition, in the processing operation of step S2411, the contents of free game icons may be determined in accordance with the result of the lottery processing. The easiness of entry into an extended game between the free game and the extended bonus game can be adjusted in accordance with the contents of free game icons as well. The continuation rate is a rate indicating a possibility that an extended game loop can continue. In the embodiment, the continuation rate is determined at 66%, 79%, 85%, or 89% in accordance with the lottery processing.

A free game icon is an icon to be inserted in an extended bonus game. The number or contents of free game icons are predetermined as a game transfer condition in accordance with the continuation rate, and are stored in the ROM 52.

In a case where the number of free game icons is small in an extended bonus game (a selection bonus game), return from the selection bonus game to a free game can be hardly realized, and entry into an extended game can be hardly realized. Alternatively, in a case where the number of free game icons is large in an extended bonus game (a selection bonus game), return from the selection bonus game to a free game can be easily realized, and entry into an extended game can be easily realized.

The free game icons include icons such as a number-of-games icon, a number-of-symbols icon, or a zero game icon.

In a case where a player selects a number-of-games icons in a selection bonus game, when the routine reverts from the selection bonus game to a free game, the number of games that is defined in the number-of-games icon is added to a current number of games and then the free game can be played. Doing this makes it possible to increase the number of unit games that a player can play as a free game. Therefore, a possibility of transfer from the free game to the extended bonus game (the selection bonus game) can be increased.

In a case where a player selects a number-of-symbols icon, when the routine reverts from a selection bonus game to a free game, free game symbols whose number is defined in the number-of-symbols icon are displayed after added to reel bands of the free game. Doing this makes it possible to increase a possibility that free game symbols are arranged when symbols are rearranged after the free game has been played. Therefore, a player can play a free game without decreasing credits, and can increase a possibility of transfer from a free game to an extended bonus game (a selection bonus game) again.

In a case where a player selects a zero game icon, when the routines returns from a selection bonus game to a free game, the number of bonus game symbols that is displayed on reel bands in the free game is set to zero. That is, no bonus symbols are displayed on the reel bands used in the free game. Therefore, a possibility of transfer from the free game to the selection bonus game can be decreased.

In addition, after the processing operation of the free game 3 has been invoked, when the processing operation of step S2411 described above is first executed, a continuation rate is increased and then the number or contents of free game icons may be determined. Doing this makes it possible to increase the number of free game playable times, and makes it possible to increase a possibility of transfer from a free game to an extended bonus game (a selection bonus game).

Next, the main CPU 71 changes current symbol arrays to symbol arrays for free game (step S2413). As described above, no bonus game symbols are included in symbol arrays for base game. In contrast, bonus game symbols are included in the symbol arrays for free game. The number of free game symbols may be increased in accordance with a result of a selection bonus game. In step S2413, the current symbol arrays are changed to the symbol arrays for free game, and with respect to free game symbols, a processing operation of inserting free game symbols whose number is determined in the selection bonus game into symbol arrays is executed as well.

Next, the main CPU 71 determines the number of free games (step S2415). In the embodiment, ten unit games are played in the free game, and in the processing operation of step S2415, the number of free games is determined at 10.

Next, the main CPU 71 stores the determined number of free games in a number-of-free-games counter that is provided in the RAM 73 (step S2417).

Next, like the processing operation of step S12 described with reference to FIG. 8, the main CPU 71 conducts initialization processing at the time of completion of one game (step S2419). The main CPU 71 then conducts symbol lottery processing described with reference to FIG. 12 (step S2421). Like the processing operation of step S16 described with reference to FIG. 8, the main CPU 71 then conducts rendering content determination processing (step S2423). The main CPU 71 then conducts symbol display control processing described with reference to FIG. 13 (step S2425). The main CPU 71 then conducts number-of-payouts determination processing described with reference to FIG. 14 (step S2427).

Next, the main CPU 71 determines whether or not three or more END symbols appear (step S2429).

When the main CPU 71 determines that the three or more END symbols appear in the determination processing of step S2429 (YES), the main CPU 71 completes this subroutine immediately. As described in the fifth functional flowchart, when three or more END symbols appear, the routine reverts from a free game to a base game. When the main CPU 71 determines that three or more END symbols appear in the determination processing of step S2429, the main CPU 71 completes this subroutine immediately, whereby the routine reverts from the free game to the base game.

In this free game 3, unlike the free game 2, the routine reverts from the free game to the base game in a case where three or more END symbols appear.

When the main CPU 71 determines that the three or not END symbols do not appear in the determination processing of step S2429 (NO), the main CPU 71 determines whether or not a bonus game trigger is established (step S2431). As described above, when symbols are rearranged, the routine transfers from a free game to an extended bonus game, as triggered by the fact that three bonus game symbols appear. The processing operation of step S2431 is a processing operation of determining whether or not three bonus game symbols has appeared after symbols have been rearranged.

When the main CPU 71 determines that no bonus game trigger is established (NO), the main CPU 71 conducts payout processing (step S2433). In this payout processing, the main CPU 71 adds a value that is stored in the number-of-payouts storage region in the number-of-payouts determination processing of step S2427 described previously, to a value that is stored in a number-of-payouts storage region for free game. The number-of-payouts storage region for free game is a region configured to store a total number of payouts that is determined in free game. A prize can be awarded to a player in accordance with the payout processing of step S2433.

It is to be noted that, in the payout processing of step S2433, a coin may be ejected from a coin outlet 15A or a barcode-attached ticket may be issued.

In the determination processing of step S2431 described above, when the main CPU 71 determines that the bonus game trigger is established (YES), the main CPU 71 invokes and executes a subroutine of an extended bonus game (step S2435).

The extended bonus game to be invoked in the processing operation of step S2435 is the extended bonus game 4 described above (refer to FIG. 29). That is, in a case where the twelfth benefit game is selected, a subroutine (FIG. 23) of the extended bonus game 4 is invoiced and executed in the processing operation of step S2435.

After executing the processing operation of step S2435, the main CPU 71 subtracts a value of a number-of-free-games counter by 1 (step S2437). Next, the main CPU 71 determines whether or not the value of the number-of-free-games counter is set to 0 (step S2439). When the main CPU 71 determines that the value of the number-of-free-games counter is not set to 0 (NO), the main CPU 71 causes the routine to revert to step S2419. Alternatively, when the main CPU 71 determines that the value of the number-of-free-games counter is set to 0 (YES), the main CPU 71 completes this subroutine. When the processing operation of the free game 3 completes, the routine transfers to a subroutine of FIG. 16.

In this free game 3, when a condition that three END symbols are arranged or a condition that the value of the number-of-free-games counter is set to 0 is established, this subroutine is completed. Therefore, in a case where three END symbols are arranged or in a case where the value of the number-of-free-games counter is set to 0, the routine reverts from the free game 3 to a base game. In addition, return to the base game may be realized while a priority is assigned to the condition that three END symbols are arranged or the condition that the value of the number-of-free-games counter is set to 0.

<<Processing Operation of Free Game 4>>

FIG. 25 is a flowchart showing a subroutine of a processing operation of a free game 4 to be invoiced and executed in the processing operation of step S1613 of FIG. 16.

As described above, the processing operation of the free game 4 is executed when any one of the thirteenth to fifteenth benefit games (the sixth to eighth functional flowcharts) is selected.

The processing operation of the free game 4 is to determine a continuation rate, unlike the processing operation of the free game 2 described above (refer to the sixth to eighth functional flowcharts). The free game 4 can also be played until bonus game symbols are arranged, and there is no case of return from the free game 2 to a base game. When the bonus game symbols are arranged, an extended bonus game 5, 6, or 7 to be described later is executed.

First, the main CPU 71 determines a configuration rate in accordance with lottery processing and then executes a predetermined processing operation in accordance with a result of the lottery processing (step S2511). The contents of the processing operation of step S2511 are different depending on which game of the extended bonus games 5, 6, and 7 to execute when bonus game symbols are arranged. In a case where the extended bonus game 5 is executed, the number of free game icons is determined. The contents of free game icons may be determined in accordance with the result of the lottery processing. In a case where the extended bonus game 6 is executed, the number of free game symbols is determined. In a case where the extended bonus game 7 is executed, the progress of the game such as a win or loss of a battle in which characters compete against each other is determined.

The easiness of entry into an extended game between a free game and an extended bonus game can be adjusted in accordance with the number or contents of free game icons, the number of free game symbols, or the progress of a battle in which characters compete against each other. A continuation rate is a rate indicating a possibility that an extended game loop can continue. In the embodiment, the continuation rate is determined at 66%, 79%, 85% or 89% in accordance with lottery processing.

As described above, in a case where the extended bonus game 5 is executed, the number and contents of free game icons are determined according to the continuation rate by means of the processing operation of step S2511. The free game icons corresponding to the determined number and contents are inserted when the extended bonus game 5 is executed. The number and contents of free game icons are predetermined as a game transfer condition in accordance with each of the continuation rates and then are stored in the ROM 52.

In a case where the number of free game icons is small in the extended bonus game 5 (the selection bonus game), return from the extended bonus game 5 to a free game can be hardly realized and then entry into an extended game can be hardly realized. Alternatively, in a case where the number of free game icons is large in the extended bonus game 5 (the selection bonus game), return from the extended bonus game 5 to a free game can be easily realized and then entry into an extended game can be easily realized.

The free game icons include icons such as a number-of-games icon, a number-of-symbols icon, or a zero game icon.

In a case where a player selects a number-of-games icons in the extended bonus game 5 (the selection bonus game), when the routine reverts from the extended bonus game 5 to a free game, the number of games that is defined in the number-of-games icon is added to a current number of games and then the free game can be played. Doing this makes it possible to increase the number of unit games that a player can play as a free game. Therefore, a possibility of transfer from the free game to the extended bonus game 5 (the selection bonus game) can be increased.

In a case where a player selects a number-of-symbols icon, when the routine reverts from the extended bonus game 5 (the selection bonus game) to a free game, free game symbols whose number is defined in the number-of-symbols icon are displayed after added to reel bands of the free game. Doing this makes it possible to increase a possibility that free game symbols are arranged when symbols are rearranged after the free game has been played. Therefore, a player can play a free game without decreasing credits, and can increase a possibility of transfer from a free game to the extended bonus game 5 (the selection bonus game) again.

In a case where a player selects a zero game icon, when the routine reverts from the extended bonus game 5 (the selection bonus game) to a free game, the number of bonus game symbols that is displayed on reel bands in the free game is set to zero. That is, no bonus symbols are displayed on the reel bands used in the free game. Therefore, a possibility of transfer from the free game to the extended bonus game 5 (the selection bonus game) can be decreased.

In addition, in a case where the extended bonus game 6 is executed, the number of free game symbols is determined according to the continuation rate by means of the processing operation of step S2511. The number-of-free-games symbols are inserted to a free game that is playable as an extended bonus game. The number of free game symbols is predetermined as a game transfer condition in accordance with each of the continuation rates so that the continuation rate is achieved and then the predetermined number is stored in the ROM 52. If the number of free game symbols is large, a possibility of transfer from the extended bonus game 6 to a free game can be increased.

In a case where the extended bonus game 7 is executed, the progress of a battle in which characters compete against each other is determined in the extended bonus game 7 in accordance with the processing operation of step S2511. A possibility of transfer from the extended bonus game 7 to a free game can be increased in accordance with the progress of the battle. The progress of the battle in which the characters compete against each other is displayed in the extended bonus game 7. The progress of the battle in which the characters compete against each other is predetermined as a game transfer condition in accordance with a continuation rate and then is stored in the ROM 52.

In addition, after the processing operation of the free game 4 has been invoked, when the processing operation of step S2511 described above is first executed, the number or contents of free game icons, the number of free game symbols, or the progress of a battle in which characters compete against each other may be determined by increasing the continuation rate. Doing this makes it possible to increase the number of free game playable times, and makes it possible to increase a possibility of transfer from a free game to the extended bonus game 5, 6, or 7.

Next, the main CPU 71 changes current symbol arrays to symbol arrays for free game (step S2513). As described above, no bonus game symbols are included in symbol arrays for base game. In contrast, bonus game symbols are included in the symbol arrays for free game.

Next, like the processing operation of step S12 described with reference to FIG. 8, the main CPU 71 conducts initialization processing at the time of completion of one game (step S2515). The main CPU 71 then conducts symbol lottery processing described with reference to FIG. 12 (step S2517). Like the processing operation of step S16 described with reference to FIG. 8, the main CPU 71 then conducts rendering content determination processing (step S2519). The main CPU 71 then conducts symbol display control processing described with reference to FIG. 13 (step S2521). The main CPU 71 then conducts number-of-payouts determination processing described with reference to FIG. 14 (step S2523).

Next, the main CPU 71 determines whether or not a bonus game trigger is established (step S2525). As described above, when symbols are rearranged, the routine transfers from a free game to an extended bonus game, as triggered by the fact that three bonus symbols appear. The processing operation of step S2525 is a processing operation of determining whether or not three symbols have appeared after symbols have been rearranged.

When the main CPU 71 determines that no bonus game trigger is established (NO), the main CPU 71 conducts payout processing (step S2527) and then causes the routine to revert to step S2515. In this payout processing, the main CPU 71 adds a value that is stored in the number-of-payouts storage region in the number-of-payouts determination processing of step S2523 described previously, to a value that is stored in a number-of-payouts storage region for free game. The number-of-payouts storage region for free game is a region configured to store a total number of payouts that is determined in free game. A prize can be awarded to a player in accordance with the payout processing of step S2527.

It is to be noted that, in the payout processing of step S2527, a coin may be ejected from a coin outlet 15A or a barcode-attached ticket may be issued.

In the determination processing of step S2525 described above, when the main CPU 71 determines that the bonus game trigger is established (YES), the main CPU 71 invokes and executes a subroutine of an extended bonus game (step S2529) and then complete this subroutine. When the extended bonus game completes and then the routine reverts from the extended bonus game, the processing operation of the free game 4 also completes immediately, so that the routine reverts from the extended bonus game to a base game immediately.

The extended bonus games to be invoked and executed in the processing operation of step S2529 are the extended bonus game 5 shown in FIG. 26, the extended bonus game 6 shown in FIG. 27, or the extended bonus game 7 shown in FIG. 28, to be described later. That is, in a case where the thirteenth benefit game is selected, the extended bonus game 5 is invoked and executed in step S2529. In a case where the fourteenth benefit game is selected, the extended bonus game 6 is invoked and executed in step S2529. In a case where the fifteenth benefit game is selected, the extended bonus game 7 is invoked and executed in step S2529.

In the processing operation of the free game 4, like the free game 2, transfer to an extended bonus game is not realized unless a bonus game trigger is established, so that a player can repeatedly play the free game 4. Return to a base game is always realized from the extended bonus game to be executed in step S2529.

<<Processing Operation of Extended Bonus Game 5>>

FIG. 26 is a flowchart showing a subroutine of a processing operation of an extended bonus game 5 to be invoked and executed in the processing operation of step S2529 of FIG. 25. As described above, the processing operation of the extended bonus game 5 is executed when the thirteenth benefit game (the sixth functional flowchart) is selected (refer to FIG. 29).

As described in the sixth functional flowchart, the extended bonus game 5 is also a selection bonus game. The selection bonus game is a game to be plated by a player icon selection. Twenty icons are displayed on the lower image display panel 141, a player is caused to select one icon, and a game whose contents are defined for the selected icon type is executed. A fixed prize, a mini-game—a free game, and END are assigned to each of the icons.

When a player selects an icon a free game is assigned, the extended bonus game 5 is completed and then the routine reverts to the free game. That is, a player can continue a selection bonus game until the player selects an icon to which a free game is assigned. When a player selects an icon to which a fixed prize is assigned, a prize indicated by that icon is awarded to the player. When a player selects an icon to which a mini-game is assigned, the player plays the mini-game and then a prize according to the result is awarded to the player. Further, when a player selects an icon to which END is assigned, a selection bonus game is completed and then the routine reverts to a normal game (a base game).

In a game according to the sixth functional flowchart, there are three icons to which mini-games are assigned. Among the icons to which fixed prizes are assigned, there are three icons whose prize is 150, three prizes whose prize is 100, two icons whose prize is 50, and four icons whose prize 30. There are four icons to which free games are assigned. There is one icon to which END is assigned. These numbers are assigned in the processing operation of step S2611 to be described later.

First, the main CPU 71 assigns a fixed prize, a mini-game, a free game, and END to each of the twenty icons (step S2611). The contents defined in accordance with the game according to the sixth functional flowchart are assigned. It is preferable that assignment to the icons be determined in accordance with lottery processing.

Next, the main CPU 71 displays images of the twenty icons on the lower image display panel 141 (step S2613).

It is to be noted that, in the lower image display panel 141, the icons are displayed in such a manner that the contents corresponding to each of the icons cannot be visually recognized until a player selects an icon. Doing this makes it possible to impart a tense atmosphere or a sense of expectation to the player.

Next, the main CPU 71 determines whether or not a player operates the touch panel 114 and then selects one icon from among the twenty icons (step S2615). When the main CPU 71 determines that no icon is selected (NO), the main CPU 71 causes the routine to revert to step S2615.

When the main CPU 71 determines that an icon is selected in the determination processing of step S2615 (YES), the main CPU 71 determines whether or not a player selects an END icon (step S2617).

When the main CPU 71 determines that the player selects the END icon in the determination processing of step S2617, the main CPU 71 causes the routine to revert to a subroutine of FIG. 25 and then completes a free game 4 immediately. By doing this, in a case where the player selects the END icon, the free game 4 is completed and then the routine reverts to a base game immediately.

When the main CPU 71 determines a player does not select an END icon in the determination processing of step S2617 (NO), the main CPU 71 determines whether or not a player selects a fixed prize icon (step S2619).

When the main CPU 71 determines that the player selects the fixed prize icon in the determination processing of step S2619 (YES), the main CPU 71 causes the RAM 73 to store a prize that is assigned to the selected icon (step S2621) and then causes the routine to revert to step S2615.

When the main CPU 71 determines that the player does not select the fixed prize icon in the determination processing of step S2619 (NO), the main CPU 71 determines whether or not a player selects a mini-game icon (step S2623).

When the main CPU 71 determines that the player selects the mini-game icon in the determination processing of step S2623 (YES), the main CPU 71 execute a mini-game (step S2625) and then causes the routine to revert to step S2615. In a case where the player plays the mini-game and then can obtain a prize as the result of the mini-game, the prize is stored in the RAM 73.

When the main CPU 71 determines that the player does not select the mini-game icon (NO), the main CPU 71 determines whether or not a player selects a free game icon (step S2627). When the main CPU 71 determines that the player does not select the free game icon (NO), the main CPU 71 causes the routine to revert to step S2615.

When the main CPU 71 determines that the player selects the free game icon in the determination processing of step S2627 (YES), the main CPU 71 executes a processing operation of paying out the prize that is determined in the extended bonus game 5 (step S2629) and then complete this subroutine. The payout processing of step S2629 is a processing operation that is identical to that of step S24 of FIG. 8.

The routine then reverts from the subroutine of the extended bonus game 5 to step S2515 of FIG. 25. After that, the free game 4 is executed until the number-of-free-games counter indicates 0, and therefore, when a bonus game trigger is established again in the processing operation of step S2525, the extended bonus game 5 is invoked and executed again. Doing this makes it possible to form an extended game loop between the free game 4 and the extended bonus game 5.

The thirteenth benefit game that consists of the free game 4 and the extended bonus game 5 (the game according to the sixth functional flowchart) reverts to a base game when the value of the number-of-free-games counter is set to 0 in the free game 1 or when a player selects an END icon in the extended bonus game 5. In the thirteenth benefit game, there are a route of return from the free game 4 to a base game and a route of return from the extended bonus game 5 to a base game.

<<Processing Operation of Extended Bonus Game 6>>

FIG. 27 is a flowchart showing a subroutine of a processing operation of an extended bonus game 6 to be invoked and executed in the processing operation of step S2529 of FIG. 25. As described above, the processing operation of the extended bonus game 6 is executed when the fourteenth benefit game (the seventh functional flowchart) is selected (refer to FIG. 29).

As described in the seventh functional flowchart, the extended bonus game 6 is a free game that is playable as an extended bonus game. In the free game as the extended bonus game, eight unit games can be played. When these eight unit games are consumed, the extended bonus game completed and then the routine reverts to a normal game.

First, the main CPU 71 changes current symbol arrays to symbol arrays for extended bonus game (step S2713). No free game symbols are included in the symbol arrays for free game. In contrast, free game symbols are included in symbol arrays for extended bonus game. In the processing operation of step S2511 of FIG. 25 described above, the number of free game symbols to be included in the symbol arrays for extended bonus game is determined. In step S2713, current symbol arrays are changed to the symbol arrays for extended bonus game, and with respect to the free game symbols, a processing operation of inserting the free game symbols into the symbol arrays by the number determined in the processing operation of step S2511 of FIG. 25 is determined as well.

Next, the main CPU 71 determines the number of bonus games (step S2715). In the embodiment, eight unit games are played in the extended bonus game, and the number of bonus games is determined at 8 in the processing operation of step S2715.

Next, the main CPU 71 stores the determined number of bonus games in a number-of-bonus-games counter that is provided in the RAM 73 (step S2717).

Next, like the processing operation of step S12 described with reference to FIG. 8, the main CPU 71 conducts initialization processing at the time of completion of one game (step S2719). The main CPU 71 then conducts symbol lottery processing described with reference to FIG. 12 (step S2721). Like the processing operation of step S16 described with reference to FIG. 8, the main CPU 71 then conducts rendering content determination processing (step S2723). The main CPU 71 then conducts symbol display control processing described with reference to FIG. 13 (step S2725). The main CPU 71 then conducts number-of-payouts determination processing described with reference to FIG. 14 (step S2727).

Next, the main CPU 71 determines whether or not three or more free game symbols appear (step S2729).

When the main CPU 71 determines that the three or more free game symbols appear in the determination processing of step S2729 (YES), the main CPU 71 causes the routine to revert to step S2515 of FIG. 25. By doing this, in a case where the three or more free game symbols appear, the routine reverts from the extended bonus game 6 to the free game 4, enabling an extended game loop to be formed by means of the free game 4 and the extended bonus game 6.

When the main CPU 71 determines that the three or more free game symbols do not appear in the determination processing of step S2729 (NO), the main CPU 71 conducts payout processing (step S2731). In this payout processing, the main CPU 71 adds a value that is stored in the number-of-payouts storage region in the number-of-payouts determination processing of step S2727 described previously, to a value that is stored in a number-of-payouts storage region for bonus game. The number-of-payouts storage region for bonus game is a region configured to store a total number of payouts that is determined in the extended bonus game. A prize can be awarded to a player in accordance with the payout processing of step S2731.

Next, the main CPU 71 subtracts a value of a number-of-bonus-games counter by 1 (step S2733). Next, the main CPU 71 determines whether or not the value of the number-of-bonus-games counter is set to 0 (step S2735). When the main CPU 71 determines that the value of the number-of-bonus-games counter is not set to 0 (NO), the main CPU 71 causes the routine to revert to step S2719. Alternatively, when the main CPU 71 determines that the value of the number-of-bonus-games counter is set to 0 (YES), the main CPU 71 completes this subroutine. When the processing operation of the free game 6 completes, the routine transfers to a subroutine of FIG. 25. In this manner, the routine reverts from the extended bonus game 6 to a base game.

<<Processing Operation of Extended Bonus Game 7>>

FIG. 28 is a flowchart showing a subroutine of a processing operation of an extended bonus game 7 to be invoked and executed in the processing operation of step S2529 of FIG. 25. As described above, the processing operation of the extended bonus game 6 is executed when the fifteenth benefit game (the eighth functional flowchart) is selected (refer to FIG. 29).

As described in the eighth functional flowchart, in the extended bonus game 7, a free game that consists of eight unit games is executed on a first liquid crystal display screen (for example, the lower image display panel 141) is executed, a prize is determined in each of the unit games, and then the determined prize is awarded to a player. At the same time, on a second liquid crystal display screen (for example, the upper image display panel 131), an image indicating a battle in which characters compete against each other is displayed during the play of the eight unit games and then whether or not to enable continuing is expressed in accordance with the progress of the battle.

First, the main CPU 71 starts a processing operation of displaying an image indicating that a main character and an enemy character compete against each other in battle, on the upper image display panel 131, based on the progress of the battle that is determined in the processing operation of step S2511 of FIG. 25 (step S2813). For example, in accordance with the progress of the battle, there could be a case in which the main character wins, whereas the enemy character loses or a case in which the main character loses, whereas the enemy character loses or the like.

Next, the main CPU 71 determines the number of free game symbols to be included in symbol arrays in accordance with lottery processing (step S2815). The larger the number of free game symbols that is inserted into the extended bonus game is, the easier the free game symbols are arranged, and the higher the possibility of transfer to a free game is.

Next, the main CPU 71 changes current symbol arrays to symbol arrays for extended bonus game (step S2817). No free game symbols are included in the symbol arrays for free game. In contrast, free game symbols are included in symbol arrays for extended bonus game. In the processing operation of step S2815 described above, the number of free game symbols to be included in the symbol arrays for extended bonus game is determined. In step S2817, current symbol arrays are changed to the symbol arrays for extended bonus game, and with respect to the free game symbols, a processing operation of inserting the free game symbols into the symbol arrays by the number determined in the processing operation of step S2815 is determined as well.

Next, the main CPU 71 determines the number of bonus games (step S2819). In the embodiment, eight unit games are played in the extended bonus game, and the number of bonus games is determined at 8 in the processing operation of step S2819.

Next, the main CPU 71 stores the determined number of bonus games in a number-of-bonus-games counter that is provided in the RAM 73 (step S2821).

Next, like the processing operation of step S12 described with reference to FIG. 8, the main CPU 71 conducts initialization processing at the time of completion of one game (step S2823). The main CPU 71 then conducts symbol lottery processing described with reference to FIG. 12 (step S2825). Like the processing operation of step S16 described with reference to FIG. 8, the main CPU 71 then conducts rendering content determination processing (step S2827). The main CPU 71 then conducts symbol display control processing described with reference to FIG. 13 (step S2829). The main CPU 71 then conducts number-of-payouts determination processing described with reference to FIG. 14 (step S2831).

Next, the main CPU 71 conducts payout processing (step S2833). In this payout processing, the main CPU 71 adds a value that is stored in the number-of-payouts storage region in the number-of-payouts determination processing of step S2831 described previously, to a value that is stored in a number-of-payouts storage region for bonus game. The number-of-payouts storage region for bonus game is a region configured to store a total number of payouts that is determined in the extended bonus game. A prize can be awarded to a player in accordance with the payout processing of step S2833.

Next, the main CPU 71 subtracts a value of a number-of-bonus-games counter by 1 (step S2835). Next, the main CPU 71 determines whether or not the value of the number-of-bonus-games counter is set to 0 (step S2837). When the main CPU 71 determines that the value of the number-of-bonus-games counter is not set to 0 (NO), the main CPU 71 causes the routine to revert to step S2823. Alternatively, when the main CPU 71 determines that the value of the number-of-bonus-games counter is set to 0 (YES), a win or loss according to the progress of the battle that is determined in the processing operation of step S2511 is determined and then an image indicating that the battle is completed is displayed (step S2839).

Next, the main CPU 71 determines whether or not the main character has won in the progress of the battle that is determined in the processing operation of step S2511 (step S2841). When the main CPU 71 determines that the main character has won (YES), the main CPU 71 causes the routine to revert to step S2515 of FIG. 25 described above. When the main character has won, the routine reverts from the extended bonus game 7 to the free game 4. Doing this makes it possible to form an extended game loop between the extended bonus game 7 and the free game 4.

When the main CPU 71 determines that the main character has not won (NO), the main CPU 71 completes this subroutine. When the processing operation of the extended bonus game 7 completes, the routine transfers to a subroutine of FIG. 25. Doing this enables the routine to revert from the extended bonus game 7 to a base game.

Modification Example

The embodiment described above showed a gaming machine in which symbol images are displayed on the lower image display panel 141 and then a base game, a free game, and an extended bonus game are executed. Symbols are arranged on reels having their cylindrical shape (so called mechanism reels) and then the reels are mechanically rotated by means of motor or the like, whereby the symbols may be rearranged. In this case, the symbols cannot be changed when the routine transfers to a free game to an extended bonus game, whereas a game identical to that of the foregoing embodiment can be executed by making symbol functions different from each other. For example, it may be well that in a base game, successful arrangement of five "PLUM" symbols functions as a PLUM winning combination (refer to FIG. 7), whereas in a free game, successful arrangement of a plurality of "PLUM" symbols functions as a bonus game trigger.

In addition, a full-screen liquid crystal display device is provided in front of mechanical reels, and when the routine transfers to a free game or an extended bonus game, images of other symbols are displayed on the liquid crystal display panel so as to be superimposed on specific symbols on the reels. Doing this enables symbols to be displayed in a replaceable manner so that the symbols different from each other are rearranged in a base game, a free game, or an extended bonus game.

What is claimed is:

1. A gaming machine comprising:

a display device having a plurality of regions in which a plurality of symbols are arranged; and a controller for controlling a base game mode in which a predetermined prize can be determined according to rearrangement of the plurality of symbols, a free game mode in which a predetermined prize can be determined according to rearrangement of the plurality of symbols by playing at least one unit game without betting a gaming medium, and a bonus game mode in which a prize higher than the predetermined prize can be determined, the controller being programmed to execute processing operations of:

(1-1) transferring from the base game mode to the free game mode when a specific symbol from among the plurality of symbols is arranged in the base game mode;

(1-2) transferring from the free game mode to the bonus game mode when a first transfer condition occurs in a predetermined unit game in the free game mode;

(1-3) transferring from the bonus game mode to the free game mode when a second transfer condition occurs in the bonus game mode;

(1-4) forming and executing an extended game mode when the free game mode and the bonus game mode successively alternate relative to one another, wherein in the extended game mode gameplay alternates between the free game mode and bonus game mode for a predetermined period; and (1-5) generating the predetermined period of the extended game mode according to a predetermined continuation rate, wherein an ease of entry into the extended game mode between the free game mode and bonus game mode is determined according to the continuation rate and the following transfer routes:

a first transfer route from the free game mode to the bonus game mode;

a second transfer route from the bonus game mode to the free game mode;

a third transfer route from the free game mode to the base game mode; and a fourth transfer route from the bonus game mode to the base game mode.

2. The gaming machine according to claim 1, wherein the controller further executes a processing operation of (2-1) transferring from one of the free game mode or the bonus game mode to the base game mode upon establishment of a completion condition in at least one game of the free game mode and the bonus game mode.

3. The gaming machine according to claim 1, wherein the controller randomly determines the predetermined continuation rate upon one of: transfer from the base game mode to the free game mode according to the first transfer condition, or execution of the bonus game mode.

4. The gaming machine according to claim 1, wherein the controller further executes a processing operation of (4-1) alleviating the first transfer condition in the free game to be first executed when transfer from the base game to the free game is realized.

5. The gaming machine according to claim 1, wherein the controller further executes a processing operation of (5-1) executing the free game to be first executed when transfer from the base game to the free game is realized, until the first transfer condition is established.

* * * * *